(12) United States Patent
Breed

(10) Patent No.: US 9,030,321 B2
(45) Date of Patent: May 12, 2015

(54) CARGO THEFT PREVENTION USING TEXT MESSAGING

(75) Inventor: David S. Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 291 days.

(21) Appl. No.: 13/602,510

(22) Filed: Sep. 4, 2012

(65) Prior Publication Data

US 2013/0033381 A1    Feb. 7, 2013

Related U.S. Application Data

(63) Continuation-in-part of application No. PCT/US2012/029079, filed on Mar. 14, 2012.

(60) Provisional application No. 61/452,418, filed on Mar. 14, 2011, provisional application No. 61/584,642, filed on Jan. 9, 2012, provisional application No. 61/508,822, filed on Jul. 18, 2011.

(51) Int. Cl.
*G08B 1/08* (2006.01)
*G08B 13/14* (2006.01)
(Continued)

(52) U.S. Cl.
CPC ............... *B60T 1/005* (2013.01); *G01S 13/04* (2013.01); *G08B 13/1427* (2013.01); *B60T 7/16* (2013.01);
(Continued)

(58) Field of Classification Search
CPC . G06Q 10/06; G06Q 10/087; G06K 9/00771; G06K 9/66; G08B 25/08; G08B 25/009; G08B 13/1427; G08B 13/2462; G08B 13/248; B60C 11/24; B60C 19/00; B60J 7/0573; B60J 10/00; B60N 2/002; G01S 13/04; G01S 15/04; G01S 15/06; G01S 15/42; G01S 15/87; G01S 17/026; G01S 17/89; G01S 7/417; G01S 7/4802; G01S 7/539; B62D 35/001
USPC .................. 340/539.22, 568.1, 539.17; 701/1; 296/26.05, 181.5, 185.1; 455/39, 73; 70/264
See application file for complete search history.

(56) References Cited

U.S. PATENT DOCUMENTS 3,961,323 A    6/1976    Hartkorn
4,740,792 A    4/1988    Sagey et al.
(Continued)

FOREIGN PATENT DOCUMENTS

DE    200 08 390 U1    9/2000

OTHER PUBLICATIONS

International Search Report dated Jun. 21, 2012 for International Application No. PCT/US 2012/029079.
(Continued)

*Primary Examiner* — Fekadeselassie Girma
(74) *Attorney, Agent, or Firm* — Brian Roffe

(57) ABSTRACT

Method for monitoring a cargo container in which a transmitter is arranged on the container and periodically transmits messages to a remote site or location according to a schedule of messages. When a message is not received according to the schedule, which may be the result of tampering with the transmitter or another nefarious action involving the container, it may be considered that the container has been stolen. A rate of transmission of the messages may be modified based on a condition of the vehicle, such as the presence of a driver inside the vehicle, a distance between a driver inside the vehicle and the vehicle, the vehicle being at rest after motion of the vehicle stops, a location of the vehicle, biometric identification of a driver of the vehicle and deviation of the vehicle from an expected route, and/or based on current time and weather around the vehicle.

20 Claims, 8 Drawing Sheets

(51) Int. Cl.
*H04Q 1/30* (2006.01)
*G05D 1/00* (2006.01)
*B62D 33/04* (2006.01)
*B60T 1/00* (2006.01)
*G01S 13/04* (2006.01)
*B60T 7/16* (2006.01)
*G08B 13/24* (2006.01)
*B60T 1/06* (2006.01)
*G08B 13/00* (2006.01)
*G08B 13/196* (2006.01)

(52) U.S. Cl.
CPC ....... *G08B 13/1436* (2013.01); *G08B 13/19647* (2013.01); *G08B 13/2417* (2013.01); *B60T 1/067* (2013.01); *G08B 13/00* (2013.01)

(56) References Cited

U.S. PATENT DOCUMENTS

| | | | |
|---|---|---|---|
| 5,311,197 A | 5/1994 | Sorden et al. | |
| 5,432,841 A * | 7/1995 | Rimer | 455/457 |
| 5,539,810 A | 7/1996 | Kennedy, III et al. | |
| 5,544,225 A | 8/1996 | Kennedy, III et al. | |
| 5,565,858 A | 10/1996 | Guthrie | |
| 5,751,245 A | 5/1998 | Janky et al. | |
| 5,771,455 A | 6/1998 | Kennedy, III et al. | |
| 5,774,876 A | 6/1998 | Woolley et al. | |
| 5,804,810 A | 9/1998 | Woolley et al. | |
| RE35,920 E | 10/1998 | Sorden et al. | |
| 5,880,679 A | 3/1999 | Lenart et al. | |
| 5,892,441 A | 4/1999 | Woolley et al. | |
| 5,898,391 A | 4/1999 | Jefferies et al. | |
| 5,959,568 A | 9/1999 | Woolley | |
| 5,969,595 A | 10/1999 | Schipper et al. | |
| 5,999,091 A | 12/1999 | Wortham | |
| 6,236,836 B1 | 5/2001 | Westman et al. | |
| 6,240,295 B1 | 5/2001 | Kennedy, III et al. | |
| 6,295,449 B1 | 9/2001 | Westerlage et al. | |
| 6,504,491 B1 | 1/2003 | Christians | |
| 6,839,627 B1 | 1/2005 | Bauch | |
| 6,982,656 B1 | 1/2006 | Coppinger et al. | |
| 7,082,359 B2 | 7/2006 | Breed | |
| 7,319,397 B2 | 1/2008 | Chung et al. | |
| 7,323,970 B1 | 1/2008 | Murray et al. | |
| RE40,073 E | 2/2008 | Breed | |
| 7,342,497 B2 | 3/2008 | Chung et al. | |
| 7,386,372 B2 | 6/2008 | Breed et al. | |
| 7,423,535 B2 | 9/2008 | Chung et al. | |
| 7,819,003 B2 | 10/2010 | Breed et al. | |
| 7,839,289 B2 | 11/2010 | Chung et al. | |
| 7,880,599 B2 | 2/2011 | Murray et al. | |
| 7,911,324 B2 | 3/2011 | Breed et al. | |
| 7,936,256 B2 | 5/2011 | Murray et al. | |
| 7,936,271 B2 | 5/2011 | Karr et al. | |
| 8,018,329 B2 | 9/2011 | Morgan et al. | |
| 8,031,061 B2 | 10/2011 | Kalous | |
| 8,054,183 B2 | 11/2011 | Villiger | |
| 8,054,203 B2 | 11/2011 | Breed et al. | |
| 8,115,620 B2 | 2/2012 | Breed | |
| 8,159,338 B2 | 4/2012 | Breed | |
| 8,174,383 B1 | 5/2012 | Chung et al. | |
| 8,217,772 B2 | 7/2012 | Morgan et al. | |
| 8,253,549 B2 | 8/2012 | Murray et al. | |
| 8,269,618 B2 | 9/2012 | Murray et al. | |
| 8,314,704 B2 | 11/2012 | Cova et al. | |
| 8,325,025 B2 | 12/2012 | Morgan et al. | |
| 8,334,773 B2 | 12/2012 | Cova et al. | |
| 8,432,274 B2 | 4/2013 | Cova et al. | |
| 8,651,547 B2 * | 2/2014 | Alguera Gallego | 296/26.05 |
| 2003/0227382 A1 * | 12/2003 | Breed | 340/539.13 |
| 2005/0046584 A1 * | 3/2005 | Breed | 340/825.72 |
| 2005/0219037 A1 * | 10/2005 | Huang | 340/5.73 |
| 2007/0268138 A1 | 11/2007 | Chung et al. | |
| 2007/0291690 A1 | 12/2007 | Twitchell | |
| 2008/0088441 A1 * | 4/2008 | Breed | 340/539.26 |
| 2008/0174423 A1 * | 7/2008 | Breed | 340/539.22 |
| 2012/0089299 A1 * | 4/2012 | Breed | 701/36 |
| 2012/0098663 A1 * | 4/2012 | Zhou et al. | 340/568.1 |
| 2014/0033774 A1 * | 2/2014 | Ofchus et al. | 70/264 |
| 2014/0202800 A1 | 7/2014 | Breed | |
| 2014/0266652 A1 | 9/2014 | Morgan et al. | |
| 2014/0266653 A1 | 9/2014 | Morgan et al. | |
| 2014/0266708 A1 | 9/2014 | Warren et al. | |

OTHER PUBLICATIONS

Written Opinion dated Jun. 21, 2012 for International Application No. PCT/US 2012/029079.

* cited by examiner

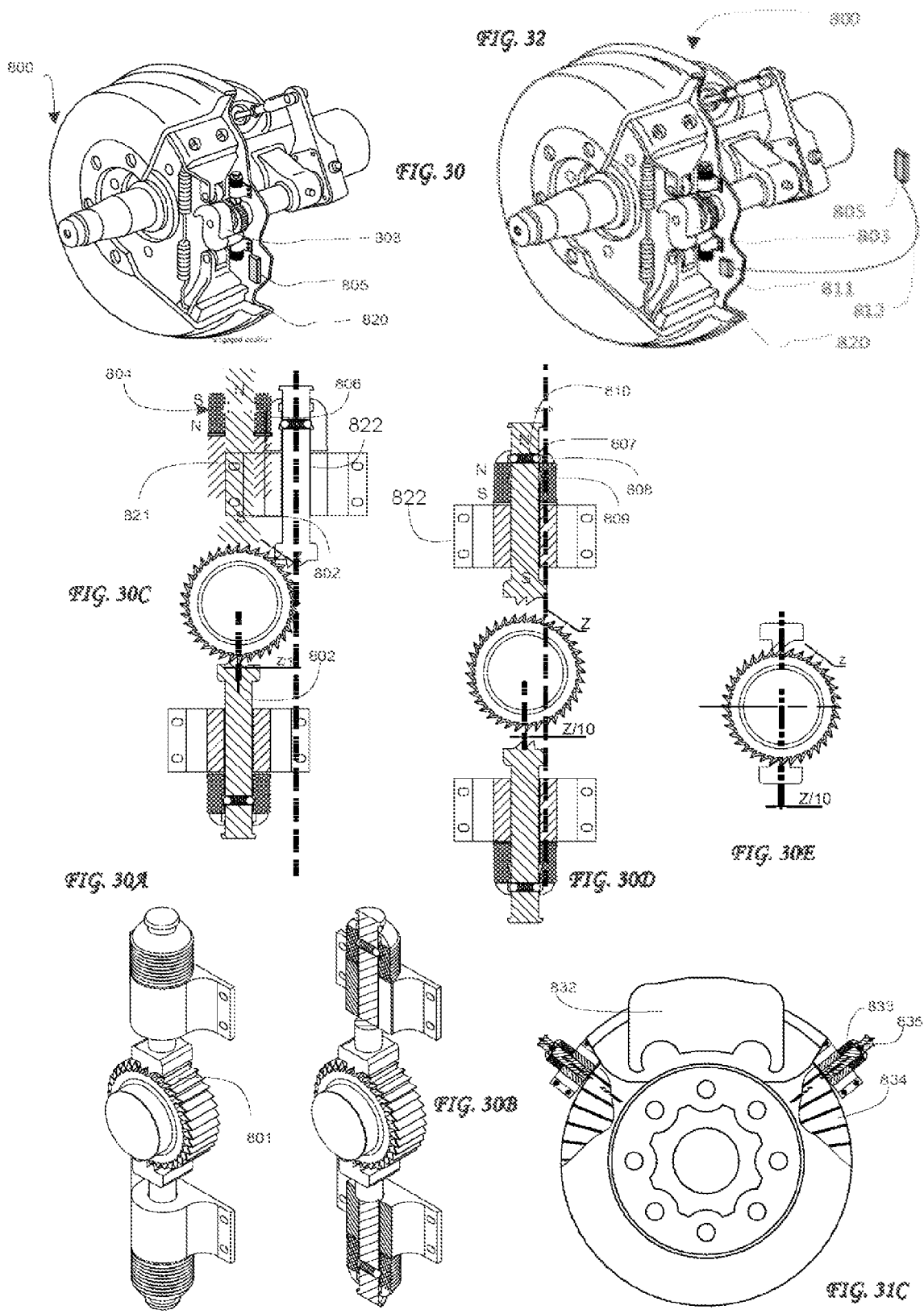

CARGO THEFT PREVENTION USING TEXT MESSAGING

CROSS-REFERENCE TO RELATED APPLICATION

This is a continuation-in-part of pending International Application No. PCT/US12/29079, with an International filing date of Mar. 14, 2012, which is incorporated by reference herein.

FIELD OF THE INVENTION

The present invention relates generally to arrangements and methods for monitoring cargo carrying vehicles such as truck trailers for the prevention of theft of the cargo. More specifically, an embodiment of the present invention relates to the use of text messaging to prevent theft of cargo from cargo-carrying or cargo-containing vehicles.

BACKGROUND OF THE INVENTION

The theft of cargo in the United States has been reported by the FBI as being approximately $30 Billion annually in terms of the actual cargo value and may be as much as ten times that amount if all costs are take into account such as disruptions in the supply chain. C. H. Robinson has been working with the Flemming Cargo Securement and OnAsset companies to reduce this theft through placing hidden sensors and transmitters within pallets of cargo. This solution is destined to fail as thieves become aware of this approach and move to defeat it. Thieves have learned how to defeat other attempted theft countermeasures such as locks and transmitting systems and thus there is a need for a new comprehensive solution to reduce the theft of cargo eventually to zero. The inventions described herein are to solve this heretofore unsolved serious cargo theft problem and achieve zero cargo theft. The implementation of these inventions can be termed The Road to Zero Cargo Theft™ or RtZCT™.

Additional statistics appeared in a recent report (February 2008) published by the International Road Union (IRU) and International Transport Forum (ITF) highlighted that over the period 2000-2005:

1. 17% of all drivers have suffered an attack during the 5-year period investigated
2. 30% of attacked drivers have been attacked more than once
3. 21% of drivers were physically assaulted
4. 60% of the attacks targeted the vehicle and its load
5. 42% of the attacks took place in truck parking areas
6. 30% of the attacked drivers did not report the incident to the police
7. Countries where the highest number of surveyed attacks occurred, per million tonnes of international traffic, are: Romania (5.03/Mt), Hungary (1.31/Mt), and Poland (1.21/Mt)

According to an EU Parliament report, the Transported Asset Protection Association (TAPA) estimated losses of 8.2 billion Euros across the whole of Europe, which when viewed in full economic loss terms, including cost of replacement goods, re-shipping and reputational damage etc. are a small fraction of the actual damage.

In the US, Cargo theft rose by 4.1% in 2010, to 899 recorded theft incidents, the highest on record. Of the 899 incidents, 724 (81%) were full truckload or container thefts and 31 were warehouse burglaries (3.4%). Violence was involved in 1.3% of the incidents (10 hijackings and two warehouse robberies). This was the second year in a row in which televisions were the product most stolen on record. Of note, 61% of all electronics thefts occurred in the states of California, Florida and Texas.

Of the 899 cargo theft incidents recorded for that year with a known theft type, 724 (approximately 88%) were full truckload or container thefts. Warehouse burglaries declined slightly from 2009 figures, totaling 31 incidents in 2010 compared with 36 the previous year.

Cargo theft can take many forms such as the theft of a tractor and trailer, the theft of the trailer alone or the theft of cargo that is within the trailer. A preferred approach is to steal the trailer by disconnecting it from the tractor while the driver has stopped at a truck stop for a rest, bathroom stop or a meal. It has been reported that the thieves are able to disconnect a trailer and connect it to another tractor, or to steal both the tractor and trailer, in as little as 15 seconds and be on their way before the driver is aware of the event. During the process, the thieves can detect whether the trailer is transmitting information and jam or block the transmission thus preventing a remote site or the driver from learning that a theft is in progress.

The word trailer will be used herein to generally mean not only a trailer in the usual sense as an unpowered vehicle pulled by a powered vehicle but also any container capable of transporting cargo such as ships, barges, train cars and, where appropriate, airplanes. The focus of this invention is movable containers but many of the inventive ideas presented here are also applicable to fixed cargo containers such as storage tanks, warehouses and other buildings.

A further detailed discussion of background information is set forth in the applications listed above and incorporated by reference herein. All of the patents, patent applications, technical papers and other references referenced below and in the parent applications are incorporated herein by reference in their entirety. Various patents, patent applications, patent publications and other published documents are discussed below as background of the invention. No admission is made that any or all of these references are prior art and indeed, it is contemplated that they may not be available as prior art when interpreting 35 U.S.C. §102 in consideration of the claims of the present application.

There is considerable discussion herein on the use of transponders and coded transmitters. This is a fertile area for invention and it is contemplated that future patent applications related to this one will cover many of these inventions. In the meantime, the disclosures of the following US patents and US application constitute some of the key implementations of such coded transponders and transmitters: Ser. Nos. 05/917,423, 06/229,988, 07/106,211, 07/511,606, 07/536,169, 07/561,102, 07/664,462, and 20100277296.

Definitions in the Background of the Invention section of any of the above-mentioned applications are also generally, but not restrictively, applicable herein.

OBJECTS AND SUMMARY OF THE INVENTION

It is an object of the present invention to provide new and improved systems for reducing and eliminating the theft of cargo that resides in truck trailers, of the trailer with the cargo or of the tractor and cargo containing trailer.

In order to achieve this object and possibly others, an arrangement for monitoring a trailer when it is moving at one frequency and at a higher frequency when it is at a fixed location and/or at a location which is known to be dangerous in accordance with the invention includes a monitoring or sensor system arranged to obtain information about the trailer or an interior of the trailer in addition to the location of the trailer, and a communication system coupled to the sensor system and being provided with a location of the trailer. The communication system transmits the information about the trailer obtained by the sensor system and the location of the trailer to a remote facility at a high frequency such as once every 5 seconds. Various sensors are envisioned including an accelerometer, an inertial measurement unit (IMU), a motion sensor, an RFID sensor, an electromagnetic sensor, camera, microphone, ultrasound sensor, capacitive sensor, chemical sensor, moisture sensor, radiation sensor, biological sensor, temperature sensor, pressure sensor, radiation sensor, an intruder sensor, a fire detector, a smoke detector, a water detector and a pollution sensor.

The sensor system may be arranged to periodically obtain information about the trailer and provide the information to the communications systems which transmits the information to the remote facility. To enable wireless and powerless monitoring, a power source independent of a power source extending outside of the trailer or provided by the tractor may be provided to supply power to the sensor system and the communications unit.

To efficiently manage power yet provide suitable protection, the sensor system may include an initiation device for periodically initiating the sensor system to obtain information about the vehicle or its contents. A wakeup sensor system detects the occurrence of an internal or external event, or the absence of an event for a time period, requiring a change in the frequency of monitoring of the trailer and transmitting messages. The initiation device is coupled to the wakeup sensor system and changes the rate at which it initiates the sensor system to obtain information about the trailer in response to the detected occurrence of an internal or external event by the wakeup sensor system. In particular, when the trailer is not moving indicating that it is parked, the transmission frequency is substantially increased so that the remote site that is receiving the information can detect that a theft may be in process if the transmissions cease without a message from the driver, such as that he has returned to the tractor. Such a driver returned message can be initiated by the sensing of a tag, smart card, smart phone or other equivalent device carried by the driver or by a sensing of an identifiable biometric signature by a sensor within or associated with the tractor or by a cell phone or other driver initiated communication.

In the event that a theft is detected as being in process, an immediate message can be transmitted by the remote site to one or more of the following: (1) law enforcement officials in the area; (2) the driver; (3) other equipped trucks in the vicinity; (4) surveillance cameras in the area and/or (5) to drone aircraft that can be launched to photograph and follow the trailer should it be moved by unauthorized persons. If the message is acted on by truckers with communications equipped trucks and such trucks are able to block the thieves or to follow them until the law enforcement authorities arrive, then a reward can be paid to the truckers for preventing the theft. Thus, the entire trucking industry can be made part of the solution to the cargo theft problem.

The sensor system may be controllable by the remote facility to obtain information about the trailer. The sensor system may include an integral energy providing system and can be wirelessly connected to a processor.

A method for monitoring a trailer in accordance with the invention includes arranging a sensor system to obtain information about the trailer different than the location of the trailer, obtaining information about the trailer via the sensor system, and transmitting the obtained information about the trailer and the location of the trailer to a remote facility. The communication system may be wirelessly coupled to the sensor system. An environment around the trailer may be monitored by the sensors to obtain information about the environment around the trailer, and the information about the environment around the trailer transmitted to the remote facility along with the information about the trailer and the location of the trailer. The sensor system may be controlled to periodically obtain information about the trailer. At least one reactive system may be arranged at the trailer to adjust a condition in the trailer and controlled by the remote facility based on the transmitted information about the trailer obtained by the sensor system. The communication system can involve the Short Message System (SMS) such as used by cell phones when texting, the General Packet Radio Service (GPRS), other cell phone based systems, WiMAX or LTE base internet connection systems, citizen's band radio, satellite communication systems or any other appropriate communication system. Other texting systems include Google Voice, Pinger, Apple iMessage, BlackBerry Messenger, WhatsApp, Viber Media, Facebook Messenger and KakaoTalk.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 30 illustrates a brake lockout mechanism for use with drum brakes.

FIGS. 30A-30E illustrate various aspects of the brake lockout mechanism.

FIGS. 31A-31C illustrate a brake lockout mechanism for use with disk brakes.

FIG. 32 illustrates a brake lockout mechanism as in FIG. 30 with the electronic controller mounted outside of the brake area and connected by a wire to stepping switch assembly.

DETAILED DESCRIPTION OF THE INVENTION

1. Definitions

Although many of the examples below relate to a cargo space in an asset, the invention is not limited to any particular space in any particular asset and is thus applicable to all types of assets including vehicles, shipping containers, and truck trailers regardless if they are pulled by tractors or are on boats, trains or planes. For the purposes of this disclosure, the word vehicle will be used to represent all such containers, trucks, trains, boats, airplanes and other vehicles where appropriate.

Prior to describing the invention in detail, definitions of certain words or phrases used throughout this patent document will be defined: the terms "include" and "comprise", as well as derivatives thereof, mean inclusion without limitation; the term "or" is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller", "control module", "control unit", "processor" are generally synonymous and mean any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions of certain words and phrases are provided throughout this patent document, and those of ordinary skill in the art will understand that such definitions apply in many, if not most, instances to prior as well as future uses of such defined words and phrases.

2. Cargo Monitoring Systems

Figure 7:
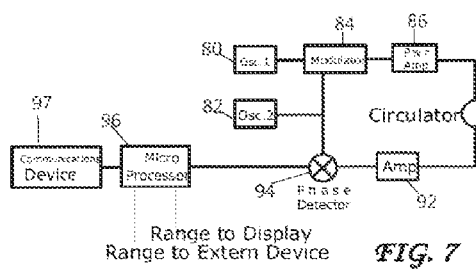
Figure 8:
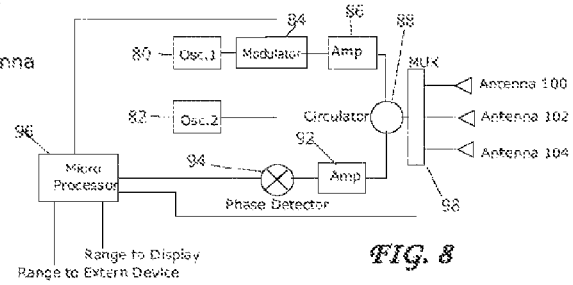
FIG. 8 is a block diagram of an interrogator with multiple antennas which may be used in the invention.
Figure 9:
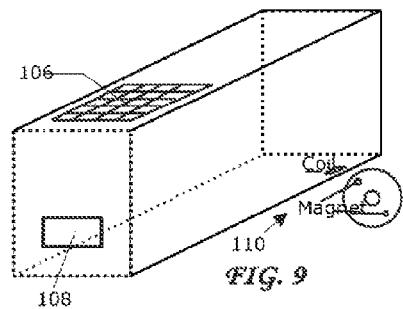
FIG. 9 illustrates systems for deriving or harvesting electrical power for use in the invention.

Referring to the accompanying drawings, FIGS. 1-10 illustrate a method and system for identifying and locating an RFID-tagged article inside a cargo space defined by a frame. The RFID tags can be active, passive or a combination of both, or MIR or Wibree transmitters, or devices providing backscatter including antennas and dihedral and corner cube reflectors. The system can employ multiple antennas inside or outside of a cargo space, truck trailer or other vehicle cargo space as illustrated in FIGS. 1-6. The system is preferably designed for a low power battery operation when the cargo space is not tethered to a power source. Some energy harvesting methods for powering the system are shown in FIG. 9. The system can require little power and have a low duty cycle when not connected to a power source. Thus, the system can provide RFID tag identification, and in some cases sensor monitoring information, for many years with internal battery power.

A passive or active RFID tag can operate at about 915 MHz (ISM band) complying with FCC rule 15, for example, or other rules that may apply either in the US or other countries. The frequency can be any frequency permitted under these rules.

Figure 1:
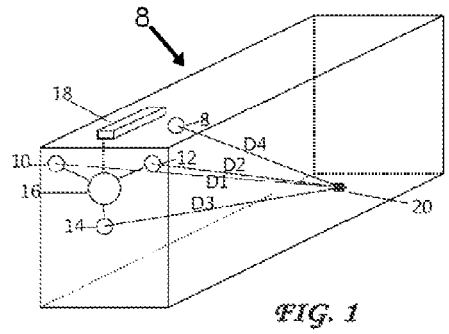
FIG. 1 illustrates a first embodiment of a cargo space equipped with a system in accordance with the invention for obtaining information from a tagged object in the cargo space.

FIG. 1 illustrates an embodiment of a cargo space with three antennas 10, 12, 14 spaced in a triangular fashion and connected to an interrogator 16 internal to the cargo space with the antennas 10, 12, and 14 shown in one possible configuration arranged on a common wall of the cargo space. The interrogator 16 can be arranged inside or outside of the cargo space and can be mounted on the outside, within or on the inside of a wall defining the cargo space. For example, for the shipping container 8 shown in FIG. 1 having four walls, a roof and a floor, the antennas 10, 12, 14 can be arranged in or on the inside or outside of the front wall. This wall may be the fixed wall opposite the door of the shipping container 8. In other embodiments, the antennas 10, 12, 14 can be arranged in or on the other walls, the ceiling or the floor of the container 8 or in multiple locations.

The interrogator 16 may be arranged within the triangle defined by the antennas 10, 12, 14, for example, at or about the approximate center of the triangle. In other embodiments with multiple antennas, the interrogator may be situated to be equidistant from all of the antennas. Nevertheless, the location of the interrogator relative to the antennas is not critical to the practice of the invention and the interrogator may be placed anywhere on the asset defining the cargo space, or even separate and apart from the asset, as described below. The interrogator 16 may be connected to the antennas 10, 12, 14 using wires or wirelessly. The time delay for the signals to travel from the interrogator 16 to the antennas 10, 12, 14 needs to be considered in the calculations to determine the distance to an RFID tag. These calculations are simplified if the distance to each antenna 10, 12, 14 from the interrogator 16 is the same.

The interrogator 16 can be connected to a satellite communication unit or other communication unit 18 from its location associated with the cargo space, e.g., outside or in the interior of the cargo space, using a wire or wirelessly using an antenna. As shown, communication unit 18 can be arranged on an exterior surface such as a roof of the asset. The satellite or other communication unit 18 can have an external antenna and can be used to send tag and other information to a remote site. The distances from each antenna 10, 12, 14 to an RFID device or tag 20 are shown as D1, D2 and D3. These distances can be determined by a processor within the interrogator 16 shown schematically in FIG. 8, or the information obtained by the interrogator 16 can be transmitted to another processor that may be on the frame defining the cargo space or at a remote location where the calculations can be performed. The interrogator 16 can additionally obtain information from sensors mounted in conjunction with and connected to tag 20 in addition to the tag identification. These sensors can, for example, monitor the motion, temperature, integrity, attitude, pressure, weight, leakage and/or any other parameter associated with the object with which the tag is associated or its environment In the above example, the interrogator 16 transmits an interrogation signal and the tags, such as tag 20, return a response with the desired information. An alternate approach is for the tag 20, for example, to periodically transmit a signal which is received by antennas 10, 12, and 14. If a clock in the tag 20 has been synchronized with a clock in the interrogator 16, then the distances D1, D2, and D3 can be determined provided multipath and other effects are ignored or otherwise dealt with. If a fourth antenna 8 is provided, then four signals are received by the interrogator 16 and clock synchronization is unnecessary. Adding additional antennas can improve the location determination of tag 20 especially when the transmission path to the tag 20 is obstructed leading to signal transmission delays and multipath complications. Thus in this embodiment, the RFID device 20 returns a signal at a specific time after receipt of an interrogation signal or pulse from one or more of the antennas 10, 12, 14, or at an appointed or predesignated time.

In one embodiment when the interrogator 16 causes transmission of signals from multiple antennas 10, 12, 14, the RFID 20 when receiving signals from one or more of these antennas 10, 12, 14 may be arranged or programmed to provide information in the return signal indicative of a phase or relative time of reception of signals from the multiple antennas. A processor such as the one associated with the interrogator 16 could then analyze the return signals and, from the phase or time reception information, derive information about the location of the RFID device 20 or object to which it is mounted.

The determination of the presence and location of a tag within a cargo area such as a truck trailer provides an indication as to whether a theft has occurred or is occurring. The presence determination is the first indication that a theft has occurred but may not be sufficient as a sophisticated thief may remove the RFID tag and leave it in the trailer. Thus, the position of the tag provides a more positive indication as to whether the cargo has been disturbed or stolen.

Figure 2:
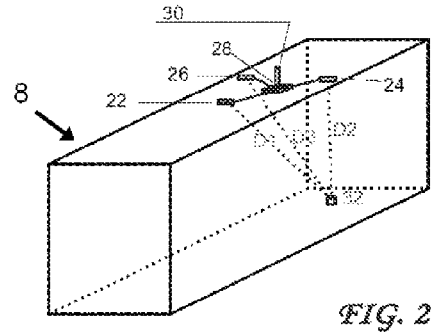
FIG. 2 illustrates a second embodiment of a cargo space equipped with a system in accordance with the invention for obtaining information from a tagged object in the cargo space.

Returning now to the monitoring of tagged cargo within the trailer, FIG. 2 illustrates an embodiment of a cargo space with three antennas 22, 24, 26 spaced in a triangular fashion located on the roof, ceiling and/or top of the shipping container defining the cargo space and connected to an interrogator 28 internal to the cargo space. The interrogator 28 is connected to an external antenna 30 and can also be connected to a satellite and/or other communication unit as in FIG. 1. The distances from each antenna 22, 24, 26 to the RFID device or tag 32 are shown as D1, D2 and D3. The interrogator 28 may be arranged within the triangle defined by the antennas 22, 24, 26 or elsewhere. The variations described for the embodiment shown in FIG. 1 are equally applicable to this embodiment.

Mounting of the antennas 22, 24, 26, and/or possibly any other type of electromagnetic energy transmitter, on the roof of the shipping container is advantageous in that is it very unlikely to interfere with the maximum use of the cargo space provided by the shipping container.

Figure 3:
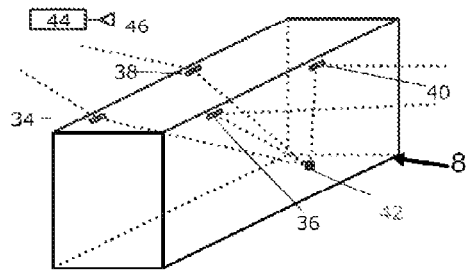
FIG. 3 illustrates an embodiment of a cargo space with RF windows.

FIG. 3 illustrates an embodiment of a shipping container 8 defining a cargo space with multiple RF windows 34, 36, 38, 40 in the frame of the container. The windows 34, 36, 38, 40 allow for the signal to and from one or more RFID devices or tags 42 in the cargo space to transmit and receive signals from an interrogator 44 such as shown schematically in FIG. 6 which can be located outside of the cargo space. This embodiment therefore enables an interrogator 44 to obtain signals via antenna 46 from an RFID device or tag 42 within a cargo space while the interrogator 44 is separate and apart from the cargo space. Such RF windows can be needed when metal walls are interposed between the interrogator and its antenna, and the space defined by the frame. It is thus conceivable that the interrogator and its antenna may even be arranged on the frame yet require one or more RF windows to enable signals from the antenna to pass into the space and return signals from any RFID devices in the space to pass out of the space to be received by the antenna. Walls made from other materials may also pose transmission problems depending on the interrogator frequency and power. Thus, knowledge of the materials of the walls is a factor when determining the interrogator frequency.

The size, location and number of RF windows in an asset, such as the shipping container 8 defining the cargo space shown in FIG. 3, can vary depending on, for example, the expected and possible locations of RFID devices or tags in the cargo space or other space defined by the asset, the dimensions of the cargo space or other space defined by the asset, and the expected relative position between the antenna of the interrogator and the RFID devices. It is possible that one or more RF windows be situated at the same location on a particular type of shipping container and that a scanning system being provided for use with such shipping containers which is designed to accept one or more shipping containers in a position in which the RF windows are automatically properly aligned with an antenna of an interrogator of the scanning system. This will simplify the scanning of the shipping containers. RF windows are usually desirable when the container is made from metal which blocks or significantly attenuates RF signals.

Figure 4:
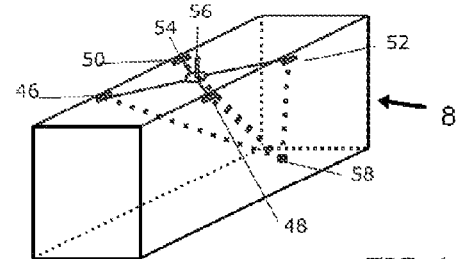
FIG. 4 illustrates an embodiment of a cargo space with an antenna multiplexer arrangement.

FIG. 4 illustrates an embodiment of a cargo space with a multiple of internal antennas 46, 48, 50, 52 connected to an antenna multiplexer 54 (such as a PE4261 SP4T RF UltraC-MOS™ Flip Chip Switch manufactured by Peregrine Semiconductor). As shown, antennas 46, 48, 50, 52 are all arranged at the top of the shipping container defining the cargo space.

Figure 6:
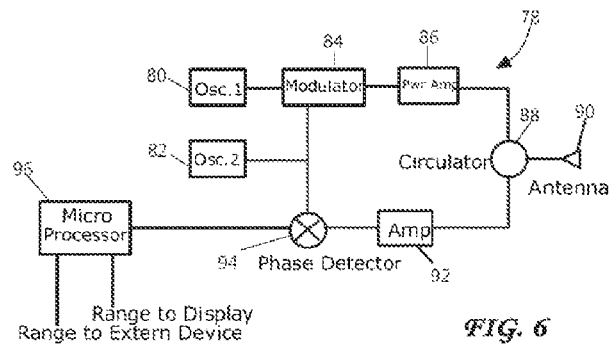
FIGS. 6 and 7 are block diagrams of an interrogator with a single antenna which may be used in the invention.

The multiplexer 54 may be connected to an antenna 56 outside of the cargo space (an external antenna, yet one which is still mounted on and/or attached to the frame defining the cargo space) for communications with an external interrogator such as illustrated in FIG. 6. A transceiver may be connected between the multiplexer 54 and the external antenna 56 in order to increase the signal strength of the signals from the RFID device 58 which is internal to the shipping container defining the cargo space. The external antenna 56 is used to communicate with an interrogator and its antenna which is used to control the transmissions of signals by the antennas 46, 48, 50, 52 and process signals received by the antennas into information about the RFID device 58 and/or an object on or to which the RFID device is attached. A processor may be used for this purpose and may either be part of the interrogator or separate therefrom which can be remote from the interrogator.

Figure 10:
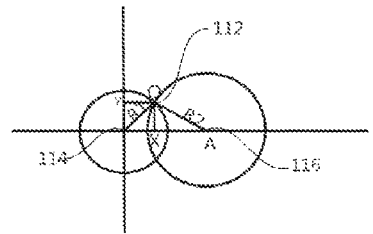
FIG. 10 illustrates a method of using triangulation to determine the location of a tag within a cargo space in accordance with the invention.

The RFID device location in the cargo space may be determined by measuring the distances from the RFID device 58 to each of the internal antennas 46, 48, 50, 52 by triangulation as illustrated in FIG. 10 and described below. Triangulation may be used in the same manner whenever there are at least three antennas which receive signals generated by the presence of an RFID device in a monitored cargo space. If at least four antennas are used, then the internal time delay in the RFID circuitry need not be known. This is similar to the techniques used for determining the location of a GPS receiver based on receptions from four satellites. Whenever GPS is mentioned herein, it is understood that it encompasses Glonass, Galileo, Compus or other similar satellite-based positioning systems.

Figure 5:
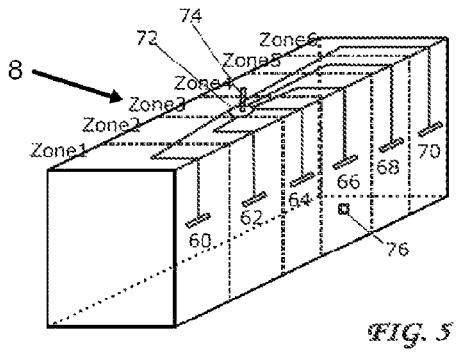
FIG. 5 illustrates an embodiment of a cargo space with multiple antennas which enable the position of a tag to be determined based on reception of signals by the antennas.

FIG. 5 illustrates an embodiment of a cargo space with multiple internal antennas 60, 62, 64, 66, 68, 70 connected to an antenna multiplexer 72 (such as the PE4261). The multiplexer 72 may be connected to an external antenna 74 outside of the cargo space for communications with an external interrogator such as illustrated in FIG. 5. As in the embodiment of FIG. 4, a transceiver may be connected between the multiplexer 72 and the outside antenna 74 for increasing the signal strength of the signals from the RFID device 76 or RFID devices which are within the cargo space. The RFID device location in the cargo space may be determined by measuring the signal strengths from the internal antennas 60, 62, 64, 66, 68, 70, whereby the antenna closest to the RFID device 76 will have the largest or strongest signal therefore the zone where the RFID device 76 is located in the cargo space may be determined.

When using multiple antennas on an asset and deriving the general location of the RFID device or RFID-device equipped object based on the signal strength, the antennas can be distributed or spaced apart along any single dimension of the asset, e.g., longitudinally for the shipping container as shown in FIG. 5. In this manner, the approximate longitudinal location of the RFID device or object equipped therewith could be determined. Of course, when two antennas provide signals having equal strength, it could be derived that the RFID device is situated approximately half-way between the antenna locations.

In one embodiment, the antennas are arranged along a longitudinal center line of the cargo space, e.g., down the center or side of a shipping trailer or container.

FIG. 6 illustrates a block diagram of an interrogator with a single antenna which may be used in the embodiments herein. Information from this interrogator may be displayed locally and/or sent over a communications link, such as a satellite, cell phone, smartphone, internet or equivalent link, to a remote location for processing, logging, re-transmission and/ or for any other purpose including theft determination. As such, in one embodiment of a method for monitoring a cargo container, a transmitter is arranged on the container and messages are periodically transmitted from the transmitter to a remote location according to a schedule of messages using the Internet or a smartphone, i.e., the schedule calls for a transmission at set times. The set times may be separated by a common time period, e.g., a message is transmitted every five minutes, or in a variable schedule, e.g., a message is transmitted at 5, 12, 18, 24, 36, 40, 43, 50 and 57 minutes past each hour. Theft of the container or contents of the container is determinable based on content of a message received at the remote location or based on lack of reception of a message according to the schedule. The schedule may be transmitted between the remote location and the vehicle or container-mounted transmitter, e.g., generated at the remote location and provided to the transmitter or vice versa.

The interrogator 78 includes a pair of oscillators 80, 82, a modulator 84 processing the output from oscillators 80, 82 and providing output to a power amplifier 86, and a circulator 88 connected to the power amplifier 86 and providing a signal for transmission by the antenna 90 with a signal being received by antenna 90 being directed through the circulator 88 to an amplifier 92. A phase detector 94 is connected to the oscillator 82, modulator 84 and amplifier 92 which performs a phase comparison between the signals transmitted and received via antenna 90. A microprocessor 96 is coupled to the modulator 84 and phase detector 94 which analyzes the phase comparison to determine information about a RFID device which returns a signal to the antenna 90. This information may be distance or range information, which may be provided to an external device and/or a display. Additionally or alternatively, it may be identification information, or information from any RFID device associated sensors.

The information may be derived using the known speed of the waves (speed of light) and the time for travel of the waves, since the distance between the antenna and the RFID-device is equal to one-half the speed multiplied by the total travel time.

FIG. 7 illustrates a block diagram of an interrogator with a single antenna similar to that shown in FIG. 6. Information from this interrogator may be displayed locally and/or sent over a communications link via a communications device 97 to a remote location as above. This embodiment of an interrogator shows a method for measuring the distance from the interrogator antenna to the antenna of an RFID device. The modulation used may be either amplitude or frequency; the phase detector may be of the phase/frequency type. An exemplifying calculation for amplitude modulation would involve determining the time for travel of the waves, which is equal to twice the distance between the antenna and the RFID-device (having a set maximum, for example, of 5 meters) divided by the speed of light.

FIG. 8 illustrates a block diagram of an interrogator with multiple antennas which may be used in embodiments herein. The block diagram is similar to that shown in FIG. 6 and the same reference numerals designate the same elements. However, in this embodiment, individual antennas are selected by a MUX 98 (which may be one designated in the literature as a PE4261). The MUX 98 controls the transmission and reception of signals via antennas 100, 102, 104. Any number of antennas may be provided. The PE4261 is limited to six antennas. Control of the MUX 98 may be achieved using the microprocessor 96 which is coupled thereto.

Information from this interrogator may be displayed locally and/or sent over a communications link to a remote location as described elsewhere herein. The information may be sent in the form of messages. A schedule or transmission rate of the messages may be varied based on a property of an item of cargo inside the container. A more important of valuable item may have a higher transmission rate than an item of lesser importance or value.

This embodiment of an interrogator shows a method for measuring the distance from the selected interrogator antenna to a tag antenna. The modulation may be amplitude, frequency or pulse; the phase detector may be of the phase/frequency type. Example calculations are shown for amplitude modulation. By using the distances from the antennas 100, 102, 104 to a tag, the location of the tag can be calculated by triangulation as shown in FIG. 10 and described below.

FIG. 9 illustrates three exemplary methods for deriving or harvesting electrical power for the operation of interrogators, multiplexers, transceivers or transmitters, as well as any other electricity consuming devices on the cargo container needed for the operation and/or for the purpose of gathering information about a tagged object in the cargo space. Such devices can be situated within the cargo space and/or in or on the structure defining the cargo space. These energy harvesting devices include solar panels 106 (shown in the top of the cargo container), a vibration power generator 108 (shown on a side of the container) and a magnetic field variation device 110 which generates electrical power based on variations in a magnetic field caused by movement of the container. Other energy harvesting devices, such as RF harvesters, can also be used.

FIG. 10 illustrates a method of using triangulation to determine the location of a typical tag 112 within a cargo space, which may be used in embodiments described herein. The exemplary tag location determination by triangulation is shown for two dimensions in the x, y plane but may be readily extended to a three-dimensional x, y, z space.

Let:
R1=The measured range from Antenna 114 to the tag 112.
R2=The measured range from Antenna 116 (a,0) to the tag 112.
a=known distance between antennas $$R1^2 := x^2 + y^2$$

$$y^2 := R1^2 - x^2 \quad \text{Eq (1)}$$

$$R2^2 := (x+a)^2 + y^2 \quad \text{Eq (2)}$$

substituting:

$$R2^2 := (x+a)^2 + R1^2 - x^2$$

$$R2^2 - R1^2 := x^2 + 2 \cdot a \cdot x + a^2 - x^2$$

$$2 \cdot a \cdot x := R2^2 - R1^2 - a^2$$

R1 and R2 are measured values and a is known by the distance between the antennas 114, 116 therefore; x can be computed. Once x is computed y can be found by substituting x into equation 1.

$$x := \frac{(R2^2 - R1^2 - a^2)}{2 \cdot a}$$

The location of the tag 112 in three dimensions can now be easily found by those skilled in the art.

The above analysis has been based on the time of arrival of a signal from a tag at the various antennas relative to the time of transmission and the known delay in the RFID tag between reception of the interrogation signal and transmission of the return signal by the tag. A set of equations can also be derived based on four antennas that provides the three dimensional location of the tag plus the time that the transmission was sent from the tag based on the time of arrival at the four antennas.

Other methods based on the angle of arrival can permit vectors to be drawn that pass through the tag location and then based on the calculation of the intersection of these vectors, the location of the tag can be found. Information about this technique is disclosed, for example, in Z. Wen, L. Li, and P. Wei "Fast Direction Using Modified Pseudocovariance Matrix", IEEE Transactions on Antennas and Propagation, Vol 54, No. 12, December 2006, and articles referenced therein.

An alternate approach is for the antennas to send short pulses which all of the tags would hear and record the times of arrival. The recorded arrival times would then be sent back to the interrogator from which the interrogator processor could determine the location of a tag based on the pattern of signals that the tag received. Each antenna could append an ID so that the tag could record the tag signal correspondence. These techniques can be based on relative times or on absolute time. The latter could be determined by a variety of methods including syncing the clock on each tag with the interrogator clock or, alternately, recording the time of arrival from at least four antennas.

Another method of determining the location of a tag is to enable the tag to either receive or transmit light or ultrasound. In the latter case, the tag would emit an ultrasonic pulse when it receives an RF pulse and listeners distributed around the cargo space would receive each ultrasonic pulse at a different time and thereby know, or enable a determination of, the distance to the tag. If there are three listeners and the time that the interrogation pulse was sent is known, then the tag location is known based on the known location of the listeners since the speed of sound is much slower than the speed of light.

The methods and systems described above for interacting with RFID devices or tags are equally applicable for other types of tags or responsive devices including but not limited to various SAW devices, resonators and reflectors (e.g., corner cube or dihedral reflectors), such as disclosed in the patents and applications listed above. The information obtained by the methods and system in accordance with the invention which interact with these devices may be identification information and positional information. In the latter case, when tags are installed onto components of assets, such as items of cargo, their presence, positions and/or orientations can be determined and used to control other systems. Such systems include systems having an output which varies as a function of the presence, position and/or orientation of the components (which may correlate to the presence, position and/or orientation of items of cargo).

In a preferred embodiment, the asset is a vehicle and one or more components are equipped with RFID devices. The interrogator controls transmission of RF signals from the antennas to cause these RFID devices to generate return signals. Analysis of these return signals by a processor associated with the interrogator can be used to derive information about the components. In this regard, reference is made to the disclosure of U.S. Pat. No. 6,820,897 which is directed to, among other things, the use of resonators arranged on vehicular components.

Additional variations of any of the embodiments of the methods and systems described above include the ability of the interrogator and/or antenna multiplexer to transmit signals from the RFID devices and/or information derived from the RFID devices and any sensors associated therewith to one or more locations or sites remote from the asset containing the RFID device. This allows remote monitoring of assets and the contents of such assets. Additionally, one or more processors on the trailer can process the information returned by the RFID devices or sensors and transmit a message, which may be encrypted and/or non-spoofable, to a remote site that indicates that all is OK or that there has been an event, such as a theft or attempted theft, requiring action by the remote site. Encryption of the messages may be by any known means in the art.

The presence of an interrogator on the same frame or structure which defines a space into which RFID devices or objects equipped with RFID devices reside greatly simplifies the ability to scan spaces of these frames or structures. The objects equipped with the RFID devices may include sensors. In addition, such sensors may be arranged to be independently interrogated by the interrogator which would thus interrogate the RFID devices and the sensors. These sensors may be temperature, optical, flow, humidity, chemical, biochemical, current, voltage, magnetic field, electric field, force, acceleration, velocity, displacement, position, vibration, acoustic, ultrasonic, radiation, charge, viscosity, density, electrical resistance, electrical impedance, electrical capacitance, electrical inductance, opacity, turbidity and pressure or other sensors.

The methods and systems described above can also be used to determine the location of RFID devices exterior and proximate to a cargo space, on or in another part of the vehicle containing the interrogator.

The power transmitted by the antennas may be higher in view of the transmission of the radio frequency signals into a closed cargo space. In this regard, transmission rules by the FCC may not apply within an enclosed volume with regard to frequencies or power especially if the walls of the container block the transmission of the signals out of the container.

The invention is also applicable to the placement of RFID device on luggage or baggage which is placed on airplanes. In this case, a passenger and others can always locate their baggage, provided they have an interrogator to determine the location of each passenger's luggage. This permits airline personnel to locate particular baggage within a plane for removal, for example, if the owning passenger is not on board. The system can thus detect and locate luggage and baggage, or other objects, after it is in a vehicle equipped with an interrogator.

Another feature of some embodiments of the invention is the use of smart antennas and a single interrogator or reader for use in determining the location of an RFID device or object equipped therewith. The method and system can be designed and configured to use minimal energy to achieve this location-determination.

The RFID devices in any of the embodiments herein may utilize an RFID switch, or other technique, to limit transmissions especially once a transmission has been recorded. In this manner simultaneous and potentially conflicting signals from multiple tags can be controlled.

Devices similar to RFID devices can be designed to transmit MIR (Micropower Impulse Radar) pulses for location purposes. Such pulses can be coded to provide sensor and ID information. Such a system can provide for a longer range transmission and, due to the multiple frequencies involved, can provide for greater penetration through surrounding objects that might otherwise block a normal RFID signal. Such an MIR-based system can also operate at very low energy levels yielding many years of operation between battery charging or battery changing. Additionally, they are unexpected transmitters operating in a spread spectrum mode and thus very difficult to jam. Such devices can be very useful for locating stolen trailers by drones etc. as discussed below.

In one embodiment, transmission via the antennas is based on the location of the antennas. Thus, the interrogator can control the antennas to transmit as a function of the location which is known to the interrogator, or the processor which controls the interrogator. This can be used to minimize signal overlap or collisions.

Since the best position to place antennas on a shipping container or frame of another asset including an interior, object-receiving space, is not always known in advance, a process can be implemented to find the best location for the antennas. This process may entail arranging a large number of antennas on the asset and conducting tests to determining the position of RFID devices in the space. Antennas are removed in stages and more tests conducted until the optimum number and position of antennas for the space which provides an acceptable accuracy is determined.

RFID devices can be used in combination with SAW devices and other wireless sensors. Many sensors are now in vehicles and many more will be installed. The following disclosure is primarily concerned with wireless sensors which can be based on MEMS, SAW and/or RFID technologies. Such vehicle sensors include tire pressure, temperature and acceleration monitoring sensors; weight or load measuring sensors; switches; vehicle temperature, acceleration, angular position, angular rate, angular acceleration sensors; proximity; rollover; occupant presence; humidity; presence of fluids or gases; strain; road condition and friction, chemical sensors and other similar sensors providing information to a vehicle system, vehicle operator and/or external site. The sensors can provide information about the vehicle and/or its interior and/or exterior environment, about individual components, systems, vehicle occupants, subsystems, and/or about the roadway, ambient atmosphere, travel conditions and external objects. Any of this information can be useful depending on the transportation mode, cargo, vehicle location etc. for eliminating cargo theft, for example.

For wireless sensors, one or more interrogators can be used each having one or more antennas that transmit energy at radio frequency, or other electromagnetic frequencies, to the sensors and receive modulated frequency signals from the sensors containing sensor and/or identification information. One interrogator can be used for sensing multiple switches, sensors or other devices. For example, an interrogator may transmit a chirp form of energy at 905 MHz to 925 MHz, or alternately a series of one or more discrete frequencies, to a variety of sensors located within and/or in the vicinity of the vehicle. These sensors may be of the RFID electronic type and/or of the surface acoustic wave (SAW) type or a combination thereof. In the electronic type, information can be returned immediately to the interrogator in the form of a modulated backscatter RF signal. In the case of SAW devices, the information can be returned after a delay. RFID tags may also exhibit a delay due to the charging of the on tag energy storage device. One sensor can respond in both the electronic (either RFID or backscatter) and SAW-delayed modes.

When multiple sensors are interrogated using the same technology, the returned signals from the various sensors can be time, code, space or frequency multiplexed. For example, for the case of the SAW technology, each sensor can be provided with a different delay or a different code. Alternately, each sensor can be designed to respond only to a single frequency or several frequencies. The radio frequency can be amplitude, code, pulse or frequency modulated. Space multiplexing can be achieved through the use of two or more antennas and correlating the received signals to isolate signals based on direction.

In many cases, the sensors will respond with an identification signal followed by or preceded by information relating to the sensed value, state and/or property. In the case of a SAW-based or RFID-based switch, for example, the returned signal may indicate that the switch is either on or off. Alternately or additionally, an RFID based switch can be associated with a sensor and turned on or off based on an identification code or a frequency sent from the interrogator permitting a particular sensor or class of sensors to be selected. An RFID based switch can be used to indicate that the trailer door is open or closed and/or that there is cargo loading some portion of the trailer floor, for example.

SAW devices have been used for sensing many parameters including devices for chemical and biological sensing and materials characterization in both the gas and liquid phase. They also are used for measuring pressure, strain, temperature, acceleration, angular rate and other physical states of the trailer and/or environment. Wireless sensors can also comprise MEMS devices that are capable of chemical and/or biological sensing, for example. One such device includes an array of beams etched into a chip with the beams coated with a variety of reactants that absorb various chemical and/or biological species. Typically, each beam has a different coating. The mass absorbed by the reactants varies the natural frequency of a beam which can then be sensed periodically when the beams on the MEMS device are excited electrically. The pattern of frequency changes allows the determination of the presence and/or concentration of the chemical and/or biological species. Such a device has been used, for example, to determine the chemical make-up a perfume. Such a device has applicability to monitoring of vehicles, and specifically compartments or interior spaces therein, to determine the presence of various chemical or biological species and thus warn authorities that a shipping container contains such species, for example. Within a tractor, such a device can be used to test for carbon monoxide or alcohol vapors in the cabin air, for example. Within a cargo compartment such a device can detect for carbon dioxide indicative of the presence of an unexpected person or other animal. Such a device can communicate with a controller either by wires or wirelessly and on to a remote site.

Economies are achieved by using a single interrogator or even a small number of interrogators to interrogate many types of devices. For example, a single interrogator may monitor tire pressure and temperature, the weight of an occupying item of the seat, the position of the seat and seatback, the weight of cargo in a portion of the trailer, as well as a variety of switches. Such an interrogator may use one or multiple antennas and when multiple antennas are used, may switch between the antennas depending on what is being monitored.

Similarly, the same or a different interrogator can be used to monitor various components of the vehicle's safety system, vehicle acceleration sensors, vehicle angular position, velocity and acceleration sensors, related to both frontal, side and/or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

Some specific examples of the use of interrogators and responsive devices will now be described.

The antennas used for interrogating the vehicle tire pressure transducers can be located outside of the vehicle passenger compartment. For many other transducers to be sensed the antennas can be located at various positions within passenger compartment or trailer. At least one invention herein contemplates, therefore, a series of different antenna systems, which can be electronically switched by the interrogator circuitry. Alternately, in some cases, all of the antennas can be left connected and total transmitted power increased.

There are several applications for weight or load measuring devices in a vehicle including the vehicle suspension system and seat weight sensors for use with automobile safety systems or unauthorized occupant presence detectors. As described in U.S. Pat. Nos. 4,096,740, 4,623,813, 5,585,571, 5,663,531, 5,821,425 and 5,910,647 and International Publication No. WO 00/65320(A1), SAW devices are appropriate candidates for such weight measurement systems, although in some cases RFID systems can also be used with an associated sensor such as a strain gage. In this case, the surface acoustic wave on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends or other convenient geometry which permits the strain, load or displacement in the seat structure to be determined. A SAW or other strain or displacement or load measuring device can be mounted to the center unthreaded section of the stud, for the double threaded stud case, and the stud can be attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud other than for an antenna.

Generally, there is an RFID implementation, which may contain an associated sensor that corresponds to each SAW implementation. Therefore, where SAW is used herein the equivalent RFID design will also be meant where appropriate.

Although a preferred method for using the invention is to interrogate each SAW device using wireless mechanisms, in some cases, it may be desirable to supply power to and/or obtain information from one or more of the SAW devices using wires. As such, the wires would be an optional feature.

There are many applications for weight sensors as described herein to the transportation of cargo and the prevention of theft. If an unauthorized person resides within the tractor, for example, a hijacking may be in progress. Other applications of weight measuring systems for a truck tractor and trailer include measuring the weight of the fuel tank or other containers of fluid to determine the quantity of fluid contained therein as discussed below and/or of the cargo itself.

Devices based on RFID or SAW technology can be used as switches in a vehicle as described in U.S. Pat. Nos. 6,078,252, 6,144,288 and 6,748,797. There are many ways that this can be accomplished. A switch can be used to connect an antenna to either an RFID electronic device or to a SAW device. This requires contacts to be closed by the switch activation. An alternate approach is to use pressure from an occupant's finger, for example, to alter the properties of the acoustic wave on the SAW material much as in a SAW touch screen. The properties that can be modified include the amplitude of the acoustic wave, and its phase, and/or the time delay or an external impedance connected to one of the SAW reflectors as disclosed in U.S. Pat. No. 6,084,503. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of a tractor and trailer to measure cargo presence and door or other opening status, for example, without the need for wires. Since wires and connectors are the cause of most warranty repairs in an automobile, not only is the cost of switches substantially reduced but also the reliability of the vehicle electrical system is substantially improved.

The interrogation of switches can take place with moderate frequency such as once every 100 milliseconds. Either through the use of different frequencies or different delays, a large number of switches can be time, code, space and/or frequency multiplexed to permit separation of the signals obtained by the interrogator. Alternately, an RF activated switch on some or all of the sensors can be used as discussed elsewhere herein.

Temperature measurement is another field in which SAW technology can be applied and the invention encompasses several embodiments of SAW temperature sensors.

U.S. Pat. No. 4,249,418 is one of many examples of prior art SAW temperature sensors. Temperature sensors are commonly used within vehicles and many more applications might exist if a low cost wireless temperature sensor is available such as disclosed herein. The SAW technology can be used for such temperature sensing tasks. These tasks include measuring the vehicle coolant temperature, air temperature within passenger compartment or trailer at multiple locations, seat temperature for use in conjunction with seat warming and cooling systems, outside temperatures and perhaps tire surface temperatures to provide early warning to operators of road freezing conditions. One example, is to provide air temperature sensors in the compartment in the vicinity of ultrasonic transducers used in cargo sensing systems as described in U.S. Pat. Nos. 7,629,899, and 7,663,502, since the speed of sound in the air varies by approximately 20% from −40° C. to 85° C. Current ultrasonic cargo sensor systems may not measure or compensate for this change in the speed of sound with the effect of reducing the accuracy of the systems at the temperature extremes. Through the judicious placement of SAW temperature sensors in the vehicle, the trailer air temperature can be accurately estimated and the information provided wirelessly to the ultrasonic sensor system thereby permitting corrections to be made for the change in the speed of sound.

Since the road can be either a source or a sink of thermal energy, strategically placed sensors that measure the surface temperature of a tire can also be used to provide an estimate of road temperature.

An alternate method to the electronic RFID tag is to simply use a radar or lidar reflector and measure the time-of-flight to the reflector and back. The reflector can even be made of a series of reflecting surfaces displaced from each other to achieve some simple coding. It should be understood that RFID antennas can be similarly configured. An improvement would be to polarize the radiation and use a reflector that rotates the polarization angle, known as a dihedral reflector, allowing the reflector to be more easily found among other reflecting objects.

Figure 11:
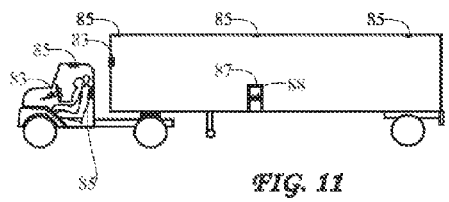
FIG. 11 is a cutaway view of a vehicle showing possible mounting locations for vehicle interior cameras, light detectors, microphones, accelerometers, motion sensors, temperature, humidity, carbon dioxide, carbon monoxide, alcohol or other chemical or physical property measuring sensors.

FIG. 11 illustrates a tractor passenger compartment and trailer with multiple SAW or RFID temperature sensors 85. SAW temperature sensors can be distributed throughout the compartment and trailer as shown. These sensors, which can be independently coded with different IDs and/or different delays, can provide an accurate measurement of the temperature distribution within the vehicle and trailer interior. RFID switches can also be used to isolate one device from another. Such a system can be used to monitor the temperature at various parts of the tractor and trailer and to sound an alarm if the temperature anywhere exceeds preset limits. If the cargo sensor system is based on ultrasonics, then the temperature measurement system can be used to correct the ultrasonic cargo sensor system for the speed of sound within the trailer. Without such a correction, the error in the sensing system can be as large as about 20 percent. This similarly applies if ultrasonic occupant sensors are used within either the tractor or trailer.

The wired or wireless temperature or other sensors 85 provide the temperature and/or other measurements at their mounting location to one or more processors 83 via an interrogator or wires with the processor unit 83 including appropriate control algorithms for controlling the heating and air conditioning system, for example, or for creating a signal if the temperature exceeds certain present limits based on the detected temperatures. The processor units 83 can control, e.g., which vents in the vehicle are open and closed, the flow rate through vents and the temperature of air passing through the vents. In general, the processor unit 83 can control whatever adjustable components are present or form part of the heating and air conditioning system, create an alarm or notify a remote site.

All of the elements of the system which adjusts or controls the vehicle components in any of the embodiments described herein, i.e., the sensors, processing unit and reactive system which is controlled by the processing unit based on the data sensed by the sensors, can be arranged within the vehicle. They could be fixed to the frame of the vehicle, and/or arranged in an interior defined by the frame, with the sensor assemblies (the sensor and wireless transmission component or wires associated therewith) fixed relative to the processor unit or receiver which can contain the antenna capable of receiving the signals being transmitted wirelessly from the wireless transmission component of the sensor assemblies. In some embodiments, the sensor assemblies are arranged on parts of the vehicle which are not fixed to the frame or fixed relative to the processor unit or receiver, such as on the tires, but in other embodiments, the sensor assemblies are arranged only on parts fixed to the frame. This fixed relationship between the sensor assemblies and the receiver(s) associated with the processing unit allows for proper positioning of the receivers to communicate with all designated sensor assemblies.

In FIG. 11, a cargo item 87 is illustrated in the trailer. The cargo item 87 can have one or more attached RFID tags or SAW tags 88. The RFID and SAW tag(s) can be constructed to provide information particular to the cargo item including ID, temperature, and/or any other measurable parameter. Also, the mere transmission of waves from the RFID or SAW tag(s) on the cargo item 87 would be indicative of the presence of the item of cargo. The RFID and SAW tag(s) can also be constructed to provide information about the location or orientation of the cargo item 87. Such information about the presence of the cargo item and its location or orientation can be used in the control of security systems, the heating or air conditioning system, and other systems within the vehicle.

Figure 12:
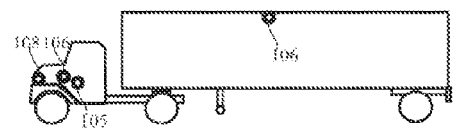
FIG. 12 is a schematic of a vehicle with several accelerometers and/or gyroscopes at preferred locations in the vehicle.

FIG. 12 illustrates the placement of a variety of sensors, primarily accelerometers and/or gyroscopes, which can be used to diagnose the state of the tractor and trailer itself. Sensor 105 can be located in the side door. Typically, there can be two such sensors one on either side of the vehicle. Sensor 106 is shown mounted in the trailer and can be an Inertial Measurement Unit (IMU) typically containing three accelerometers and three MEMS gyroscopes. It will monitor the state of the trailer independent of the tractor. Sensor 107 is shown in a typical mounting location in the compartment on the firewall or tunnel and is the non-crush zone mounted crash sensor. It also can have multiple accelerometers or gyroscopes and can be an IMU. Sensor 108, which can be also multiple sensors, is shown in a typical mounting location forward in the crush zone of the vehicle. An IMU would serve basically the same functions at lower installation cost. The IMU can be coupled with a vehicle mounted GPS which can be used in conjunction with a Kalman Filter, Neural Network or other structure or method to calibrate the accelerometers and gyroscopes in the IMU.

In general, sensors 105-108 provide a measurement of the state of the tractor and trailer, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 105-108 above is merely exemplary and is not intended to limit the form of the sensor or its function. Thus, these sensors may or may not be SAW or RFID sensors and may be powered or unpowered and may transmit their information through a wire harness, a safety or other bus or wirelessly.

Each sensor 105-108 may be single axis, double axis or triaxial accelerometers and/or gyroscopes typically of the MEMS type. One or more can be IMUs and one or more can use a GPS-based calibration system. GPS here is defined herein to include any and all GNSS satellite systems. These sensors 105-108 can either be wired to the central control module or processor directly wherein they would receive power and transmit information, or they could be connected onto the vehicle bus or, in some cases, using RFID, SAW or similar technology, the sensors can be wireless and would receive their power through RF from one or more interrogators located in the vehicle. In this case, the interrogators can be connected either to the vehicle bus or directly to control module. Alternately, an inductive or capacitive power and/or information transfer system can be used.

Figure 17:
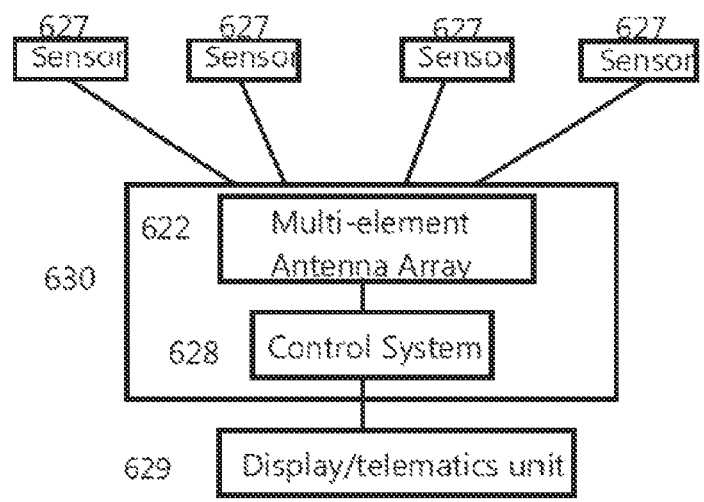
FIG. 17 is a schematic of the system of multiple sensors.

A general system for obtaining information about a vehicle or a component thereof or therein is illustrated in FIG. 17 and includes multiple sensors 627 which may be arranged at specific locations on the vehicle, on specific components of the vehicle, on objects temporarily placed in the vehicle such as cargo pallets, or on or in any other object in or on the vehicle or in its vicinity about which information is desired. The sensors 627 may be passive or active SAW or RFID sensors or other sensors which generate a return signal upon the detection of a transmitted radio frequency signal. A single multi-element antenna array 622 is mounted on the vehicle, in either a central location or in an offset location, to provide the radio frequency signals which cause the sensors 627 to generate the return signals. In either case, the antenna array 622 is mounted between the sides of the vehicle and includes at least one antenna element directed to each side in order that the antenna array 622 is able to communicate with sensors 627 on both sides of the vehicle, i.e., the right and left sides of the vehicle. Thus, the single antenna array 622 mounted between the sides of the vehicle is able to communicate with sensors throughout the vehicle, including on both sides of the vehicle.

A control system 628 is coupled to the antenna array 622 and controls the antennas in the array 622 to be operative as necessary to enable reception of return signals from the sensors 627. There are several ways for the control system 628 to control the array 622, including to cause the antennas to be alternately switched on in order to sequentially transmit the RF signals therefrom and receive the return signals from the sensors 627 and to cause the antennas to transmit the RF signals simultaneously and space the return signals from the sensors 627 via a delay line in circuitry from each antennas such that each return signal is spaced in time in a known manner without requiring switching of the antennas. The control system can also be used to control a smart antenna array.

The control system 628 also processes the return signals to provide information about the vehicle or the component or cargo. The processing of the return signals can be any known processing including the use of pattern recognition techniques, neural networks, fuzzy systems and the like.

The antenna array 622 and control system 628 can be housed in a common antenna array housing 630.

Once the information about the vehicle or the component is known, it is directed to a display/telematics/adjustment unit or processor 629 where the information can be displayed on a display 629 to the driver, sent to a remote location for analysis via a telematics unit 629 and/or used to control or adjust a component on, in or near the vehicle. The information can be processed by a processor on the trailer or tractor prior to transmission to a remote site and the transmitted message can be short and coded that there have or have not been events that may concern the security of the cargo. The principles and devices disclosed can be applied to the monitoring of a wide variety of components on and off a vehicle and the vehicle is taken in the most general sense and can be of any of the types listed above.

The message can be sent as a text message such as by SMS or equivalent. The telematics unit 629 is configured with the appropriate hardware/software to convert a command to send a message or signal received from the control system 628 into a message to be sent using SMS. The recipient of the message can program their receiving device to receive the message and accord it priority or process it in whatever manner their receiving device allows for. A method for monitoring a cargo container in accordance with the invention may be based on the transmission of SMS messages. Such a method, and a system that includes structure to effect the method, includes arranging a transmitter on the container and that is configured to transmit text messages using SMS protocol and periodically transmitting text messages from the transmitter to a remote location according to a schedule of messages. This schedule, and variations thereof, is described above and the message schedule or transmission rate may be modified as described elsewhere herein. As such, theft of the container or contents of the container is determinable based on content of a message received at the remote location or based on lack of reception of a message according to the schedule. In one particular embodiment, data about the container or contents of the container is periodically obtained using at least one sensor and the text messages are transmitted based on the sensor-obtained data so that data about the container or contents of the container is obtained at a different frequency than the transmission frequency or upon reception of a command from the remote location.

In summary, the use of devices capable of reading or scanning RFID devices when situated in compartments or spaces defined by vehicles or other mobile assets provides significant advantages. Among other things, it allows for the determination of the identification and location of the RFID devices and thus objects equipped with such RFID devices, and with a communications or telematics unit coupled to the interrogator, it allows for communication of that information off of the vehicle, i.e., to one or more remote sites. The overall system identifies the RFID device if it generates a unique identification code, which is usually the case, and thus can generate a transmission to the remote site containing an identification of an object in a space of a mobile asset. Most importantly the transmission can contain information about the security of the cargo, of an item of cargo or of the entire shipment. With the foregoing system, it is possible at the remote site to locate and monitor the RFID-equipped object.

Alternative to or in addition to the communication to a remote site, the interrogator could transmit or otherwise provide the signal with an identification of the object to another system on the vehicle itself. In this manner, someone looking for an RFID-equipped object in a space could easily determine its location, such as a package delivery driver looking for a specific package in a truck or an airline worker looking for a specific passenger's luggage. This is particularly important when the theft of a particular item is of concern and the item is small but valuable.

Referring now to FIGS. 18-21, additional aspects of the monitoring of interior contents of a shipping container, trailer, boat, plane, etc. will now be described. Generally, these contents can be removed from the vehicle and thus are usually not directly attached to a frame of the vehicle which defines the object-containing interior. Such a frame may have the form of a truck, a truck trailer, a shipping container, a boat or ship, an airplane or another vehicle.

Consider now as a non-limiting example a standard shipping container that is used for shipping cargo by boat, trailer, or railroad, such cargo being usually inanimate, i.e., not alive. Such containers are nominally 8' w×8' h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other and frequently the same devices are used to both transmit and receive. Due to the long distance that the ultrasound waves must travel especially in the 48 foot container, it is frequently desirable to repeat the send and receive sequence several times and to add or average the results. This has the effect of improving the signal to noise ratio. The system disclosed herein and in the related patents and applications is able to achieve such long sensing distances due to the principles disclosed in those related patent. Competitive systems that are now beginning to enter the market have much shorter sensing distances and thus a key invention herein is the ability to achieve sensing distances in excess of 20 feet.

In many cases several transducers are used for monitoring the vehicle such as a container that typically point in slightly different directions. This need not be the case and a movable mounting is also contemplated where the motion is accomplished by any convenient method such as a motor, etc.

Figure 18:
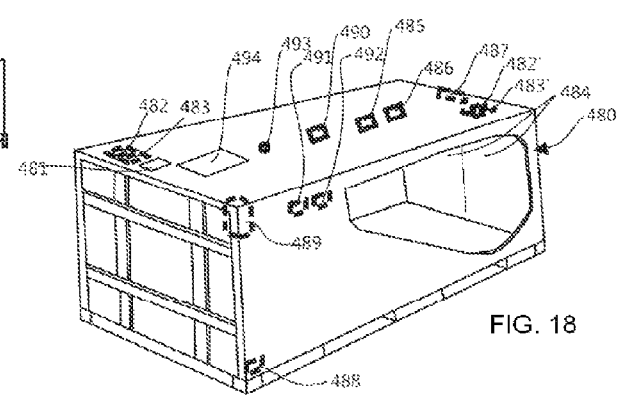
FIG. 18 is a perspective view showing a shipping container including one embodiment of the monitoring system in accordance with the present invention.

Referring to FIG. 18, a container 480 is shown including an interior sensor system 481 arranged to obtain information about contents in the interior of the container 480. The interior sensor system includes a wave transmitter 482 mounted at one end of the container 480 and which operatively transmits waves into the interior of the container 480 and a wave receiver 483 mounted adjacent the wave transmitter 482 and which operatively receives waves from the interior of the container 480. For the purposes of this discussion these waves can be either electromagnetic or ultrasonic. As shown, the transmitter 482 and receiver 483 are adjacent one another but such a positioning is not intended to limit the invention. The transmitter 482 and receiver 483 can be formed as a single transducer or may be spaced apart from one another. Multiple pairs of transmitter/receivers can also be provided, for example transmitter 482' and receiver 483' are located at an opposite end of the container 480 proximate the doors 484.

The interior sensor system 481 includes a processor coupled to the receiver 483, and optionally the transmitter 482, and which is resident on the container 480, for example, in the housing of the receiver 483 or in the housing of a communication system 485. The processor is programmed to compare waves received by each receiver 483, 483' at different times and analyze either the received waves individually or the received waves in comparison to or in relation to other received waves for the purpose of providing information about the contents in the interior of the container 480. The processor can employ pattern recognition techniques and, as discussed more fully below and in the patents referenced above, be designed to compensate for thermal gradients in the interior of the container 480. Information about the contents of the container 480 may comprise the presence or motion of objects in the interior. The processor may be associated with a memory unit which can store data on the location of the container 480 and the analysis of the data from the interior sensor system 481.

A cargo sensor based optics can be used in place of the system based on ultrasonics that has been described. Such a cargo sensor can take a variety of forms such as an imager coupled with appropriate software that is capable of segmenting items in images and identifying the contents within the container. In addition to this classification function, the image processing system can identify optical indices such as barcodes or other markings and interpret the codes into an identification of the item, for example. In addition to sensing the cargo status of the container, both the ultrasonic and optical systems can monitor for changes in the contents of the container or of various items of cargo within the container.

The container 480 also includes a location determining system 486 which monitors the location of the container 480. To this end, the location determining system can be any asset locator in the prior art, which typically include a GPS receiver, transmitter and appropriate electronic hardware and software to enable the position of the container 480 to be determined using GPS technology or other satellite or ground-based technology including those using the cell phone system or similar location based systems.

The communication system 485 is coupled to both the interior sensor system 481 and the location determining system 486 and transmits the information about the contents in the interior of the container 480 (obtained from the interior sensor system 481) and the location of the container 480 (obtained from the location determining system 486). This transmission may be to a remote facility wherein the information about the container 480 is stored, processed, counted, reviewed and/or monitored and/or retransmitted to another location, perhaps by way of the Internet, when a theft is determined to be occurring or has occurred, for example.

The container 480 can also include a door status sensor 487 arranged to detect when one or both doors 484 is/are opened or closed after having been opened. The door status sensor 487 may be an ultrasonic sensor which is positioned a fixed distance from the doors 484 and registers changes in the position of the doors 484. Alternately, other door status systems can be used such as those based on optical imagers, switches, magnetic sensors, light sensors or other technologies. The door status sensor 487 can be programmed to associate an increase in the distance between the sensor 487 and each of the doors 484 and a subsequent decrease in the distance between the sensor 487 and that door 484 as an opening and subsequent closing of that door 484. In the alternative, a latching device can be provided to detect latching of each door 484 upon its closure. The door status sensor 487 can be coupled to the interior sensor system 481, or at least to the transmitters 482,482' so that the transmitters 482,482' can be designed to transmit waves into the interior, or impose a variable electric field therein, of the container 480 only when the door status sensor 487 detects, for example, when at least one door 484 is closed after having been opened. For other purposes, the ultrasonic or optical sensors may be activated on opening of the door(s), or by any of a variety of intrusion sensors, in order to monitor the movement of objects into or out of the container, which might in turn be used to activate an RFID or bar code reading system or other object identification system. Thus, the interior sensor system 481 may be initiated to obtain information about the contents in the interior of the container 480 as a function of the status or movement of the door 484 or of any sensor which indicates that intrusion into the cargo space has occurred.

When the ultrasonic transducers, electric field, or optical sensors, are first installed into the container 480 and the doors 484 closed, an initial pulse transmission can be initiated and the received signal stored to provide stored data that is representative of an empty container. To initiate the pulse transmission, an initiation device or function is provided in the interior sensor system 481, e.g., the door status sensor 487. At a subsequent time when contents have been added to the container (as possibly reflected in the opening and closing of the doors 484 as detected by the door status sensor 487), the ultrasonic transducers can be commanded to again issue a few cycles of ultrasound and record the reflections. If the second pattern is subtracted from the first pattern, or otherwise compared, in the processor the existence of additional contents in the container 480 will cause the signal to change, which thus causes the differential signal to change and the added contents detected. In an ultrasonic system a vector of data is typically obtained for each cycle. Vector as used herein with ultrasonic systems will generally mean a linear array of data values obtained by rectifying, taking the envelope and digitizing the returned signal as received by the transducer or other digital representation comprising at least a part of the returned signal. A similar system can be used when an optical or electric field system is used.

Another use of the door status sensor 487 is to cause storage of data about the contents in the container 480 as a function of opening and closing of the doors 484. Thus, the memory unit would store data indicating each time the doors 484 are opened and closed, or another intrusion was detected, and the contents of the container 480 before and after each opening and closing. This will provide information about the loading and unloading of the contents from the container 480. Data about the contents of the container 480 may be obtained in any of the ways described herein, including using sensor systems 491 placed on each object in the interior of the container 480.

When a container 480 is exposed to sunlight on its exterior top, a stable thermal gradient can occur inside the container 480 where the top of the container 480 near the ceiling is at a significantly higher temperature than the bottom of the container 480. This thermal gradient changes the density of the gas inside the container causing it to act as a lens to ultrasound that diffracts or bends the ultrasonic waves and can significantly affect the signals sensed by the receiver portions 483, 483' of the transducers. Thus, the vector of sensed data when the container is at a single uniform temperature will look significantly different from the vector of sensed data acquired within the same container when thermal gradients are present.

It is even possible for currents of heated air to occur within a container 480 if a side of the container is exposed to sunlight, for example. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in above-referenced patents and patent applications through the use, for example, of a logarithmic compression circuit. There are other methods of minimizing the effect on the reflected wave magnitudes that will accomplish substantially the same result some of which are disclosed elsewhere herein.

When the complicating aspects of thermal gradients are taken into account when using an ultrasonic cargo monitoring system, a great deal of data must in many cases be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described for automobile interior monitoring in above-referenced patents and patent applications, and therefore this process is not repeated here.

Other kinds of interior monitoring systems can be used to determine and characterize the contents of a space such as a container. One example uses a scanner and photocell 488, as in a laser radar system, and can be mounted near the floor of the container 480 and operated to scan the space above the floor in a plane located, for example, 10 cm above the floor. Since the distance to a reflecting wall of the container 480 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 480. Categorization of the contents of the container 480 may involve the use of pattern recognition technologies. Other locations of such a scanning system are of course possible.

In both of these examples, relatively little can be learned about the contents of the container other than that something is present or that the container is empty. Frequently, this is all that is required. A more sophisticated system can make use of one or more imagers (for example cameras) 489 mounted near the ceiling of the container, for example. Such imagers can be provided with a strobe flash and then commanded to make an image of the trailer interior at appropriate times. The output from such an imager 489 can also be analyzed by a pattern recognition system such as a neural network or equivalent, to reduce the information to a few bytes that can be sent to a central location via an LEO or geostationary satellite, the Internet, or cell phone network with or without an SMS or GPRS or equivalent system for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container. Motion of objects within the container 480 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans.

In the system of FIG. 18, wires (not shown) are used to connect the various sensors and devices. It is contemplated that all of the units in the monitoring system can be coupled together wirelessly, using for example the Bluetooth, WI-FI, Wibree or other protocol. See Hunn, Nick "An Introduction to Wibree", EZURiO Ltd. Thus, any type or form of wired, wireless or combination network can be used to connect the sensors and other parts of the monitoring arrangement together on the asset.

If an inertial device 490 is also incorporated, such as the MEMSIC dual axis accelerometer, which provides information as to the accelerations of the container 480, then this relative motion can be determined by the processor and it can be ascertained whether this relative motion is caused by acceleration of the container 480, which may indicate loose cargo, and/or whether the motion is caused by the sensed occupying item. In latter case, a conclusion can perhaps be reached that container is occupied by a life form such as an animal or human.

Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Thus, any of the sensors described herein, e.g., chemical sensors, motion sensors and the like, can be placed on each or any item of cargo or object and connected by wires or wirelessly to a receiving unit which receives data obtained by such object-mounted sensors. Data obtained from the sensors may be communicated to a remote facility. Also, the obtaining of the data can be done periodically or triggered by any of the triggers described for obtaining data via the asset-mounted sensor systems. In some cases a sensor system on the cargo item itself can communicate directly to a remote site when a container resident system is not present or compromised.

Relative motion can also be sensed in some cases from outside of the container through the use of accelerometers, microphones or MIR (Micropower Impulse Radar). All such sensors regardless of where they are placed are contemplated herein and are part of contemplated embodiments of the present inventions.

Chemical sensors 491 based on surface acoustic wave (SAW), MEMS or other technology can in many cases be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals or biological agents. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container, or the atmosphere around an object in the interior of a container, much like a low power electronic nose. In some cases, it can be used to determine whether a carbon dioxide source such as a human is in the container, or in the object. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be developed. Thus, although heretofore not appreciated, SAW, MEMS or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Note, the use of any of the aforementioned SAW devices in connection within or on a vehicle for any purpose other than tire pressure and temperature monitoring or torque monitoring is new and contemplated by the inventions disclosed herein. Only a small number of examples are presented of the general application of the SAW, MEMS, or RFID, technology to vehicles.

Other sensors that can be designed to operate under very low power levels include microphones 492 and light sensors 493 or sensors sensitive to other frequencies in the electromagnetic spectrum or electric field sensors as the need arises. The light sensors 493 can be designed to cause activation of the interior sensor system 481 when the container is being switched from a dark condition (normally closed) to a light situation (when the door or other aperture is opened). A flashlight could also activate the light sensor 493.

Instead of one or more batteries or a tether to an external source providing power to the interior sensor system 481, the communication system 485 and the location determining system 486, solar power, or other energy harvesting apparatus, can be used. In this case, one or more solar panels 494 are attached to the upper wall of the container 480 (see FIG. 9) and electrically coupled to the various power-requiring components of the monitoring system. A battery can thus be eliminated or recharged or a capacitor recharged. Since the solar panel(s) 109 will not always be exposed to sunlight, a rechargeable battery or capacitor can be provided which is charged by the solar panel 109 when the solar panels are exposed to sunlight. A battery could also be provided in the event that the solar panel 109 does not receive sufficient light to power the components of the monitoring system. In a similar manner, power can temporarily be supplied by a vehicle such as a tractor either by a direct connection to the tractor power or through capacitive, inductive or RF coupling power transmission systems. As above an ultracapacitor can be used instead of, or in addition to, a battery and energy harvesting can be used if there is a source of energy such as light or vibration in the environment. It is also possible to use a wind turbine that is driven when the vehicle is in motion as an energy harvesting system.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

Immediately above, monitoring of the interior of the container is described. If the container is idle and in a secure area or empty, there may not the need to frequently monitor the status of the container interior or exterior until some event happens. Thus, all monitoring systems on the container can be placed in the sleep mode until some event such as a motion or vibration of the container or light inside the container is sensed. Other wakeup events could include the opening of the doors, the sensing of sound or a change in the interior temperature of the container or a chamber within the container above a reference level, for example. When any of these chosen events occurs, the system can be instructed to change the monitoring rate and to immediately transmit a signal to a satellite, SMS or another communication system, or respond to a SMS or satellite-initiated signal for some LEO-based, or geocentric or cell phone systems, for example. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use. Care must be exercised when relying on an event to activate the monitoring system since a thief can disable the communication system if it is discovered. If the thief suspects that such a system is present then he can shield or jam the transmitting frequencies and thus render the communication system ineffectual. For this reason a system that operates on the absence of a received transmission, as discussed below, is preferred.

Figure 19:
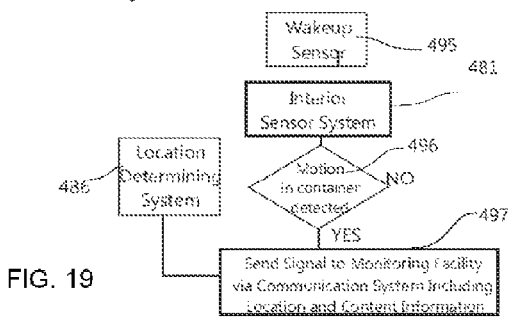
FIG. 19 is a flow chart showing one manner in which a container is monitored in accordance with the invention.

FIG. 19 shows a flowchart of the manner in which container 480 may be monitored by personnel or a computer program at a remote facility for the purpose of detecting unauthorized entry into the container and possible theft of the contents of the container 480. Initially, the wakeup sensor 495 detects motion, sound, light or vibration including motion of the doors 484, or any other change of the condition of the container 480 from a stationary or expected position. The wakeup sensor 495 can be designed to provide a signal indicative of motion only after a fixed time delay, i.e., a period of "sleep". In this manner, the wakeup sensor would not be activated repeatedly in traffic stop and go situations.

The wakeup sensor 495 initiates the interior sensor system 481 to perform the analysis of the contents in the interior of the container, e.g., send waves into the interior, receive waves and then process the received waves. If motion in the interior of the container is not detected at 496, then the interior sensor system 481 may be designed to continue to monitor the interior of the container, for example, by periodically re-sending waves into the interior of the container. If motion is detected at 496, then a signal (defined for this purpose to include a message) is sent at 497, such as by SMS or equivalent, to a monitoring facility via the communication system 485 and which includes the location of the container 480 obtained from the location determining system 486 or by the ID for a permanently fixed container or other asset, structure or storage facility. In this manner, if the motion is determined to deviate from the expected handling of the container 480, appropriate law enforcement personnel can be summoned to investigate as discussed in more detail elsewhere herein.

At any time when the interior sensor system 481 is monitoring the container 480, it can be configured to follow a message transmission schedule provided by a processor therein, to transmit messages in accordance with a predetermined schedule, e.g., at set minutes after each hour, or every say 15 minutes. This schedule may be varied, as discussed elsewhere herein, based on situations involving the container 480 or the contents therein. If an expected message is not received at the monitoring facility, an action may be undertaken to investigate the reason for the absence of a message according to the schedule, e.g., theft of the container, disabling of a transmitter that effects the signal transmission, etc.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used and if combined with a GPS receiver using, for example, a Kalman filter the device can be quite accurate. Any of these detected events can also signal that a hijacking is in progress.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo. An alternate method is to put weight sensors in the floor or as a mat on the floor of the vehicle. The mat design can use the bladder principles described above for weighing vehicle occupants using, in most cases, multiple chambers. Strain gages can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined and thus the load that the container contains. This is an alternate method of determining the contents of a container. If several (usually 3) accelerometers and several (usually 3) gyroscopes are used together in a single package then this is known as an inertial measurement unit. If a source of position is also known such as from a GPS system then the errors inherent in the IMU can be corrected using a Kalman filter, for example. The use of inertial or weight sensors can also indicate that a theft is underway if there are unexpected changes to the weight or weight distribution or accelerations indicative of motion of the container when the container is parked.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container. Usually when that is discovered it is too late and the theft has occurred. Door locks that require an electronic signal from a hand held transmitter to operate that are positioned inside of the trailer are effective deterrents to prevent a thief from stealing cargo from a trailer but do not stop the theft of the trailer itself. Once the thief has the trailer in his facility these locking systems are easily defeated.

Figure 20C:
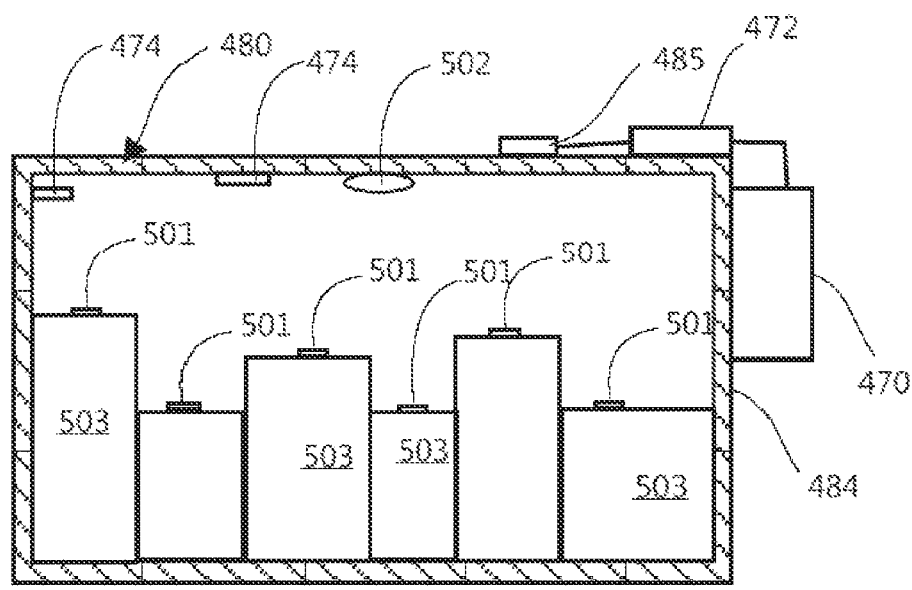
FIG. 20C is a cross-sectional view of a refrigerated container showing the use of a diagnostic module in a monitoring system and method in accordance with the invention.

Referring now to FIG. 20C, another application of monitoring the entire asset is to incorporate a diagnostic module 472 into the asset. Frequently, the asset may have operating parts, e.g., if it is a refrigerated and contains a refrigeration unit 470. To this end, sensors 474, e.g., temperature sensors, can be installed on the asset and monitored using pattern recognition techniques embodied in a processor of the diagnostic module 472, as disclosed in U.S. Pat. No. 5,809,437 and U.S. Pat. No. 6,175,787. As such, various sensors 474 can be placed on the container 480 and used to determine problems with the container 480 or refrigeration unit 470 which might cause it to operate abnormally, e.g., if the refrigeration unit were about to fail because of a refrigerant leak. Sensors 474 would indicate a higher temperature than expected if the refrigeration unit 470 were not operating normally. In this case, the information about the expected failure of the refrigeration unit 470 can be transmitted to a facility, via a link between the diagnostic module 472 and the communications system 485, and maintenance of the refrigeration unit can be scheduled, e.g., based on the location of the personnel capable of fixing or replacing the refrigeration unit 470 and the location of the asset which is also transmitted by the communications unit 485. Instead of using sensors 474 apart from the refrigeration unit 470, or other operating part whose operating is being diagnosed, to determine abnormal operation, it is also possible to connect the diagnostic module 472 to the refrigeration unit 470 so that it can directly monitor the operation thereof, this connection being represented by a line in FIG. 20C.

It is anticipated that whatever entity is monitoring a plurality of assets could strategically locate personnel capable of fixing or replacing abnormally operating parts of the asset to ensure secure carriage of the goods in the asset, e.g., perishable products. Thus, when the asset provides a signal indicative of abnormal operation and its location to the remote facility, personnel at the remote facility could dispatch the nearest personnel to attend to the asset.

It can also be desirable to detect unauthorized entry into container, which could be by cutting with a torch, or motorized saw, grinding, or blasting through the wall, ceiling, or floor of the container.

This event can be detected by one or more of the following methods:

1. A light sensor which measures any part of the visible or infrared part of the spectrum and is calibrated to the ambient light inside the container when the door is closed and which then triggers when light is detected above ambient levels and door is closed.

2. A vibration sensor or microphone attached to wall of container which triggers on vibrations or sound of an amplitude and/or frequency signature indicative of forced entry into the container. The duration of signal would also be a factor to consider. The algorithm could be derived from observations and tests or it could use a pattern recognition approach such as Neural Networks.

3. An infrared or carbon dioxide sensor or even a microphone could be used to detect human presence, although a carbon dioxide sensor would probably require a prolonged exposure.

4. Various motion sensors as discussed above can also be used, but would need to be resistant to triggering on motion typical of cargo transport. Thus a trained pattern recognition algorithm might be necessary. For theft sensing or prevention motion may only needs to be sensed when the container is at rest.

5. The Interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

Antennas.

Antennas can be a very important aspect to wireless sensors including, but not limited to, SAW and RFID wireless devices such as can be used in tire monitors, cargo monitors, weight sensors, door monitors, fluid level sensors and similar devices or sensors which monitor, detect, measure, determine or derive physical properties or characteristics of a component in or on the tractor or trailer or of an area near the vehicle. In many cases, the location of a SAW or RFID device needs to be determined such as when a device is used to locate the position of a movable item in or on a vehicle such as an item of cargo or a seat. In other cases, the particular device from a plurality of similar devices, such as a tire pressure and/or temperature monitor that is reporting, needs to be identified. Thus, a combination of antennas can be used and the time or arrival, angle of arrival, multipath signature or similar method used to identify the reporting device. One preferred method is derived from the theory of smart antennas whereby the signals from multiple antennas are combined to improve the signal-to-noise ratio of the incoming or outgoing signal in the presence of multipath effects, for example.

Additionally, since the signal level from a SAW or RFID device is frequently low, various techniques can be used to improve the signal-to-noise ratio as described below. Finally, at the frequencies frequently used such as 433 MHz, the antennas can become large and methods are needed to reduce their size. Some of these and other antenna considerations that can be used to improve the operation of SAW, RFID and similar wireless devices are described below.

Smart Antennas.

Some of the shortcomings in today's wireless products can be overcome by using smart antenna technology. A smart antenna is usually a multi-element antenna that significantly improves reception by intelligently combining the signals received at each antenna element and adjusting the antenna characteristics to optimize performance as the transmitter or receiver moves and the environment changes.

Smart antennas can suppress interfering signals, combat signal fading and increase signal range thereby increasing the performance and capacity of wireless systems.

A method of separating signals from multiple tires or container resident sensors, for example, is to use a smart antenna such as that manufactured by Motia. This particular Motia device is designed to operate at 433 MHz and to mitigate multipath signals at that frequency. The signals returning to the antennas from tires, for example, contain some multipath effects that, especially if the antennas are offset somewhat from the vehicle center, are different for each wheel. Since the adaptive formula will differ for each wheel, the signals can be separated (see "enhancing 802.11 WLANs through Smart Antennas", January 2004 available at motia.com). The following is taken from that paper.

"Antenna arrays can provide gain, combat multipath fading, and suppress interfering signals, thereby increasing both the performance and capacity of wireless systems. Smart antennas have been implemented in a wide variety of wireless systems, where they have been demonstrated to provide a large performance improvement. However, the various types of spatial processing techniques have different advantages and disadvantages in each type of system."

"This strategy permits the seamless integration of smart antenna technology with today's legacy WLAN chipset architecture. Since the 802.11 system uses time division duplexing (the same frequency is used for transmit and receive), smart antennas can be used for both transmit and receive, providing a gain on both uplink and downlink, using smart antennas on either the client or access point alone. Results show a 13 dB gain with a four element smart antenna over a single antenna system with the smart antenna on one side only, and an 18 dB gain with the smart antenna on both the client and access point. Thus, this "plug-and-play" adaptive array technology can provide greater range, average data rate increases per user, and better overall coverage.

"In the multibeam or phased array antenna, a beamformer forms several narrow beams, and a beam selector chooses the beam for reception that has the largest signal power. In the adaptive array, the signal is received by several antenna elements, each with similar antenna patterns, and the received signals are weighted and combined to form the output signal. The multibeam antenna is simpler to implement as the beamformer is fixed, with the beam selection only needed every few seconds for user movement, while the adaptive array must calculate the complex beamforming weights at least an order of magnitude faster than the fading rate, which can be several Hertz for pedestrian users."

"Finally, there is pattern diversity, the use of antenna elements with different patterns. The combination of these types of diversity permits the use of a large number of antennas even in a small form factor, such as a PCMCIA card or handset, with near ideal performance."

Through its adaptive beamforming technology, Motia has developed cost-effective smart antenna appliqués that vastly improve wireless performance in a wide variety of wireless applications including Wi-Fi that can be incorporated into wireless systems without major modifications to existing products. Although the Motia chipset has been applied to several communication applications, it has yet to be applied to all of the monitoring applications as disclosed in the current assignee's patents and pending patent applications, and in particular vehicular monitoring applications such as cargo and tire monitoring.

The smart antenna works by determining a set of factors or weights that are used to operate on the magnitude and/or phase of the signals from each antenna before the signals are combined. However, since the geometry of a vehicle tire relative to the centralized antenna array does not change much as the tire rotates, but is different for each wheel, the weights themselves contain the information as to which tire signal is being received. In fact, the weights can be chosen to optimize signal transmission from a particular tire thus providing a method of selectively interrogating each tire at the maximum antenna gain.

Distributed Load Monopole Antenna.

Antenna developments in the physics department at the University of Rhode Island have resulted in a new antenna technology. The antennas developed called DLM's (Distributed loaded monopole) are small efficient, wide bandwidth antennas. The simple design exhibits 50-ohm impedance and is easy to implement. They require only a direct feed from a coax cable and require no elaborate matching networks.

The prime advantage to this technology is a substantial reduction of the size of an antenna. Typically, the DLM antenna is about ⅓ the size of a normal dipole with only minor loss in efficiency. This is especially important for vehicle applications where space is always at a premium. Such antennas can be used for a variety of vehicle radar and communication applications as well for the monitoring of RFID, SAW and similar devices on a vehicle and especially for tire pressure, temperature, and/or acceleration monitoring as well as other monitoring purposes. Such applications have not previously been disclosed.

Although the DLM is being applied to several communication applications, it has yet to be applied to all of the monitoring applications as disclosed in the current assignee's patents and pending patent applications. The antenna gain that results and the ability to pack several antennas into a small package are attractive features of this technology.

Plasma Antenna.

The following disclosure was taken from "Markland Technologies—Gas Plasma".

"Plasma antenna technology employs ionized gas enclosed in a tube (or other enclosure) as the conducting element of an antenna. This is a fundamental change from traditional antenna design that generally employs solid metal wires as the conducting element. Ionized gas is an efficient conducting element with a number of important advantages. Since the gas is ionized only for the time of transmission or reception, "ringing" and associated effects of solid wire antenna design are eliminated. The design allows for extremely short pulses, important to many forms of digital communication and radars. The design further provides the opportunity to construct an antenna that can be compact and dynamically reconfigured for frequency, direction, bandwidth, gain and beamwidth. Plasma antenna technology will enable antennas to be designed that are efficient, low in weight and smaller in size than traditional solid wire antennas."

"When gas is electrically charged, or ionized to a plasma state it becomes conductive, allowing radio frequency (RF) signals to be transmitted or received. We employ ionized gas enclosed in a tube as the conducting element of an antenna. When the gas is not ionized, the antenna element ceases to exist. This is a fundamental change from traditional antenna design that generally employs solid metal wires as the conducting element. We believe our plasma antenna offers numerous advantages including stealth for military applications and higher digital performance in commercial applications. We also believe our technology can compete in many metal antenna applications."

"Initial studies have concluded that a plasma antenna's performance is equal to a copper wire antenna in every respect. Plasma antennas can be used for any transmission and/or modulation technique: continuous wave (CW), phase modulation, impulse, AM, FM, chirp, spread spectrum or other digital techniques. And the plasma antenna can be used over a large frequency range up to 20 GHz and employ a wide variety of gases (for example neon, argon, helium, krypton, mercury vapor and xenon). The same is true as to its value as a receive antenna."

"Plasma antenna technology has the following additional attributes:

1. No antenna ringing provides an improved signal to noise ratio and reduces multipath signal distortion.

2. Reduced radar cross section provides stealth due to the non-metallic elements. (This can make it difficult for thieves to locate on board transmitting units.)
3. Changes in the ion density can result in instantaneous changes in bandwidth over wide dynamic ranges.
4. After the gas is ionized, the plasma antenna has virtually no noise floor.
5. While in operation, a plasma antenna with a low ionization level can be decoupled from an adjacent high-frequency transmitter.
6. A circular scan can be performed electronically with no moving parts at a higher speed than traditional mechanical antenna structures.
7. It has been mathematically illustrated that by selecting the gases and changing ion density that the electrical aperture (or apparent footprint) of a plasma antenna can be made to perform on par with a metal counterpart having a larger physical size.
8. Our plasma antenna can transmit and receive from the same aperture provided the frequencies are widely separated.
9. Plasma resonance, impedance and electron charge density are all dynamically reconfigurable. Ionized gas antenna elements can be constructed and configured into an array that is dynamically reconfigurable for frequency, beamwidth, power, gain, polarization and directionality—on the fly.
10. A single dynamic antenna structure can use time multiplexing so that many RF subsystems can share one antenna resource reducing the number and size of antenna structures."

Several of the characteristics discussed above are of particular usefulness for several of the inventions herein including the absence of ringing, the ability to turn the antenna off after transmission and then immediately back on for reception, the ability to send very short pulses, the ability to alter the directionality of the antenna and to sweep thereby allowing one antenna to service multiple devices such as tires and to know which tire is responding. Additional advantages include, smaller size, the ability to work with chirp, spread spectrum and other digital technologies, improved signal to noise ratio, wide dynamic range, circular scanning without moving parts, and antenna sharing over differing frequencies, among others.

Some of the applications disclosed herein can use ultra wideband transceivers. UWB transceivers radiate most of the energy with its frequency centered on the physical length of the antenna. With the UWB connected to a plasma antenna, the center frequency of the UWB transceiver could be hopped or swept simultaneously.

A plasma antenna can solve the problem of multiple antennas by changing its electrical characteristic to match the function required—Time domain multiplexed. It can be used for high-gain antennas such as phase array, parabolic focus steering, log periodic, yogi, patch quadrafiler, etc. One antenna can be used for GPS, ad-hoc (such as car-to-car) communication, collision avoidance, back up sensing, cruise control, radar, toll identification and data communications.

Although the plasma antennas are being applied to several communication applications, they have yet to be applied to the monitoring applications as disclosed herein. The many advantages that result and the ability to pack several antenna functions into a small package are attractive features of this technology. Patents and applications that discuss plasma antennas include: U.S. Pat. No. 6,710,746 and U.S. Pat. App. Pub Nos. 20030160742 and 20040130497.

Dielectric Antenna.

A great deal of work is underway to make antennas from dielectric materials. In one case, the electric field that impinges on the dielectric is used to modulate a transverse electric light beam. In another case, the reduction of the speed of electromagnetic waves due to the dielectric constant is used to reduce the size of the antenna. It can be expected that developments in this area will affect the antennas used in cell phones as well as in RFID and SAW-based communication devices in the future. Thus, dielectric antennas can be advantageously used with some of the inventions disclosed herein.

Nanotube Antenna.

Antennas made from carbon nanotubes are beginning to show promise of increasing the sensitivity of antennas and thus increasing the range for communication devices based on RFID, SAW or similar devices where the signal strength frequently limits the range of such devices. The use of these antennas is therefore contemplated herein for use in tire and cargo monitors and the other applications disclosed herein.

Combinations of the above antenna designs in many cases can benefit from the advantages of each type to add further improvements to the field. Thus the inventions herein are not limited to any one of the above concepts nor is it limited to their use alone. Where feasible, all combinations are contemplated herein.

Tanks.

What follows now is a discussion of remote monitoring the level of a fluid in a storage tank or container as well as other properties of a tank, its environment and its contents. The determination of the level of a fluid in a tank has been the subject of many patents, books and other published articles and papers (see, for example, Measurement and Control of Liquid Level, an Independent learning module from the Instrument Society of America, by Chun H. Cho, which describes several such methods). A combination of any of these methods with a low power consumption, long life telematics system permitting the remote monitoring of a movable tank and its contents and environment over long periods of time without intervention is not believed to be available prior to the inventions disclosed herein. With the availability of the system described herein, tanks which are trailers towed by tractors can be monitored from any other place in the world for fluid level, tampering, theft of contents or the entire tank, fire, excessive temperature, usage, etc.

Figure 23:
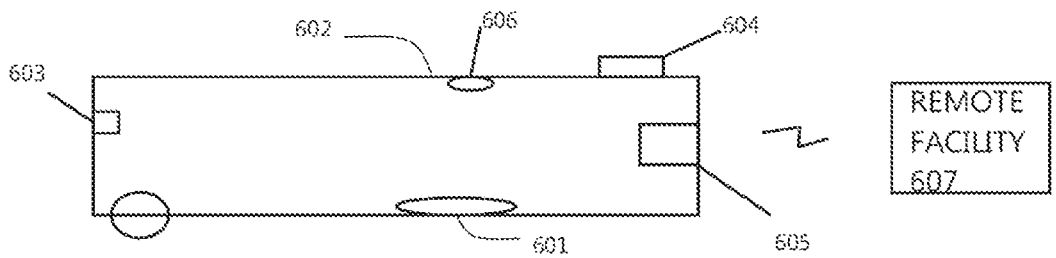
FIG. 23 is a schematic side view of a movable storage tank, commonly known as a Frac tank, containing a level monitoring system in accordance with the invention.

FIG. 23 is a side view of a Frac tank, such as supplied by e-Tank Inc, of Massillon, Ohio, containing a level monitoring system and other sensors in accordance with the invention. A similar system can apply to a tanker but will not be separately shown.

One preferred implementation of such a system for use with the Frac tank a schematically shown in FIG. 23 is described with reference to FIGS. 24 and 25. In a most basic embodiment, an interior sensor system is arranged on a housing of the tank and is arranged to obtain information about any fluid in the interior of the housing, this information can be the presence of fluid in the tank and/or the level of fluid in the tank or other properties of the fluid. A location determining system is also arranged on the housing and monitors the location of the tank, i.e., either is provided with an initial position and monitors change in that position. A communication system is coupled to the interior sensor system and the location determining system, and possibly even arranged on the housing itself, and transmits the information about the fluid in the interior of the housing and the location, or identification, of the tank to a remote facility. The remote facility may be any facility which monitors the contents of the tank, including possibly multiple facilities, all of which are concerned with the contents and condition of the tank or the fluid therein. Instead of being mounted on the housing itself, the communication system may be arranged in close proximity to the housing such as on the tractor and coupled to the interior sensor system and location determining system via wires or in a wireless manner.

The level measurement in this example is accomplished using one or more wave-receiving devices 606, such as an ultrasonic transducer manufactured by Murata and described in the '572 patent mentioned above, and a reference target 601, which may donut-shaped. Each wave-receiving device 606 directs waves at an upper surface of the fluid when present in the interior of the tank, when it is a wave transmitter, or alternatively receives waves, e.g., electromagnetic waves, from the fluid when it is, for example, an optical imager. Preferably, each wave receiving device 606 is sealed into an enclosure which prevents it from being damaged by the fluid, i.e., liquid or gas in the interior of the housing of the tank.

Each wave-receiving device 606 can be mounted to or in the top wall 602 on the inside of any of the above mentioned tanks such that its operative field of view extends downward toward the fluid in the tank, whether downward toward the bottom of the tank or at an angle to a side of the tank. A control unit/processor is provided to control the manner in which each wave-transmitting device 606 emits ultrasonic or electromagnetic waves, and the control unit/processor is shown schematically as 604, which unit also includes a location determining system as described above. The location determining system and control unit/processor may be arranged apart from one another, and possibly alongside the housing of the tank or on another face of the tank, e.g., a side of the tank.

When the wave-receiving device 606 is an ultrasonic transceiver, e.g., an ultrasonic wave transmitter/receiver, each time the wave-transducer 606 emits an ultrasonic pulse, a reflection is obtained from the fluid surface and also from the reference target 601 if present. The received reflections are analyzed by the control unit processor 604. In one embodiment, the control unit/processor 604 is provided with information about the distance between the wave-receiving device 606 and the reference target 601 in its field of view. In this case, since the location of the reference target 601 relative to the wave-receiving device 606 is known the speed of sound in the tank can be calculated, the effects of temperature and gas chemical makeup can be determined. A ratio of the echo times from the target 601 and fluid enables the control unit/processor 604 coupled to the wave-receiving device 606 to determine the location of the fluid surface. Knowing also the dimensions of the tank, the control unit/processor 604 can also determine the quantity of fluid in the tank. A key advantage therefore of this system is that it is independent of fluid or gas above the fluid composition and temperature. Additional reference targets can of course be added if it is desired to take into account the effects in gradation in the speed of sound caused by either the temperature or gas composition.

This system of course only measures the fluid level at one location, the location impacted by the transmitted ultrasonic waves, and thus some method of determining the rotations about the horizontal axes of the tank may also be incorporated, for tanks that are movable such as the Frac tank shown in FIG. 23. One method is to use multiple systems of the type described herein or the incorporation of one or more tilt sensors 603 shown in FIG. 23, such as those manufactured by Fredriks of Huntingdon, Pa. and described in the '572 patent. If the geometry of the tank is known and the level of the fluid is measured at one appropriate point, then with the added information from a tilt or angle sensor 603, the quantity of the fluid in the tank can be accurately determined. Indeed, it has been established that by using trained pattern recognition techniques, knowing only three parameters about a fluid tank, it is possible to operatively and accurately determine the quantity of fluid in the tank, even when the tank is subject to inclination. This is discussed in U.S. Pat. No. 6,892,572, incorporated by reference herein. Other more accurate angle gages are available as can be determined by one with ordinary skill in the art and the Fredriks sensors discussed herein are for illustration purposed only.

In some cases it is desirable to monitor the fluid in a tank while the tank is in motion. In such a situation the ultrasonic waves can be confined to a tube wherein the tube diameter and optional holes can be determined based on the amount of vibration damping desired. The tube and optional holes dampen the local level changes caused by the motion of the tank.

Figure 24:
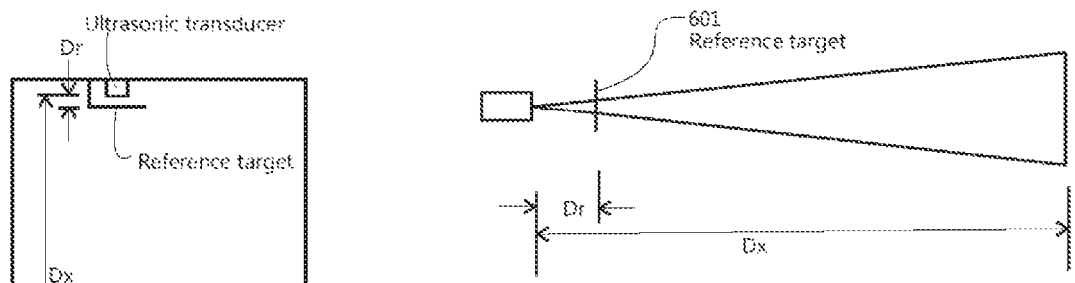
FIG. 24 shows one preferred method of determining the level of a fluid in a tank that is independent on temperature or the speed of sound.
Figure 25:
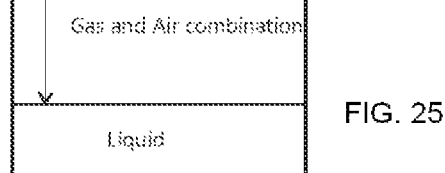
FIG. 25 is a schematic illustration of the method of FIG. 24.

FIG. 24 shows one preferred method of determining the level of a fluid in a tank that is independent of temperature or the speed of sound. FIG. 25 is a schematic illustration of the method of FIG. 24.

In some embodiments, the control unit/processor 604 is arranged to compensate for thermal and/or gas density gradients in the interior of the tank. Different ways in which the received waves can be analyzed and processed while compensating for thermal and/or gas density gradients are known to those skilled in the art. Compensation for gas density gradients is particularly appropriate when using ultrasonic sensors and thus the processor which receives information about the ultrasonic waves reflected from the upper surface of the liquid and determines the distance between the ultrasonic sensor and the upper surface of the liquid (which enables a determination of the level of fluid in the storage tank) would also be programmed to compensate for such gas density gradients (possibly in a manner described below). Any additional gas density sensors which would be required to determine gaseous stratification of the area above the liquid may be mounted to the housing.

In an embodiment described above, each wave receiving device 606 receives waves from the upper surface of the fluid and from its associated reference target 601 so that the control unit/processor 604 can analyze the waves and determine the level of fluid in the tank, since it knows the distance between each wave receiving device 606 and its associated reference target 601. In another embodiment, the control unit/processor 604 compares waves received by each wave receiving device 606 at different times and obtains information about the fluid in the tank based on the comparison of the waves received by the wave receiving device 606 at different times. When multiple wave receiving devices are provided, the control unit/processor analyzes waves received by the wave receiving devices 606 and obtains information about the fluid in the tank on the analysis of these waves.

Other sensors can be incorporated into the tank monitoring system as described with regard to shipping containers or truck trailers described elsewhere herein. For example, low power chemical or biological sensors can be incorporated to monitor the chemical nature of the contents of the tank. Similarly, temperature, pressure or other sensors can be added such as a camera that monitors the environment surrounding the tank and alerts the tank owner when the tank is approached or breached. Additional sensors include MIR based or other leakage detectors, sound, light, inertial sensors, radar, etc. Magnetic or other sensors, for example, can detect the approach of a tractor that might be used to move the tank. As such, in other embodiments of the invention, the interior sensor system includes one or more additional sensors 605 for performing any one of a number of different functions, and which are coupled to the control unit/processor 604. For example, a chemical sensor may be provided to monitor the chemical nature of the fluid or vapor in the tank, and an exterior or environmental sensor may be provided to monitor an environment around the tank to obtain information about the environment around the tank. Additional sensors include a temperature sensor, a pressure sensor, a carbon dioxide sensor, a humidity sensor, a hydrocarbon sensor, a narcotics sensor, a mercury vapor sensor, a radioactivity sensor, a microphone, an electromagnetic wave sensor, electric or magnetic field sensor and a light sensor.

As mentioned, other fluid level determining systems can also be used and all such systems are within the scope of this invention. Once a level system has been chosen, then it can be combined with a satellite or other communication system, such as provided by SkyBitz, Inc., or internet-based or cellular based SMS or GPRS or equivalent monitoring system in the same or similar manner as the shipping container monitoring systems discussed elsewhere herein. Thus, once the interior sensor system in any of the embodiments described above obtains information about the fluid in the tank and optional additional information about the tank, it provides this information to a communication system which may also be housed in the same housing as control unit/processor 604. The communication system directs this information along with information about the location of the tank obtained from the location determining system to one or more remote facilities 607, using for example, a satellite link, cell phone link, an internet link or other communication system.

To optimize monitoring of the tank, the control unit/processor may include an initiation device for periodically initiating the wave receiving device(s) 606, and/or other sensors when present, to obtain information about the fluid in the tank and/or the condition of the tank. A wakeup sensor system may thus be provided for detecting the occurrence of an internal or external event, or the absence of an event for a time period, requiring a change in the frequency of monitoring of the tank in a similar manner as described elsewhere with regard to trailers. The initiation device is coupled to the wakeup sensor system and arranged to change the rate at which it initiates the wave receiving device(s), or wave transmitting device(s), 606 and/or other sensors to obtain information about the fluid in the tank and/or the condition of the tank in response to the detected occurrence of an internal or external event by the wakeup sensor system. The initiation device and wakeup sensor system may be integrated into the control unit/processor 604 or separate therefrom.

In one embodiment, a motion or vibration detection system is arranged to detect motion or vibration of the tank or a part thereof. The interior sensor system, e.g., the wave receiving device(s) 606, are coupled to the motion or vibration detection system and obtain information about the fluid of the interior of the housing only after the tank or a part thereof is determined to have moved from a stationary position or vibrated. Similarly, a wakeup sensor system can be mounted on the housing of the tank for detecting the occurrence of an internal or external event relating to the condition or location of the fluid in the housing or the tank. The communication system may be coupled to the wakeup sensor system and arranged to transmit a signal relating to the detected occurrence of an internal or external event. Whenever desired or necessary, a memory unit may be coupled to the control unit/processor 604 or part thereof and stores data relating to the location of the tank and the fluid in the interior of the housing. The motion or vibration detection system and wakeup sensor system may be integrated into the control unit/processor 604 or separate therefrom.

A motion sensor may be arranged on the housing for monitoring motion of the housing, when the housing is in particular a movable fluid storage tank such as a fuel tanker or Frac tank, and an alarm or warning system coupled to the motion sensor and which is activated when the motion sensor detects dangerous motion of the housing. The motion sensor and alarm or warning sensor system may be integrated into the control unit/processor 604 or separate therefrom. The motion sensor may be a flux gate compass which is designed to determine if the tank has been moved.

The interior sensor system, e.g., the wave receiving device(s) 606, the location determining system and the communication system preferably all have low power requirements. A battery, e.g., a rechargeable battery, may be coupled to the interior sensor system, the location determining system and the communication system for providing power thereto. The battery may be supplemented with an energy harvesting system. In some cases where very long life batteries are required and where replacement is preferable to recharging, non-rechargeable batteries can be used which have a longer life.

In addition to information being obtained based on changes in the condition or state of the housing, it is also possible to cause the interior sensor system to obtain information upon receipt of a command from the remote facility 607. In this case, the link between the communications device in the control unit/processor 604 is bi-directional and allows for reception of a command from a remote facility 607 to cause the wave sending and/or receiving device(s) 606 to operate and obtain information about the fluid in the tank. This information is subsequently transmitted to the remote facility 607. In another case, the interior sensor system includes a combination of optical and ultrasonic or other wave-type receiving or transceiving devices, each such device being represented by reference numeral 606. An optical system 606 can be mounted on the housing to characterize the contents in the tank, e.g., determine the nature of the fluid, its identity or composition, and an ultrasonic system 606 can be used to determine the fluid level. Both such systems can be coupled to the control unit/processor 604 which can coordinate information gathering by both systems and transmit messages to the remote facility 607 about the nature of the fluid and its level, along with a location or position indication obtained from the location determining system. Such an optical system may be as described herein and would generally include an optical sensor which obtains images of the fluid and can analyze the images to determine the nature of the fluid. This may be achieved using pattern recognition technologies.

Figure 22:
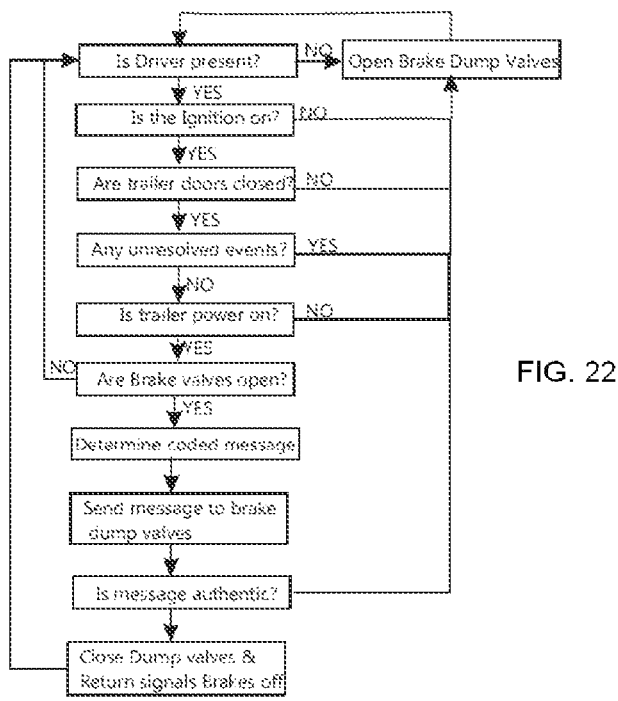
FIG. 22 is a block diagram showing a process for controlling the trailer parking and emergency brake dump valves.

In another embodiment, only optical systems are used, represented by reference numeral 606 in FIGS. 22 and 23, since an optical system could also determine the level of fluid in a tank. In this case, one or more markings can be provided along the inner surface of the tank, or on other members extending along the height of the tank in the interior of the tank. The optical system obtains images including the marking(s) and can analyze the images to determine the level of the fluid. In one particular embodiment, the optical system is designed to project scales on the inner surface of three walls of the housing, or at three different locations on the inner surface of the housing wall or walls, and obtain images of the wall(s) at the projected locations of the scales. This information is used to derive the level of fluid in the tank, by a processor which may use a trained pattern recognition technique such as a trained neural network. The training may involve obtaining images when different, but known, levels of fluid are present in the tank, and the tank is at different inclinations. In this case, images are obtained for different tank levels and different inclinations and inputted into a neural network generating program which provides a neural network which is capable of outputting a fluid level upon receiving images of the three projected scales.

In one embodiment, it is envisioned that modulated and/or structured light may be used for tank level measurements.

In a preferred embodiment, a single ultrasonic wave receiving device 606 is mounted to an inner surface of the housing and is sealed into an enclosure to prevent damage caused by any fluids in the housing. A two axis tilt or angle sensor 605 is also mounted to the housing and this sensor 605 as well as the wave receiving device 606 are coupled to the control unit/processor 604. The control unit/processor 604 receives signal corresponding to or representative of the waves received by the wave receiving device 606, or information derived therefrom at the wave receiving device 606, along with the information about inclination of the housing from the tilt sensor 605 and the location of the tank from the location determining system and forms a message for transmission to the remote facility 607.

Electric field and other technology sensors can also be configured to monitor liquid levels in tanks by those skilled in the art.

The remote facility 607 which monitors the storage tanks can receive messages, e.g., via the Internet, SMS, GPRS or a satellite link, each containing the location of the tank and information about the fluid therein, or, alternately a coded message indication that the fluid level is unchanged. The remote facility 607 can also be designed to enable monitoring of selected ones or all of the storage tanks via the wave receiving devices if a bi-directional communications device is coupled to or part of the control unit/processor 604 associated with each storage tank. A report about the storage tanks can be compiled by a processor or control unit at the remote facility 607 and alarms or warnings provided to monitoring personnel if a problem is detected with any of the fluids in the tanks, such as the theft of some of the fluid, or a problem is detected with any of the tanks such as theft of the entire tank.

When the communication system in the control unit/processor 604 on the housing of the tank allows for bi-directional communications, the tank can be provided with one or more controlled systems or components which can be commanded by the remote facility 607 to undertake a specific action. This would be in addition to the ability of the remote facility 607 to command the interior sensor system, e.g., the wave sending and/or receiving device(s) 606 to undertake a reading. Such controlled systems may be a fire extinguisher on the tank. Any of these such systems can be coupled to the control unit/processor 604 and commanded via the link to the remote facility 607. This therefore provides for remote control of systems on the tank.

Figure 26:
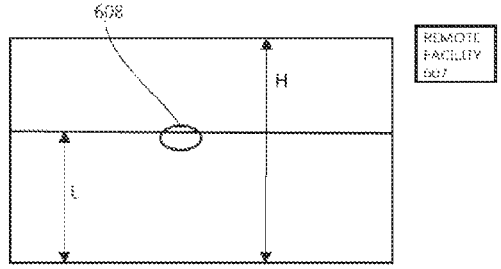
FIG. 26 is a cross-sectional view of an embodiment of a fluid level measuring system in accordance with the invention.
Figure 27:
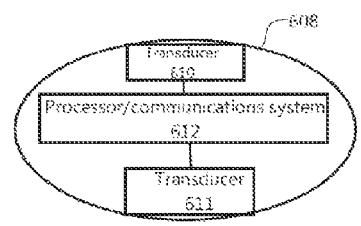
FIG. 27 is an enlarged view of the fluid level measuring system shown in FIG. 26.

Referring now to FIGS. 26 and 27, another embodiment of a fluid level measuring system in accordance with the invention for particular use with tanks includes a buoyant housing 608 which floats on the liquid in the storage tank housing. Housing 608 includes a first transducer 610 arranged to face upward and a second transducer 611 arranged to face downward.

Transducer 610 may be an ultrasonic, electric field or RF transducer which is capable of providing information to enable a determination of or possibly actually determining the range of distance to the top of the storage tank, i.e., the distance between the housing 608 and the top of the storage tank. If transducer 610 is an ultrasonic transducer, it directs ultrasonic waves at the inner surface of the top wall of the storage tank and receives reflected ultrasonic waves.

Transducer 611 may be an ultrasonic transducer which is capable of providing information to enable a determination of or possibly actually determining the range or distance to the bottom of the storage tank. If transducer 611 is an ultrasonic transducer, it directs ultrasonic waves at the inner surface of the bottom wall of the storage tank and receives reflected ultrasonic waves.

A processor/communications unit 612 is connected to transducers 610, 611 and, when the transducers 610, 611 only provide data about the reflected waves but not the range or distance information, the processor determines the range or distance between the housing 608 and both the top and bottom of the tank. From the range or distance determinations, processor 612 is thus capable of determining the level (L) of the liquid if the height (H) of the tank is known (and provided to the processor 612). The processor 612 could also correct for other variables in the determinations, such as temperature, pressure and gas density as disclosed herein.

If the speed of sound in the liquid or the gas is provided to or otherwise determined by sensors connected to the processor 612, it can then determine the fluid level using the data from only one of the transducer 610, 611. For example, if the speed of sound in the liquid is known, the processor 612 can determine the level of fluid based on the data provided by transducer 611.

In one embodiment, a reference target is arranged in the field of view of transducer 610 and thus, only transducer 610 would be needed to enable a determination of the level of liquid in the tank. In this case, housing 608 could not include transducer 611.

Processor 612 includes a communications unit or system which communicates with the remote facility 607, either directly or indirectly, e.g., through an intermediate structure which receives wireless signals from the processor/communications unit 612 indicative of the level of liquid in the tank and relays them to the remote facility 607.

It is noted that additional methods for measuring the level of liquid in the storage tanks may be used in the invention, such as those described in the book, *Measurement and Control of Liquid Level*. Any of these level measuring techniques may be used in the invention, when used in combination with a communications unit which is capable of forwarding the measured liquid level to a remote facility or engaging in bi-directional communications with a remote facility to enable the remote facility to initiate a liquid level measurement.

Gradients.

In some applications of the ultrasonic, electromagnetic and optical receiving devices, in particular, use of such devices for determining information about a fluid in an enclosed storage tank, there may be gas density gradients caused by temperature variations and/or by variations in the make-up or composition or chemical nature of the gas or liquid in the storage tank. For example, in a liquid tank, a mixture of gasses could separate with the more dense gas near the liquid surface and the less dense gas near the top of the storage tank. This gas density gradient may affect ultrasonic waves and therefore, in the embodiment described above wherein an ultrasonic sensor is arranged at the top wall of the storage tank, the determination of the distance between the ultrasonic sensor and the upper surface of the liquid. To ensure reasonable accuracy of the determination of the distance between the ultrasonic sensor and the upper surface of the liquid, and thus an accurate assessment of the fluid level, any gas density gradient should be compensated for.

One way to achieve this would be to determine the gas density at multiple, spaced-apart locations in the tank, i.e., in the area in which gas is present in the tank which would be the area between the upper surface of the liquid and the top of the tank. If the gas density readings from appropriate gas density sensors are all equal, this would be indicative of the lack of a gas density gradient. However, if the gas density readings are different, a processor which determines the distance between the ultrasonic sensor and the upper surface of the liquid (and uses this distance determination to determine the level of fluid in the storage tank) must compensate for the gas density gradient if it affects the ultrasonic waves.

The embodiment wherein the level of liquid in a storage tank is determined is thus especially appropriate environment for a technique to compensate for gas density gradients or gaseous stratification.

In some cases, a combination of an optical system such as a camera and an ultrasonic system can be used. In this case, the optical system can be used to acquire an image providing information as to the vertical and lateral dimensions of the scene and the ultrasound can be used to provide longitudinal information, for example. In another case, an optical system can be used to characterize the contents in a container or storage tank and an ultrasonic system used to determine the distance to the object or the fluid level.

Any of the transducers discussed herein such as an active pixel or other camera can be arranged in various locations in a vehicle compartment including in a headliner, roof, ceiling, rear view mirror assembly, an A-pillar, a B-pillar and a C-pillar in the case of the tractor or a ceiling, side wall or even a door in the case of a cargo container or truck trailer. For tanks, the roof is generally a good location for mounting ultrasonic-based level detectors and a wall is a good location for mounting optical systems. Nevertheless, for an ultrasonic-based level detector, any location where the detector has a field of view oriented toward the upper surface of the fluid would be suitable. For an optical system, any location where the detector has a field of view of any part of the fluid would be suitable. In this case, care should be exercised to ensure that the optical system has a view of the fluid even when it is at a low level.

Both bladder and strain gage weight sensors can also be used in measuring the mass of fluid in a tank or container. Use of weight to measure the quantity of fuel in a vehicle fuel tank is discussed in U.S. Pat. No. 6,615,656 and U.S. Pat. No. 6,892,572, both of which are incorporated by reference herein. Many of the techniques discussed therein are also applicable to determining the quantity of fluid in tanks and other containers.

As mentioned, optical systems can be effectively used to monitor the level of a fluid in tank especially when the tank is stationary. In one such implementation, a scale can be projected from the imager and the point where the fluid covers the image on the wall can be easily determined Thus, in one small package that does not require painting a scale on the tank wall, for example, an accurate measurement of the level at the wall can be determined. Again, multiple such systems can be used to account for the rotation of the tank or an angle measurement sensor can be incorporated. A preferred implementation is to use three imagers of a prism designed to display and record the reflection of a scale on three walls. Such a device can be mounted in a single location such as 602 in FIG. 23 as a simple, low power device.

Fuel tanks may also be monitored, in addition to motion and sound detectors, by RF detectors which may be mounted to the housing of the tanks. RF detectors could detect approaching people or vehicle when, for example, a person has or is using a cell phone or other RF transmitter.

Although the inventions disclosed herein are primarily intended to solve the theft of cargo problem, it is noteworthy that systems based on the disclosure herein can be configured to monitor construction machinery and on site material and supplies to prevent theft or at least to notify others that a theft is in progress.

In many cases, it is desirable to obtain and record additional information about the cargo container and its contents. As mentioned above, the weight of the container with its contents and the distribution and changes in this weight distribution can be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration, radiation etc. can be important historical factors for the container affecting its useful life, establishing liability for damages etc. For example, a continuous monitoring of container interior temperature could be significant for perishable cargo and for establishing liability. Specifically, monitoring of the temperature can be used to determine whether the operating parts of the container, e.g., the refrigeration unit, fails and thereby establish liability for damage to the perishable cargo with the entity responsible for maintenance of the cargo container. In this case, data about the refrigeration unit could be transmitted to a facility operated by an entity responsible for maintenance of the cargo container, as discussed elsewhere herein, to enable them to act to rectify failure of the refrigeration unit. Such an entity might lease refrigerated cargo containers and once a failure of a refrigeration unit is detected, it could immediately notify the trucker or railroad operator transporting the container to sideline the container until the perishable cargo therein can be transferred to another refrigerated cargo container or the refrigeration unit fixed. Staff for fixing refrigeration units could be strategically positioned around areas in which leased cargo containers travel, or are expected to travel.

Figure 20A:
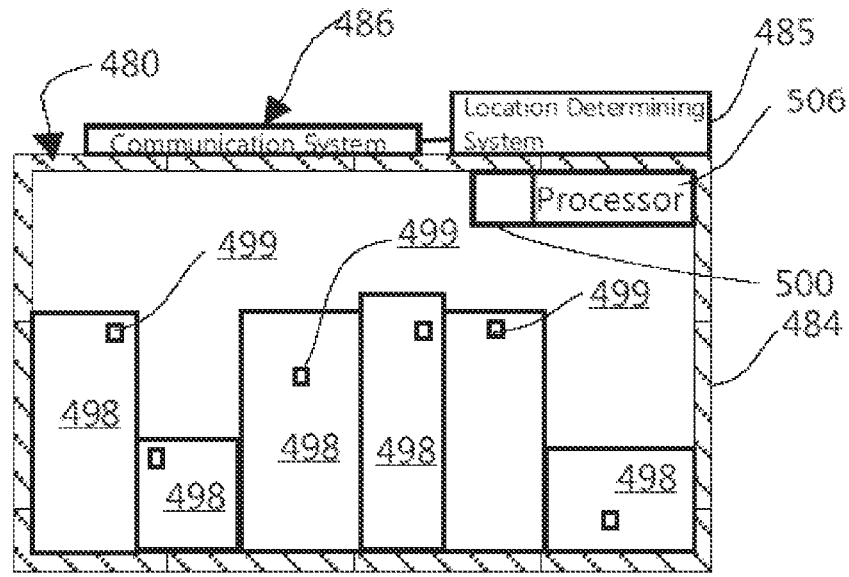
FIG. 20A is a cross-sectional view of a container showing the use of RFID technology in a monitoring system and method in accordance with the invention.

With reference to FIG. 20A, in some cases, the individual cargo items 498 can be tagged with RFID or SAW tags 499 (also representing a general sensor system used to obtain data about the cargo item 498) and the presence of this cargo in the container 480 could be valuable information to the owner of the cargo. One or more sensors on the container that periodically read RFID tags could be required, such as one or more RFID interrogators 500 which periodically send a signal which will causes the RFID tags 499 to generate a responsive signal. The responsive signal generated by the RFID tags 499 will contain information about the cargo item on which the RFID tag 499 is placed. This information may be any property or condition about the contents, such as temperature, presence of one or more chemicals, pressure, a radioactivity sensor, and other types of sensors discussed elsewhere herein.

Multiple interrogators or at least multiple antennas may be required depending on the size of the container. The RFID can be based on a SAW thus can provide greater range for a passive system or it can also be provided with an internal battery or ultracapacitor for even greater range. Energy harvesting can also be used if appropriate.

In one method for tracking packages in accordance with the invention, the interrogator 500 includes a processor and is programmed to periodically interrogate the interior of the container 480 by transmitting radio frequency waves into the interior of the container 480. As known to known skilled in the art, the interrogator 500 receives RF signals generated by the RFID tags 499, and the processor therein interprets the received RF signals into an indication of the presence of a specific cargo item 498 (with the signal possibly providing information about the cargo item 498). The processor in the interrogator 500 can form a list of the contents of the container 480, i.e., the identified cargo items 498, and provide this list to the communications system 485 via a link thereto whereby the communication system 485 transmits this list to one or more remote facilities.

An entity managing shipment of the cargo items 498, e.g., a package delivery service company, is thus able to known the location of every box in every container 480, and the location of the container 480 when it provides its location in the transmission to the remote facility. The location of the container 480 may be provided by a positioning system 485 on the container 480 as shown in FIG. 20A.

Bi-directional communications are also possible whereby the managing entity can initiate the interrogator 500 to interrogate the interior of the container 480. Thus, interrogator 500 can either be initiated upon command from the remote facility, at a predetermined periodic interval and/or upon detection of a condition which may give rise to a change in the contents of the container 480, e.g., opening or closing of the door as detected by a door status sensor 487 described elsewhere herein. The managing entity may perform an hourly update of the contents of its managed containers 480 to ascertain when each cargo item 498 has been removed, and thus delivered, and can thereby track the efficiency of the delivery personnel. Further, the bi-directional communications can be used to provide data about the cargo items 498 to the remote facility, e.g., when a new cargo item 498 is placed into the container, the interrogator 500 could read the indicia, convert it to an identification and other information and then transmit this identification and other information to the remote facility to begin tracking of this new cargo item 498.

Similarly, for certain types of cargo, a barcode system might acceptable, or another optically readable identification code. The cargo items would have to be placed so that the identification codes are readable, i.e., when a beam or other illumination of light is directed over the identification codes, a pattern of light is generated which contains information about the cargo item. In this regard, a system can be provided to notify the personnel placing the boxes 503 into the container 480 that the boxes 503 are not placed properly, i.e., the indicia thereon cannot be read. Thus, one or more attempts may be made to read the indicia on a box when it is first placed into the container and a warning provided, e.g., a visual and/or audible warning, if the box is placed such that the indicia is not readable by an optical scanner. An imager can be used in place of a scanner and the barcode segmented in the image and converted to an ID.

Figure 20B:
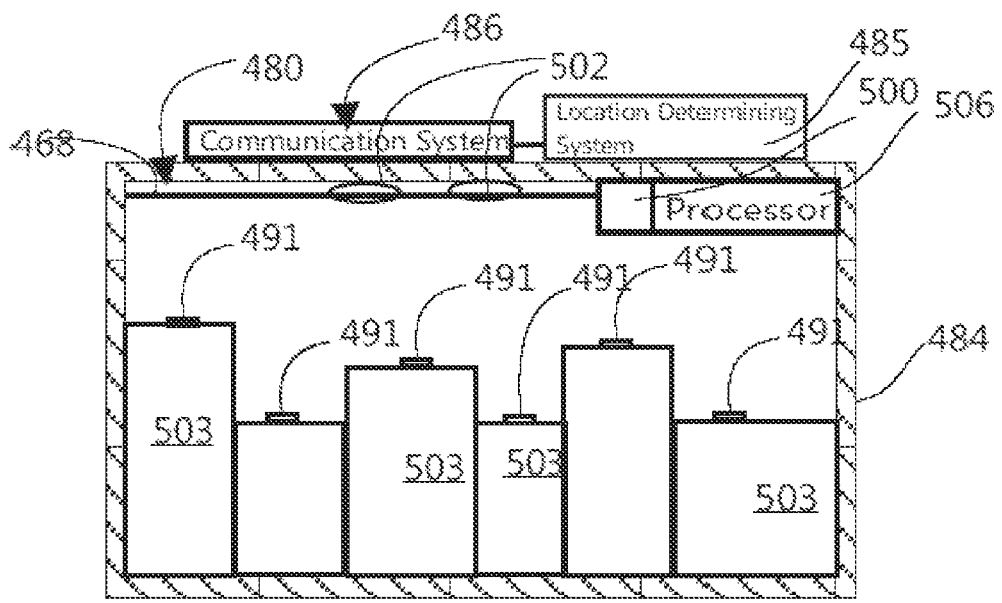
FIG. 20B is a cross-sectional view of a container showing the use of barcode technology in a monitoring system and method in accordance with the invention.

As shown in FIG. 20B, the cargo items in this case are boxes 503 having variable heights and all are arranged so that a space remains between the top of the boxes 503 and the ceiling of the container 480. One or more optical scanners or imagers 502, including a light transmitter and receiver, are arranged on the ceiling of the container and can be arranged to scan or image the upper surfaces of the boxes 503, possibly by moving the length of the container 480 (via a movement mechanism such as an actuator coupled to the optical scanner or imager which moves along one or more rails 468 which can extend along the length of the container 480), or through a plurality of such sensors. During such a scan, images or patterns of light are reflected from the barcodes 501 on the upper surfaces of the boxes 503 and received by the optical scanner or imager 502. The patterns of light contain information about the cargo items in the boxes 503. Receivers can be arranged at multiple locations along the ceiling, in which case, an optical scanner includes an assembly of a light transmitter and one or more light receivers spaced apart from the light transmitter. Alternately a plurality of imagers can be strategically placed. Other arrangements to ensure that a light beam traverses a barcode 501 and is received by a receiver or images of the barcodes received by the imager can also be applied in accordance with the invention. As discussed above, other tag technologies can be used if appropriate such as those based of magnetic wires.

By monitoring the data being determined using the sensors on the cargo items 498, this data can be analyzed by a processor on the cargo items 498 themselves, e.g., as part of the sensor system 499, or separate from the cargo items 498, e.g., on the container 480 (see processor 506 in FIG. 59A wherein the processor 506 is close to the RFID interrogator 500), to determine the presence of a condition which has or is likely to affect the status or health of the cargo items 498 has occurred or is forecast to occur. That is, the processor 506 determines whether there is a problem with the cargo items 498 or a potential problem. As an example, one problem is when a motion sensor is part of the sensor system 499 and motion of the cargo item 498 is analyzed relative to motion of the container 480, and the processor 506 determines that the cargo item is moving considerably more than the container 480, which situation could be indicative of the cargo item 498 not being properly restrained and thus liable to fall over and cause damage to the cargo item 498 or some other item. Analysis of data obtained by the sensor systems 491 to determine the existence or potential for a problem with the cargo item 498 may involve use of pattern recognition technologies, such as a trained neural network.

The communication system 485 may be programmed to transmit a message to a remote facility while the container is traveling only when the processor determines the presence of a problem or potential problem with one or more cargo items 498. This would conserve energy. Additionally, or alternatively, the sensor systems 491 could be designed to trigger to obtain data about the cargo item 498 when a door of the asset is closed after having been opened, a change in light in the interior of the container 480 is detected, based on a predetermined or variable initiation time being regulated by an initiation device, motion of the container 480 or change in motion of the container 480 is detected, vibration of the container 480 is detected, and a predetermined internal or external event occurs which warrants obtaining data about the contents in view of the possibility of a change in the status or health of the contents. In one embodiment, the sensor systems 491 on the cargo items 498 can be triggered to obtained data from the remote facility via the communication system 485, or from personnel on or about the vehicle on which the container 480 is situated.

When sensors are placed on each cargo item 498, the sensors are coupled to the communication system 485 and the location determining system 486 using wires or wirelessly or a combination of both. If needed, a peer-to-peer and/or a mesh network can be integrated into the asset, i.e., the frame thereof, to enable all sensors on cargo items 498 arranged in the interior of the asset to communicate with the communication system 485. This would most likely be applicable for large ships, trains and airplanes.

The ability to read barcodes and RFID tags provides the capability of the more closely tracking of packages for such organizations as UPS, Federal Express, the U.S. Postal Service, or other common carriers, and their customers. Now, in some cases, the company can ascertain that a given package is in fact on a particular truck or cargo transporter and also know the exact location of the transporter.

In one method for tracking packages in accordance with the invention, the optical scanner or imager 502 includes a processor and is programmed to periodically generate a light beam or other illumination and direct the light beam or illumination downward to read or image any barcodes 501 on boxes 503 in the field of view of the receiver. If movable, the optical scanner or imager 502 is also periodically moved along the rails 468 to ensure that most if not all of the area of the interior of the container 480 is exposed to the light beam or illuminator from the optical scanner or imager 502. As known to those skilled in the art, the optical scanner 502 reads the barcodes 501, and the processor therein interprets the barcodes 501 into an indication of the presence of a particular box 503 (with the barcode 501 possibly providing information about the box 503). The use of an imager for this purpose is not currently in use to the inventor's knowledge. The processor in the optical scanner or imager 502 can form a list of the contents of the container 480, i.e., the identified boxes 503, and provide this list to the communications system 485 via a link thereto whereby the communication system 485 transmits this list to one or more remote facilities.

An entity managing shipment of the boxes 503, e.g., a package delivery service company or shipping company, is thus able to know the location of every box in every container 480, and the location of the container 480 when it provides its location in the transmission to the remote facility. The location of the container 480 may be provided by a positioning system 486 on the container 480 (not shown in FIG. 3B).

Bi-directional communications are also possible whereby the managing entity can initiate the optical scanner or imager 502 to read the barcodes 501 from the boxes 503. Thus, optical scanner or imager 502 can either be initiated upon command from the remote facility, at a predetermined periodic interval and/or upon detection of a condition which may give rise to a change in the contents of the container 480, e.g., opening or closing of the door as detected by a door status sensor 487 described elsewhere herein. The managing entity may perform an hourly update of the contents of its managed containers 480 when the container is in transit and not parked and perhaps more frequently at other times to ascertain when each box 503 has been removed, and thus delivered, and can thereby track the efficiency of the delivery personnel. Further, the bi-directional communications can be used to provide data about the packages to the remote facility, e.g., when a new box 503 is placed into the container, the optical scanner or imager 502 could read the indicia, convert it to an identification and other information and then transmit this identification and other information to the remote facility to begin tracking of this new box 503.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Communication between the sensors and various elements of the shipping system which are co-located (truck, trailer, container, container contents, driver etc.) can be through a wired or wireless bus such as the CAN bus. Also, an electrical system such as disclosed in U.S. Pat. Nos. 5,809,437, 6,175,787 and 6,326,704 can also be used in the invention.

3. Communication Systems

General

Commercial cargo container tracking systems are now available from companies such as Skybitz Inc. 22455 Davis Drive, Suite 100, Sterling, Va. 20164, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite, depending on the commercial provider, providing the satellite with its location as determined by the GPS receiver or a similar system such as the Skybitz Global Locating System (GLS). The entire system operates off of a battery pack and if the system transmits information to the satellite once per day, the battery can last many years before requiring replacement. Thus, the system can monitor the location of a trailer, for example, once per day, which is sufficient if trailer is stationary and in a protected area or is empty. The interrogation rate can be increased based on the needs of the shipping company, or otherwise varied based on the conditions of the container, the contents of the container, etc.

Such a system can last up to 10 years without requiring maintenance depending on design, usage and the environment. Even longer periods are possible if the batteries are replaced or if power is periodically or occasionally available to recharge the batteries such as by vibration energy harvesting, solar cells, capacitive coupling, inductive coupling, RF or wired vehicle power. In some cases, an ultracapacitor can be used in conjunction with or in place of a battery. If greater power is required and the trailer or container is not connected to vehicle or other power source, a fuel cell can be used to recharge or supplement the battery or ultracapacitor.

The SkyBitz or equivalent system by itself only provides information as to the location of a container and not information about its contents, environment, and/or other properties. At least one of the inventions herein disclosed is intended to provide this additional information, which can be coded typically into a few bytes of data and sent to the satellite, or to a remote site by another communication system as discussed below, along with the container location information and identification. Due to the limited power available and the power required to transmit to a satellite, the SkyBitz solution in general will not be used for continuous monitoring of a shipping container.

The terms "trailer", "shipping container" or "container" will be used here as a generic cargo holder and will include all cargo holders including standard and non-standard containers, boats, trucks, trailers, tanks or any other movable object that can be used to transport cargo. Most of these "containers" are also vehicles or trailers as defined above.

While the cargo container is in transit from the initial loading point to the destination the container can transmit its status to, and receive communications from, a remote site by satellite, cell phone, the Internet, radio, and SMS or GPRS or other text communication by any available wireless communication channel. However, with more than two million tractor trailers operating in the US and approximately 500,000 trailers on the road in the US at any one time attention must be paid to the bandwidth required by the system if totally implemented across a majority or all truck trailers. To the extent that trailers are on the interstate highways, the US Government is implementing the DSRC system which will allow trailers to communicate with roadside transceivers and perhaps from there to the Internet. Additionally the cell phone system is nearly ubiquitous and an SMS type protocol can be agreed upon that minimizes the handshaking and additional message overhead and allows messages that conform to a specific protocol to be transmitted and received with the minimum of additional data. This solution is discussed in more detail below. Finally ubiquitous wireless broadband Internet using WiMAX and/or LTE or equivalent is now being deployed and if completed a direct to Internet communication solution will be available. Thus, appropriately equipped trailers can communicate their very short messages very frequently without overloading the various networks.

An additional dimension exists with the use of the Skybitz, SMS, GPRS or ubiquitous internet system, for example, where an asset mounted device has further wireless communications with other devices in, on or near the asset. Tagged items within or on the assets can be verified if a local area network exists between the off asset communication device and other objects. Perhaps it is desired to check that a particular piece of equipment is located within an asset. Further perhaps it is desired to determine that the piece of equipment is operating or operating within certain parameter ranges, or has a particular temperature etc. Perhaps it is desired to determine whether a particular item fitted with an RFID tag is present on or in the trailer. The possibilities are endless for determining the presence, status or operating parameters of a component or occupying item of a remote asset and to periodically communicate this information to an internet site, for example, either directly or by using a low power asset monitoring system such as the Skybitz system or by a cellular or internet based SMS or equivalent system.

Problem Statement

A trailer begins its journey with a cargo load and it is the goal of the system to guarantee that the trailer and its cargo arrive at its destination intact. Many incidents can occur along the way including theft of the tractor and trailer rig, theft of the trailer with the cargo and theft of the cargo alone. The achievement of this goal is based on the concept of changing the problem into an information problem. That is, to sense when a problem arises, that will prevent the goal from being reached, in a timely manner so that the crime can be stopped in progress. As long as the trailer does not encounter a problem then no additional energy or cost need to be expended by the driver, owner, shipper or authorities.

Although many solutions have been proposed such as secure door locks and cargo items containing their own sensors and transmitters, all such systems are easily defeated by sophisticated thieves. Some such systems can delay a theft and others can track a stolen vehicle and thus can be useful additions to the basic system described herein. These will be discussed in some detail in later sections of this specification. The solution to be discussed here will concentrate on the information and communication system which will substantially achieve the goal of eliminating cargo theft.

Solution

A trailer equipped with the system of this invention can have a unique identification code, hereinafter called an ID, at least for the duration of the trip and preferably for the life of the trailer. This ID can form a key part of the message which will be periodically sent to a remote site using the chosen communication system which in the preferred implementation will be assumed to be the SMS system operating over a cell phone network. Other equivalent communication systems can be used including a direct connection to the Internet through a WiFi, WIMAX, LTE or other equivalent system. Additionally there are a number of text messaging systems coming on line to compete with SMS including those by Google and Apple as mentioned above. A vehicle may at any one time have access to several different communication channels and may choose the one that best meets the requirements at the time. These requirements can include security of communication and the particular channel can be chosen by the vehicle resident system and/or by the remote site. The chosen channel can change from time to time as the vehicle travels to its destination. The important feature is that some communication channel is available which has the properties that it will receive short messages and route them to their destination hereinafter referred to as the remote site. Each message sent by the vehicle can contain its ID, the destination for the message and at least an error code. Other information will of course be appended to the message consistent with the requirements of the particular channel chosen. Additionally, the ID and error code can be encrypted in such a manner that they cannot be easily faked or spoofed by a sophisticated thief. Thus, the receiving site can know for certain that this message was sent by a trailer having the unique ID.

An important feature of at least one of the preferred implementations of the inventions disclosed herein is the frequency of communication of the container status which can depend on various factors such as whether the vehicle is moving or stationary and if stationary whether it is waiting for a traffic control signal, stuck in traffic or parked. In addition to a communication frequency determined by a container resident algorithm, the frequency can also be controlled by commands from the remote site which may relate, for example, to the value of the cargo or to the theft probability. In general, the communication frequency will be less when the vehicle is traveling than when it is parked, for example, since most cargo theft occurs while the trailer is parked. Other factors that can be taken into account in determining the status communication frequency include whether the driver is present, the geographical location of the trailer, the time of day and whether an event has occurred. Events that can change the communication frequency include the sensing of an intrusion into the trailer, sensing of any change in the cargo within the container such as a change in position or presence of an item or of bulk cargo whether sensed ultrasonically, optically, electromagnetically or by a tag signal in response to an interrogation, or the change in the sensed internal environment. Other events that can change the communication frequency include events in the space outside but near to the trailer including the presence of another vehicle, the detachment of a trailer from its tractor, unexpected movement of the trailer, the approach of a human to the trailer, unexpected sounds, the starting of the engine by someone other than the driver, etc. Other factors related to the route traveled and schedule can affect the communication frequency such as an unexpected and unauthorized deviation from the planned route or an unexpected deviation from the planned schedule.

Generally, the transmission frequency will be low while the trailer is moving and on the expected route and on time, such as once per five minutes, and higher while the trailer is parked, and especially when the driver has departed from the tractor, or something unexpected has occurred, such as once per ten seconds. Keeping in mind that a trailer can be stolen in as short as fifteen seconds, wherever any of the above events occur the transmission frequency can be increased to once per second, for example. Due to the large number of transmissions from a trailer contemplated herein, it is important that each message be kept short so as to minimize the required bandwidth.

The error code which is sent can indicate that no event has occurred and that the container is on the proper route and on time, an OK error. When the software at the remote site receives such a message it updates the status of the trailer on an internet accessible file and takes no further action. If there is an event then the OK message can be changed to give a report of the event and whether it is likely to be associated with an attempted theft, accident or other serious incident. If the event is a schedule delay the remote site software can check on weather and traffic conditions on the route and decide whether further action is warranted. The trailer can transmit its location on request by the remote site software or the entire planned route can be uploaded to the remote site along with an estimate of the delay. In the latter case only the delay needs to be modified. Alternately, the trailer can upload a code representing a shipping company pre-designated route and a subsequent code of an alternate pre-designated route if weather or traffic conditions warrant a route change. If the delay is deemed significant, based on parameters set by the shipping company, then the software can alert the shipping company or other interested party according to the programmed instructions from the shipping company. For more serious error codes other actions can be initiated as per the programmed instructions. These actions can include sending email, text messages or automated phone call to the driver and other interested parties and notifying the authorities that a theft is in progress or an accident has occurred. The location of the vehicle can also be a single OK bit if it is on the expected route and on schedule within certain programmed tolerances.

Sophisticated thieves can invoke jamming transmissions as soon as they are aware that the trailer is transmitting information to the infrastructure. Various spread spectrum, frequency hopping or impulse radar techniques can be employed to prevent or reduce the effects of jamming but that requires significant additions to the vehicle or infrastructure. The thieves can also attempt to locate the transmitter and disable it or otherwise prevent it from transmitting. In this event the remote station that has been receiving the messages can assume that a theft is in progress and take appropriate actions. Since a trailer can be stolen in as little as 15 seconds the remote station has little time to act. In many cases, for example, this is insufficient time for law enforcement authorities to travel to the last know location of the trailer. By the time that they arrive the trailer is long gone. This issue will be discussed below.

Basically, in a preferred implementation of the invention, an OK message is sent to the remote site on an established schedule that indicates that the cargo has not been disturbed, there has not been an intrusion into the trailer, the authorized driver is present and alone in the cab, the trailer is moving on the expected route and on schedule and there has been no other event that might signify a problem. The message also contains the trailer ID and is sent encrypted in such a manner that it cannot be spoofed. The encryption can be controlled by the remote site through a pseudorandom number public key transmission such that the coded message cannot be decoded except by the remote site and thus cannot be spoofed.

Occasionally the message can be blocked and thus not reach the remote site when expected. In that event the software can check whether the vehicle is in a known problem area such as a tunnel and if so request a retransmission. If a retransmission is not received in a reasonable time or if there is no known natural blockage then the software can evoke the theft in progress algorithm. Thus, a key feature of this preferred implementation of this invention is to assume that there is a theft-in-progress whenever an expected message is not received as well as when a problem is indicated by the error code. The action to be taken when either event occurs will depend in instructions from the shipping company. The remote site software knows when to expect a message since the time of the next message can be part of the message sent by the trailer. At any time that an expected message is not received, the remote site can send a command to the trailer requesting a retransmission.

The magnitude to the cargo theft problem may stimulate the government or other interested group to install communication transceivers along roads where it is known that communication is otherwise nonexistent, such as in long tunnels.

The trailer can have a resident processor that for a particular trip can be programmed to contain information relating to the trailer ID, the authorized Tractor ID, the cargo and how it is identified by the cargo sensors, if present, and the expected output including tolerances of all the resident sensors. The particular suite of resident sensors will of course depend on the shipping company and the nature and value of the cargo. The processor needs to know what to expect from each of the sensors in the suite so that it knows that a particular output from a particular sensor indicated intrusion into the trailer, for example. As long as the expected values are received the processor knows to send an encrypted OK error code. Similarly the processor is programmed to send the proper code relative to the sensor output if it is not what is expected. One of the inputs to the processor can be the authorized driver. The identification of the driver will be discussed below but in general the recognition system can be as simple as a password or as complicated as a fingerprint, palm or butt print, iris scan, voice print, gesture or other biometric identification. In addition to the sending of an error code, operation of the rig can be controlled based on the authorization of the driver. Similarly the tractor ID can be transmitted to the trailer in a variety of un-spoofable ways so that an error code is generated if the wrong tractor is attached to the trailer.

The planned route can also be entered into and stored in the processor and a GPS receiver, also attached to the processor, can track the trailer and compare its actual location with the planned location and send an error code if there is a discrepancy beyond the established tolerance. This comparison of the planned versus actual route can also be performed at the remote site. The data required by the processor can be entered either by the shipping company when the trailer is loaded, at the start of the trip or at any other convenient time. When the driver is ready to leave the embarkation location, for example, he can phone the shipping company home office which can then wirelessly communicate with the processor downloading the required data in encrypted form. The decrypting key can also be transmitted in a manner that cannot be used by a potential thief as is well known to encryption experts or it can be resident in the processor memory.

In the above manner, the trailer can be digitally connected with the tractor and the driver such that if any unauthorized change is made to either an error code is sent to the remote site for resolution. If no message is received the remote site software also acts as if a theft-in-progress code was received. The shipping or other authorized persons can access the status and location of the container via the internet at any time to check on the shipment and its properties consistent with the onboard sensor suite. Thus the information system is in place to determine in a manner of seconds or minutes whether a theft has occurred or is occurring. Additionally, suitable security can be provided to ensure that this information is not freely available to the general public. Redundancy can be provided to prevent the destruction or any failure of a particular remote site as is now common in cloud based systems.

EXAMPLES

Simple Cargo Movement

The simplest method of implementing a portion of the invention is to use a cell phone, smartphone, PDA, tablet computer or other portable device with the appropriate application. Cell phones, or smartphones, that are now sold contain a GPS-based location system as do many other devices such as PDAs, iPADs, tablets or equivalents. Such a system along with minimal additional apparatus can be used to practice the teachings disclosed herein. In this case, the cell phone, PDA or similar portable device can be mounted through a snap-in attachment system, for example, wherein one or more portable devices can be firmly attached to the container and perhaps inside the tractor. The device(s) can at that point, for example, obtain an ID number from the container through a variety of methods such as a wireless RFID, SAW or hardwired based system. It can also connect to a chosen remote site using SMS text messaging or similar system. Since the portable device would only operate on a low duty cycle, the battery should last for many days or perhaps longer. Of course, if it is connected to the vehicle power system, its life can be indefinite. When power is waning, this fact can be sent to the cell phone system to alert the appropriate personnel. Since a cell phone contains a microphone, it can be trained, using an appropriate pattern recognition system, to recognize the sound of an accident, other sounds indicative of an intrusion such as forced entry or an unfamiliar voice, the deployment of an airbag or similar event. It thus becomes a very low cost OnStar® type telematics system as well as a theft notification and prevention system. The GPS system can be used to sense vehicle motion and to track the trailer on its route.

Receiving software can be established at the chosen remote site to provide most of the functions described herein for the more professional system. All of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® or Sync can of course also be used with this system. The device would of course be accessible to a thief but disabling it would still be difficult since once programmed and the system initiated, the remote site could take action if it received an error message or no message at all. Deviation from the planned route and unexpected delays can also be dealt with as above. Changes in the monitoring functions can be controlled by the shipping company and be out of control of the driver. Thus, any interruption in the planned trip can trigger an alarm and evoke remedial action to stop the theft-on-progress.

Additionally, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen container location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, butt print, palm print, voice print, gesture, facial or iris recognition etc. thereby giving that capability to vehicles and improving the functioning of the theft prevention system. The device can thus become the general key to the vehicle. In particular it can be used to positively identify the authorized driver of a tractor and then automatically unlock the vehicle door as the driver approaches and lock it as he leaves the vehicle. If the cell phone is lost, its whereabouts can be instantly found since it has a GPS receiver and thus knows where it is. If it is stolen, it will become inoperable without the biometric identification from the authorized driver or wireless authorization from the owner or shipper.

Using the any of the various communication systems described above, an automatic crash notification system can be built. The crash can be sensed by the airbag crash or rollover sensors or the deployment of the airbag event can be sensed to trigger the communication of the event. The system can be powered by the vehicle power or a battery can be used that has a very long life since the system can be designed to draw little current until the event. Cell phones are now common that need infrequent charging such as once per week. An advantage of a self-powered system is that it can be more easily retrofitted to existing vehicles. Additionally, a self-powered system would still operate on the loss of vehicle power which can happen during a crash. It may be desirable to continue to transmit emergency notification signals even after the crash or trailer theft if help does not arrive or to communicate with the crashed vehicle to obtain confirming or additional information. In the event of a crash or theft, the trailer can be triggered to periodically emit a wireless signal on one or a variety of frequencies which can be used to help locate the trailer by appropriate emergency vehicles or the police, and so chosen so that they are difficult to defeat or otherwise immobilize.

This self-contained system can use a microphone, for example, to sense a theft, crash, rollover or airbag deployment and thus the only wiring required would be to the communication system which also could be contained within the unit. In some cases, the unit can be on a vehicle bus, such as the safety bus, where it can derive both power and crash information. A backup power supply in the form of a battery, capacitor or fuel cell can also be provided. The communication system can be any of those mentioned above including cellular phone system perhaps using text messaging such as SMS or, preferably, a ubiquitous internet system such as LTE or WiMAX. Such a ubiquitous system is not yet in service but the inventors believe that the arguments for such a system are overwhelming at least partially due to the inventions disclosed herein and thus it will occur probably in time for the deployment of a universal automatic crash or theft notification system as described herein.

Basic System

The basic non-cell phone resident system as described herein can include a processor securely mounted on the container and protected from destruction or tampering. It can be wirelessly programmed and loaded with the appropriate data by the shipping company or the driver prior to the trip. Once the trip is initiated, a stream of messages is sent to a remote site over the chosen communication system and reviewed by software at the remote site for the presence of an error code and for timeliness. If a message does not arrive when expected then the software begins notifying interested parties as described above. There is a balance between false alarms caused by a missed message and the cost of sounding the alarm. If, for example, authorities are sent to the last known location of the trailer and a theft is found not to be in progress then there is a cost to society of the false alarm and if this occurs frequently then the shipping company, which sets the parameters, can be expected to be charged or fined for the false alarms. Recognizing this in advance, provisions can be made to automatically transfer a payment from the shipping company to the responding authorities, the state police for example, for each false alarm or perhaps for each alarm. Such a system will help cover the cost of maintaining the state police and aid in the establishment of realistic parameters for asking for assistance.

Advanced System

Various levels of sophistication can be added to the basic system including the detection and reporting of intrusion into the shipping container, the monitoring of the cargo, monitoring and authentication of the driver, the sensing of occupants within the tractor and the trailer and more detailed route tracking. In the latter case, for example, the driver can be allowed various degrees of discretion in the choice and modification of the route depending on the confidence that the shipping company has in a particular driver and the value of the cargo.

Hazardous Cargo

The system described herein lends itself to the seamless monitoring of hazardous cargo to prevent this cargo from causing harm to the population or the infrastructure either due to terrorist activity or to accidents. Since each trailer that is tracked in the system can be monitored, a requirement can be instituted that all trailers, including railroad cars, that are carrying hazardous cargo must be registered on the system and the nature of the hazardous cargo identified. If, for example, such a vehicle is on a path to enter a tunnel or traverse a bridge where it is forbidden, the authorities can be notified well in advance of the occurrence in time to prevent it from happening. The planned route will be known in advance and any deviation from the route can cause an alarm. A cessation of transmitted messages also will signify a potential problem resulting in an immediate warning message being transmitted to authorities in the vicinity.

Through this system, all of the important information relative to the contents of containers containing hazardous material moving throughout the United States will be available on the Internet on a need-to-know basis. Thus, law enforcement agencies can maintain computer programs that will monitor the contents of containers using information available from the Internet or other system in a similar manner that ADS-B will allow the monitoring of all equipped aircraft worldwide when fully implemented. The transportation of fuel oil or fertilizer by themselves is not cause for alarm but if both are converging on the same location then an alarm can be sounded, for example.

Borders

The ID for containers involved in international trade can be part of a national or international database that contains information as to the contents of the container. If such containers are equipped with various sensors such as intrusion detectors or security seals which can be wirelessly scanned to determine that the integrity of the container has not been breached during its ride on a container ship or trailer, for example, then such containers can pass borders with minimum delay and inspection. This is based on the integrity of the shipping company. Any breach of this integrity caused by a container found with contraband can result in the blacklisting and demise of the company. As long as the monitoring procedures described herein are followed when the container leaves the embarkation point in a country and continues until it reaches its final receiving location then the integrity of the container is guaranteed. Since a container cannot be stolen while it is onboard a container ship, message transmissions can be suspended under program control on the container until the container ship reached a port where the container is unloaded at which point the messaging is automatically restarted.

It is expected that monitoring of the transportation of cargo containers will dramatically increase as the efforts to reduce cargo theft and terrorist activities also increase. If every container that passes within the borders of the United States has a unique identification number, similar to a license plate, and that number is in a database that provides the contents of that container, then the use of shipping containers by terrorists or criminals should gradually be eliminated. This ID should be of a form that is not easily separable from the container and it should be capable of being interrogated optically or wirelessly as are toll tags such as EZ-Pass. If these containers are carefully monitored by the communication system described herein, any unusual activity related to a container is immediately flagged and investigated and the cargo transportation system will gradually approach perfection. Thus, terrorists and criminals are denied this means of transporting contraband or stolen material into, out of and within the United States and other countries as they adopt the system. If any container is found containing contraband material, then the entire history of how that container entered the United States can be checked to determine the source of the failure. If the failure is found to have occurred at a loading port outside of the United States, then sanctions can be imposed on the host country and the shipping company responsible which can have serious effects on that company's or country's ability to trade worldwide. Just the threat of such an action is a significant deterrent. Thus, the use of containers to transport hazardous materials or weapons of mass destruction as well as people, narcotics, or other contraband as well as stolen cargo can be effectively eliminated through the use of the container monitoring system disclosed herein. Since the container used in a shipment will be identified by the shipping company at the start of a trip and monitored throughout the trip, theft of an ID tag will be of little value to a thief.

Prior to the entry of a container ship into a harbor, a Coast Guard boat from the U.S. Customs Service can approach the container vessel and scan all of the containers thereon to be sure that all such containers are registered and tracked including their contents. Before the ship is allowed to unload a container, the seals on that container can be scanned to assure that the container integrity has not been compromised. Furthermore, the identification and location of all containers on a container ship can be required information provided by the container ship owner thus further making it difficult for a rogue container to be present.

Containers that enter the United States through land ports of entry can also be interrogated in a similar fashion. As long as the shipper is known and reputable and the container contents are in the database, which would be accessible over the Internet, is properly updated, then all containers will be effectively monitored that enter the United States. The penalty of an error will result in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Intelligent selected random inspections guided by the container history could of course still take place.

This monitoring of containers can result in a permanent record containing the experiences of the container over time as a container history record to help in life cycle analysis to determine when a container needs refurbishing, for example.

This history in coded form could reside on a memory that is resident on the container or preferably the information can be stored on a computer file associated with that container in a database which can be located at a remote site such as a cloud storage facility. The mere knowledge of where a container has been, for example, may aid law enforcement authorities to determine which containers are most likely to contain illegal contraband. Additionally, the verifiable knowledge of the location of all registered containers will prevent the use of a false ID. In addition, the system discussed herein, border authorities may select a random sample to containers for careful inspection and verification.

Network

The remote site discussed above will receive the message data from the traveling containers and process this message data to determine the status of the shipping container. This remote site will in fact physically comprise a number of remote sites whose locations will be determined based of available communication lines, communication distances and other considerations. For each traveling container, the remote site will scan incoming messages, check for error codes and update the status file for that container. As discussed above, when an error code is encountered, or an expected message not received, the software will automatically execute procedures as instructed by the shipping company. The procedures can involve alerts being transmitted to the driver, other truckers in the vicinity, the shipping company, the cargo owner, a drone site, and/or authorities such as the state police.

Specific Problems

Although cell phone coverage is rapidly approaching ubiquity, there are locations such as tunnels where cell phone coverage can be lost. These locations are known and if a container is known to be in such a location the remote site software will know that one or more messages can be delayed. Since it is contemplated that messages from a moving container will be sent on the order of every several minutes, unless there is a traffic jam no more than one message should be lost. If this becomes a recurring problem the cellphone companies can be required to install additional transmitters at such locations. A potential problem involves a thief stopping a rig in a tunnel, for example, long enough for the thief to hijack the rig under gun point without causing a significant message loss. The solution to this problem lies in driver identification and security measures discussed below.

In a similar situation, an area can be jammed preventing messages from the trailer from being transmitted to the remote site. Jamming is both illegal and detectable by the cellphone company. Information concerning the existence of jamming and the frequencies affected can be sent to the remote site by the cell phone company. The remote site then can instruct the trailers in the area to change channels if there are channels available that are not jammed and to increase the transmission frequency while the trailer is in the jammed area. In the meantime the authorities can be notified and informed of the location of the jamming equipment. Drones, as discussed below, can be deployed if the situation is deemed sufficiently serious. This is one of many failure modes that will initially exist in the system of this invention and which can be gradually dealt with as perfection is approached.

If the tractor, train, plane or ship that is transporting a container is experiencing difficulties, then this information can be transmitted through the communication channel to the remote site and then to one or more interested parties according to the instructions of the shipping company for attention. Information indicating a problem with the carrier (railroad, tractor, plane or boat) may be sensed by sensors on the container and reported as an error code. For example, sensors on the container can determine through vibrations etc. that the carrier may be experiencing problems. The reporting of problems with the carrier can come from dedicated sensors or from a general diagnostic system such as described in U.S. Pat. No. 5,809,437 and U.S. Pat. No. 6,175,787. Whatever the source of the diagnostic information, especially when valuable or dangerous cargo is involved, this information in coded form can be transmitted to the remote site as discussed above.

Summary

Once the remote site has received a message from the sensor system disclosed herein, it can make available the data on the internet where subscribers or other authorized parties can retrieve the data and use it for their own purposes. Since such sensor systems are novel to at least one of the inventions disclosed herein, the transmission of the data via the internet, or via the communication channels disclosed here and the SMS or other texting technology, and the business model of providing such data to subscribing customers and other authorized users either on an as-needed basis or on a push basis where the customer receives an alert or other information, is also novel. Thus, for example, an interested party may receive an urgent automatically-generated e-mail message, phone call or even a pop-up message on a particular screen that there is a problem with a particular asset that needs immediate attention. In some cases the remote site software may require an acknowledgment which if not received can cause the site to make further attempts to notify the interested party. The interested party can be a subscriber, a law enforcement facility, or an emergency services facility, among others.

The initial communication system will probably use the SMS or similar text messaging system where the sender ID is its phone number. Thus, the phone number can also be the trailer ID number at least in early deployed systems. In the event the phone number of the device will need to be changed if the hardware is moved from one trailer to another as could easily be the case when the device is a iPhone®, iPad® or equivalent. Under these circumstances the trailer would need to have an ID different from the phone number and a list pairing trailer IDs, which hopefully would reside on a trailer resident RFID or similar device, with the sending phone numbers. Each time a trip is initiated, in this case, the first transmission to the remote site would need to contain the pairing of the phone number with the RFID, or equivalent, read trailer ID. Naturally, this needs to be done with some care to prevent spoofing.

Another form of communication to be activated in the event of an attempted or actual theft is to position one or more auxiliary transmitters on the trailer which can be remotely triggered in the event that the primary system has been disabled. These transmitters can operate at different frequencies and/or use frequency hopping or transmit as ultra-wideband devices and can serve as beacons to enable the authorities, drones or other truckers to locate and track a stolen trailer. If several such devices are hidden on the trailer then as each one is silenced another can take over. This will be discussed in more detail below.

4. On Vehicle Theft Countermeasures

The invention described in this section principally relates to theft prevention systems for trailers, particularly those used in an over-the-road tractor-trailer vehicle combination commonly referred to as an "18-wheeler". These trailers are almost universally provided with pneumatic braking systems which include a parking/emergency brake with brake shoes, in the case of drum brakes, or brake pads carried by a caliper, in the case of disk brakes, urged to the braking position by spring means in the absence of pneumatic pressure supplied to the braking system.

In this common arrangement, a parked trailer being disconnected from the tractor vehicle with its source of air pressure will have its parking/emergency brakes urged to full braking position preventing the trailer from rolling or being moved. However, the trailer can be moved by any standard tractor vehicle having the usual air hose and electrical connections. Once a tractor is connected with its air hoses to the trailer and the trailer braking system is pressurized, the parking brakes air pressure causes the spring forces to be overcome so that the parking brakes are no longer applied.

Numerous designs have been employed to prevent or deter theft of a parked trailer, including systems which require some action in addition to connecting air and power lines. Some of the theft deterrent systems incorporate a solenoid or motor operated valve in the appropriate air line between the tractor and the trailer wheels and have a key lock switch or other device required to energize the solenoid or motor. The valve will open when the key switch is closed to allow air pressure from the tractor to release the brakes on the wheels of the trailer. However, even if a key is required for the valve to operate, the system can be easily defeated by braking into the valve housing and shorting the key switch or, in the case where this is not accessible, by bypassing the valve with a new air hose. The air line is always accessible somewhere in its path from the tractor to the brakes. The line is cut and a new line that bypasses the key valve installed. Such an action can generally be accomplished in a few minutes or less with the proper tools.

Various countermeasures such as vehicle immobilization can be used to remotely disable a stolen vehicle and aid in its recovery. Other known countermeasures include king pin locks that prevent the tractor and trailer from being separated, air brake valve locks that prevent brake release, and glad hand locks that lock the trailer's air line. Seals also limit intrusion and create an alert that doors have been tampered with. This fact can be sensed and reported off site through the communication system described herein, for example. Other countermeasures include causing one or more tires to deflate, sounding an alarm, disabling the power train or locking the brakes are possible but once the thieves learn about any of these countermeasures they will develop a method of defeating them. At the very least, fleets should be using tamper-proof locks and door hinges. Most, if not all, of the truck manufacturers now offer password-protected ignition lock-out systems.

The first new countermeasure that can be used is to notify the driver that a theft is in progress which can be triggered by any of the events described elsewhere herein. Thieves are reluctant to steal a trailer if the driver is present as this can lead to an armed robbery or another felony. If the trailer is in an area where other truckers are present then notifying all trucks in the vicinity can cause one or more trucks to attempt to block the motion of the stolen trailer or, as a minimum, to follow it and report its location until the authorities arrive. Naturally, a reward can be given to a trucker that successfully prevents a cargo theft.

Sophisticated thieves can determine a fix for most any countermeasure that is installed on a trailer. Nevertheless, each of these fixes or work-arounds consumes time which makes their capture more likely. One such countermeasure can involve rendering the trailer unmovable such as by locking the brakes, making the tires flat, immobilizing one or more axles, preventing the trailer from turning etc. If, for example, a device is placed on the trailer that engaged the emergency or parking brake system by depleting the compressed air from the compressed air cylinder that feeds the emergency or parking brakes whenever the trailer was parked and/or detached from the appropriate tractor, then stealing the trailer would be rendered more difficult. Naturally, the thieves can devise a method to supply air to the lines that feed the emergency brakes or they can otherwise modify the brakes so that they disengage but this will consume time. What follows is a description of a typical air brake system from Wikipedia.

"Compressed air brake systems are typically used on heavy trucks and buses (Note the difference between pneumatic brakes and pneumatic/hydraulic). The system consists of service brakes, parking brakes, a control pedal, an engine-driven air compressor and a compressed air storage tank. For the parking brake, there is a disc or drum brake arrangement which is designed to be held in the 'applied' position by spring pressure. Air pressure must be produced to release these "spring brake" parking brakes. For the service brakes (the ones used while driving for slowing or stopping) to be applied, the brake pedal is pushed, routing the air under pressure (approx 100-125 psi) to the brake chamber, causing the brake to reduce wheel rotation speed. Most types of truck air brakes are drum units, though there is an increasing trend towards the use of disc brakes in this application. The air compressor draws filtered air from the atmosphere and forces it into high-pressure reservoirs at around 120 PSI. Most heavy vehicles have a gauge within the driver's view, indicating the availability of air pressure for safe vehicle operation, often including warning tones or lights. Setting of the parking/emergency brake releases the pressurized air pressure in the lines between the compressed air storage tank and the brakes, thus actuating the (spring brake) parking braking hardware. An air pressure failure at any point would apply full spring brake pressure immediately.

"Brakes are applied by pushing down the brake pedal. (It is also called the foot valve or treadle valve.) Pushing the pedal down harder applies more air pressure. Letting up on the brake pedal reduces the air pressure and releases the brakes. Releasing the brakes lets some compressed air go out of the system, so the air pressure in the tanks is reduced. It must be made up by the air compressor. Pressing and releasing the pedal unnecessarily can let air out faster than the compressor can replace it. If the pressure gets too low, the brakes won't work.

"These large vehicles also have an emergency brake system, in which the compressed air holds back a mechanical force (usually a spring) which will otherwise engage the brakes. Hence, if air pressure is lost for any reason, the brakes will engage and bring the vehicle to a stop."

Not all trailers have emergency or parking brake systems that engage the brakes when a source of air pressure is not present. For those that do not then a radio-activated valve or explosive device within the vehicle tires can perform a similar function at the cost of possible tire replacement. However, most modern trailers especially those carrying high value cargo do have such systems and thus only such systems will be addressed in this section. Since every system that can be devised can also be circumvented by determined and sophisticated thieves the goal here is to render the circumvention as time consuming as possible. FIG. 22 illustrates a block diagram of such a system.

The compressed air required to release an emergency or parking brake flows through a brake dump valve at the air-brake assembly at each wheel as described in U.S. Pat. No. 6,923,509. A wire connects each of the dump valves to the trailer power cable which in turn connects to the power supply cable from the tractor. Information to indicate to each dump valve to close allowing air pressure to release the brake can be transmitted from the tractor either wirelessly, in which case an antenna would be present on the trailer to receive the wireless transmission and a corresponding antenna on the tractor, as a modulated signal over the power cable or on a separate wire. Each dump valve responds to the proper message from the tractor and if it received the proper message then the valve opens or closes depending on the message. In an implementation of the invention in the '509 patent in conjunction with the teachings herein, the message can also be sent by a remote site or by the driver with a hand held device such as a smart phone. The SMS protocol can be used as discussed above. If power is disconnected then the valve can open dumping the compressed air and engaging the brakes. Thus, if any of the valves do not receive the proper message then the brakes are engaged and the trailer is unable to be moved. The coded message can change from transmission to transmission as known to those in the art of wireless entry fobs making it difficult or impossible for a spoofing transmitter to operate the valves. Since each valve can have its own ECU for receiving and decoding the messages and each ECU is attached to the valve, disabling the system may require disassembling each airbrake device at each of the tires and/or requires dismounting some or all of the tires which is a time consuming process.

However, the system can alternatively be simply disabled by severing the rod from the airbrake system to the drum or disk brake mechanism. With the proper tools this can be done in perhaps less than a minute thereby defeating the system and allowing driving off with the stolen cargo trailer. Although the remote site may be aware that a theft is in progress, depending on the sensor suit on the trailer, there is probably insufficient time to prevent it and the remote site may not even be aware of the theft until the trailer is on its way. The thief will have to drive the trailer without functioning brakes but if the load is light, and the roads level, this may not interfere significantly with his driving maneuverability especially if the distance to a staging location such as a warehouse is short. Various sensors can be placed on the brake mechanism that can indicate that the brake has been released but again this allows little time to stop the theft.

All of the theft prevention systems based on immobilization so far described in the prior art can thus be easily defeated by a thief with the proper equipment. What is needed, therefore, is a system that results in a considerable delay before a trailer can be moved. Two such systems will now be described based on systems that mechanically lock the brakes in the engaged position and require the removal of the trailer wheels to obtain access and allow disablement. The removal of a wheel requires jacking the trailer at each wheel and the removal of many nuts, which forces the thief to consume considerable time. Appropriate sensors coupled with the communication system indicate that such an action is in progress and thus the remote site is provided significant time to take theft prevention actions such as informing the law enforcement authorities in the area. In fact, with appropriate sensors, before the thief begins the remote monitoring site is aware that a theft is in progress there should be ample time for law enforcement personnel to arrive before the trailer can be moved. Various additional techniques can be employed to further retard the tire removal process such as the use of locked lug nuts or nuts with an unusual profile requiring special tools for their removal.

Looking now at a drum brake locking system as shown in FIGS. 30-30E. FIGS. 30A-E illustrate the use of a ratchet wheel 801 in conjunction with a drum brake shown generally at 800 in FIG. 30. Pawls 802 engage with the ratchet wheel when the parking brake is activated and prevent rotation of an S-Cam 803 until they are withdrawn by an activating solenoid 804. The activating solenoid 804 is controlled by a brake lockout controller 805 which receives messages from the communication system as elsewhere herein. The brake lockout mechanism is situated and shielded with a plate and mud guard 820 such that removal of the associated wheel is required to gain access to and defeat the brake lockout device. The controller 805 contains a processor and circuitry which is configured to decode signals sent either wirelessly, over the vehicle power line or on a dedicated communication wire from either a device located on the vehicle tractor or another device which may be portable, such as a smartphone, or remote from the vehicle.

It is important to note that for some heavy duty trailers, the brake area can achieve temperatures as high as 300 degrees Celsius which is sufficient to destroy or immobilize most electronic systems. In most cases the brake locking system will only be activated after the trailer has come to rest and cooled down. Thermally activated mechanical switches can prevent the circuitry from being powered until the temperature has reached a safe to operate level. Nevertheless, just exposure to these temperatures can destroy or make permanent changes to the electrical characteristics of various components that make up common electrical and electronic circuits. Circuits can be constructed of special materials such as gallium arsenide but this can have a significant effect on the cost and reliability of such components and circuits. For those vehicles where excessive temperatures can occur in the brake areas, therefore, an alternative approach is required. Such systems can place the electronic controller 805 outside of the brake area and attach it to the ratchet moving solenoids or motors through wires to an electromechanical based decoding mechanism located within the brake area. In this case, the controller 805 will send a coded signal over the power line, or through dedicated wires, to the ratchet mechanism which will go first through a mechanical decoding mechanism and if the mechanism experiences the proper code it will connect the power to the ratchet solenoids or motors in such a manner as to engage or release the ratchet wheel as desired. In one implementation, for example, the current to drive the pawl solenoids or motors is controlled by an assembly of three stepping switches designed to operate in a high temperature environment. When the stepping switches are all at their "0" or at home position, current can be provided to the solenoids or motors to cause the pawls to engage the ratchet wheels. When the ratchet wheels are so engaged a mechanical switch engaged by the motion of the pawl rods turns off the current causing the ratchet wheels to remain locked. Later, when the controller 805 sends the proper number of pulses to each of the three stepping switches, the current is caused to flow to the solenoids or motors to cause the ratchet wheels to be released. Again, a mechanical switch at the end to the solenoid or motor rod turns the current off. If each stepping switch has 50 positions then the number of possible codes to release the brake locks is 125,000. If it takes 0.1 seconds to step each of the stepping switches, then it would take over 3 minutes to try all combinations. Additional delays can be inserted such as turning the current on when the switch is supposed to be in the release position and if it is not a 1 minute delay can be inserted by those skilled in the art. Each wheel would have a unique code for releasing the brake lock which would be sent by the controller 805 from information sent by the coded transmission system.

The use of remote electronics and stepping motor operated switches is illustrated in FIG. 32 wherein the electronic controller 805 has been removed from the brake area where high temperatures can be experienced, to a convenient location outside of this area. A wire 812 connects the controller to an assembly of three motorized high temperature stepping switches 811 which are connected to the pawl motors or solenoids by appropriate wires (not shown). A wireless connection is also possible.

The pawls 802 and ratchet wheel 801 are designed so that when the pawls 802 are engaged, the ratchet wheel 801 can rotate in a clockwise direction in the figure without disengaging the pawls 802 from the ratchet wheel 801 but not in the counterclockwise direction. Thus, the force exerted on the brake pads by the S-Cam 803 can increase as the brakes are applied but not decreased without removal of the pawls 802. Thus, once the brakes are applied they are locked in place until the solenoid or motor is activated to remove the pawls 802 from locking the ratchet wheel 801.

The solenoid assembly is designed as a bi-stable system. When the current in the activating coil 806 is applied in one direction, it will cause the magnetized solenoid armature to withdraw the pawls 802 from engagement with the ratchet wheel 801 and when the current is applied in the other direction, the pawls 802 are forced into engagement with the ratchet wheel 801. After the solenoid arm is caused to move in one or the other direction, it is detented into position by detent balls 807 which engage with grooves 808 or 809 under a force supplied by spring 810. Groove 809 is slanted so as to urge the solenoid armature toward the ratchet wheel 801 so that the pawl 802 is spring-biased toward engagement to allow for tolerances and the case where the pawl 802 rests on top of a ratchet wheel tooth. The pawls 802 can be slightly displaced from one another as shown in FIG. 30E so that in the rare case when the teeth of a pawl 802 land on the teeth of the ratchet wheel 801, only one of the pawls 802 can temporarily hang up. Additionally, the ratchet wheel teeth can be removed from a portion of the wheel that corresponds to the brake off condition so that if for any reason the system fails and tries to engage the lock when the brake in not activated, it cannot do so and thus create an unsafe brake locking condition. Other fail-safe mechanisms can additionally be employed depending on safety requirements including, for example, a lockout of the system if the vehicle wheel is moving.

This design, therefore, locks each wheel where it is implemented to prevent movement of a trailer or tractor unless the proper electronic signal is received by the controller 805. This signal can emanate from a smartphone in the possession of the authorized driver, for example, and be transmitted wirelessly to the controller 805. The smartphone can contain a face, palm or fingerprint recognition capability, for example, to verify the identity of the operator of the smartphone. Once the proper coded signal is received by the controller 805, a current is sent to the solenoid coil in the proper direction to cause the pawls to be removed from engaging the ratchet wheel releasing the brake lock. To defeat the system, a thief must remove the wheel which is a time consuming activity. Such a system can be applied to one or more of the wheels in a simple retrofit manner to increase the difficulty of theft to any degree desired. Of course, other systems than a smartphone can implement the same or similar strategies such as a vehicle tractor-resident system or a system that requires authorization from a remote site. When the chance of theft is minimum such as when the trailer is empty or located in a secure holding yard, the authorized driver or remote site can issue a coded command which removes the pawls 802 from engagement with the ratchet wheel 801 and disables the system until it is enabled again. The state of the system can be coded into the SMS messages sent to the remote site. In normal operation, the pawls 802 will automatically engage whenever some event such as engine shutoff occurs and to disengage the pawls 802 requires the receipt of the proper coded message. The coded message can be chosen so that it varies in a known pseudo random manner to make it difficult or impossible to spoof.

The solenoids are configured such that they can act in a bidirectional manner and remain in either the engaged on disengaged state when no power is present. This prevents the accidental operation of the brake lock system if power is accidently removed from the locking system when the vehicle is in motion, for example. Also, the brakes will remain locked in the absence of power indefinitely preventing movement of the vehicle until power is supplied and the proper coded message received by the controller 805.

To achieve the bidirectional feature, an upper portion 821 of the solenoid rod either is made from magnetized magnetic material or comprises a permanent magnet. Portion 821 is magnetized along its axis such that a current in one direction in the coil 806 causes the solenoid rod to move downward as shown in FIG. 30C or upward as shown in FIG. 30D. FIGS. 30C and 30D show metal brackets 822 that attach the pawls 802 in a movable manner to the drum brake 800, its housing or other mounting structure. Although for simplicity a solenoid version of the invention has been illustrated, the preferred approach is to use a small motor to move the pawl into engagement and disengagement. The motor can operate through a rack and pinion, worm gear or cycloidal drive as is known to those skilled in the art for transforming the high speed, low torque of a motor to a high force slow linear motion of a rod. Many other mechanisms are available to move a pawl or equivalent into engagement with the ratchet wheel some involving linear and other involving rotary motion. The detent balls and grooves in general might not be necessary when motors are used since the rod is unlikely to move when the motor is not powered.

Figure 31A:
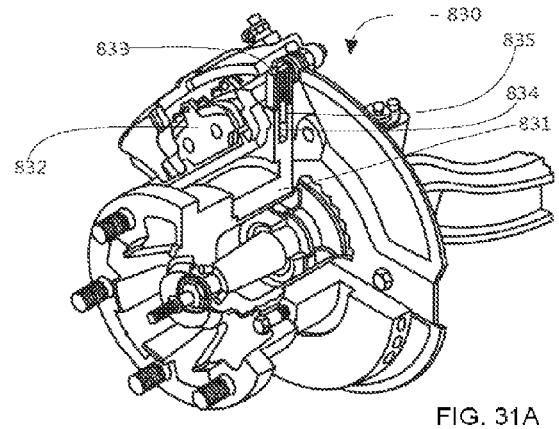
Figure 31B:
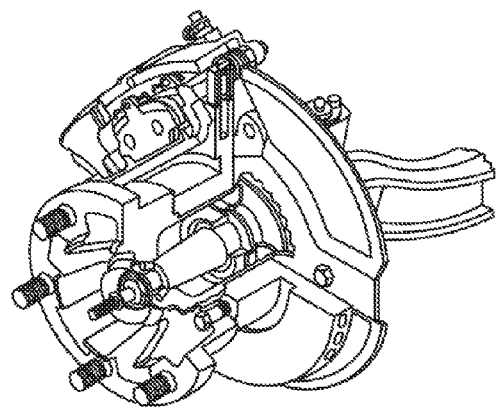

FIGS. 31A-31C illustrate a mechanism for use with disk brakes which similarly prevents rotation of the disk rotor when engaged. In this design two solenoid pins are inserted along radii into the disk rotor itself such that the rotor is prevented from rotating. The solenoid pins 835 are removed by the electric currents in the appropriate activating coils under direction of a brake lockout control module (not shown) in a similar manner as with the drum brake system of FIG. 30. The solenoid driven pins 835 engage the disk rotor 831 in the radial slots 834 provided in the disk rotor 831. The solenoid assemblies can be attached on either side of the caliper 832 as shown in FIG. 31C or in some other appropriate mounting configuration. In some cases a single solenoid assembly is sufficient and in others more than two can be used. For cases where the disk rotor does not have radial slots an alternative arrangement can be used such as providing holes or slots through the disk rotor parallel to the rotation axis or to mount a ratchet wheel to the face of the disk rotor. In the axial parallel holes case the rotor may need to rotate some amount before the pins enter the appropriate hole and thus there would need to be a force provided such as by an angled ball detent grove to urge the pin into a hole without the need for continuous power. This would operate in a similar manner as the ball detents in the ratchet wheel example of the drum brake ratchet wheel case.

Naturally many other designs will now become obvious to those skilled in the art for mechanisms which in a similar manner lock the brakes in an engaged position or otherwise prevent a wheel from rotating when commanded to do so by an appropriate control module. Pins can be inserted into the brake drum under solenoid or motor control to prevent it from rotating as in the disk case or the brake pads in the disk brake caliper can be held against the rotor by appropriate motor based designs. In general bidirectional motors, stepping motors or other actuators can be used where solenoids are illustrated in the figures. The basic principle in each case is to lock the wheel in such a manner as to prevent it from rotating until an appropriate message has been received by the control module and to do so in such a manner that the thief cannot access the mechanism without removal of the vehicle wheel. Since removal of the wheel is time consuming the theft is delayed. If the system is put on multiple wheels further delay results. Any of a wide variety of sensors can be used to detect that a wheel removal is in process and that fact can be coded into the SMS or equivalent message periodically sent to the remote site. Examples of such sensors are: an acoustic or vibration sensor located where it can sense the noise or vibration associated with removal of a wheel, an accelerometer or angle sensor which indicated that the trailer is being jacked up, a strain gage on the airbrake rod indicating that the force from the airbrake to the brake mechanism has been reduced, and others. If the remote site does not receive the expected message or if it receives the message with the theft-in-progress code then it can initiate the process of preventing the theft.

The creation of the brake lockout code can be done either in the tractor, on a smart wireless RFID fob or by a cell phone or smartphone. In the latter case the monitoring office can compose the coded message and transmit it to the driver's cell phone after verifying that the driver is in possession of his cell phone, is in the tractor and has not been abducted. In this manner trailer security is significantly enhanced. A biometric sensor such as a fingerprint, palm, face or voice recognition system, can be used with the transmitting device to verify the driver.

The brakes lockout should be set in this manner whenever the driver is absent. Additionally the brakes can be engaged if anything goes wrong however care must be exercised if the trailer is in motion so as not to cause an accident or facilitate a theft of the cargo.

There are situations when the brake lockout system may have to be disabled. When the trailer is dropped off in a secure drop yard such when it is to be loaded onto a container ship, ferry, rail car or other transportation means or when the shipper is being changed such as can happen at a border. This situation is known in advance and the lockout device can be automatically disabled for so long as the trailer is located in the secure drop yard. This can be accomplished merely by the trailer knowing its GPS location, via a location or position determining system arranged on the trailer or elsewhere with the resultant location determination being provided to the trailer, and that within a certain geographical area that the lockout system is to be deactivated. In other cases, a remote site can send a coded message to disable the lockout system or can provide authorization to the driver to do so under controlled conditions. The controlled conditions can include again geographical location and time duration. The lockout provision can also be disabled when the trailer is empty or at a secure location where it is being loaded or unloaded, that is, prior to the start of the planned trip or after it has arrived at its final destination and responsibility is removed from the shipping company. This lockout feature should also be suppressed while the trailer is in motion so as not to cause an accident.

In operation, the driver approaches or enters the cab and either manually sends a coded control signal to the brake lockout controller or the system in the tractor does this automatically once the driver has been identified. In the second case the driver does nothing different than he would do with a non-equipped trailer. If a non-system equipment truck or tractor or one without the proper authorization, attempts to move a protected trailer, the driver will find that the brakes cannot be released normally by applying pressure to the parking air supply line in the absence of a coded signal transmitted to the brake lockout controller at each equipped wheel. The lockout system described herein is not limited to single trailer rigs and may readily be adapted to provide security for one or more tandem trailers and additionally for the tractor.

5. Tracking a Stolen Trailer

Thieves may be able to steal a trailer in fifteen seconds but there is a limit to what they can do in that time period to disguise the trailer or prevent it from transmitting a signal from a hidden transmitter. Anything that can be done to slow the thieves gives more time for drones and/or law enforcement personnel or equipment to arrive. Thus, the painting of an ID on the top and sides of the trailer in paint that only reflects IR or UV light and/or the placement of a pattern embossed in the roof that reflects radar in a manner as to reveal an ID can all be defeated by sophisticated thieves once they know of their existence, but it will take time to do so. Similarly, transmitters can be hidden on the trailer that are turned on by a combination of motion and the receipt of a signal either from the trailer monitoring system or from the remote site that can cause a transmission at a frequency, which can be remotely selected, that is unknown to the thieves. To continuously monitor for such transmissions as they are making their escape and to stop, locate and silence the transmitter takes time and slows down their escape and thus increases their chances of being caught.

Another solution that is particularly applicable in areas and/or at times when the targeted trailer is alone, is to use drone aircraft to photographically capture the trailer, or home in on transmissions from the trailer, and follow it until the authorities arrive. If purchased in sufficient quantity the price of such drones can be as low as $1,000 to $10,000. Initially these drones can be stationed at areas that are known as high risk areas. The goal would be to have a drone stationed so that it need not travel more than 0.25 mile at an average speed of 60 mph, including takeoff, so that it can get to the crime scene in 15 seconds or less. Naturally, most of the 50,000 miles of interstate highways are not likely locations for a trailer theft. Assuming that only 10% are such locations then two drones could be stationed per mile covering 5000 miles resulting in a need for 10,000 drones. At a cost of $10,000 each the total cost to cover the interstate highway system would be $100 million which is a small percentage of the cost of cargo theft. Even if it is desired to cover all of the 4 million miles or roads in the US and assuming that 1% are likely locations for a cargo theft the cost is only an additional $100 million Even if the annual operating cost is substantial, the total cost is still less than on the order of $1 billion which is small in comparison to the cost of lost freight.

Another approach is to station drones on truck tractors and/or trailers so that at the first sign of an event indicative of a theft a drone can be caused to takeoff and track the trailer photographically or by other means. If the drone is disabled by the thieves, drones from trucks in the vicinity can get invoked. The presence of a ready to go drone can be part of the message that is sent by trailers so that if one or more drones are disabled this is immediately made known to the remote monitoring site.

A common tactic for cargo theft is for the perpetrators to know in advance the route that a particular targeted trailer will take and where the driver is likely to stop for a rest, bathroom stop or for a meal. When the driver parks his rig and enters the facilities the thieves drive another tractor to where the targeted trailer is parked, detach the trailer from its tractor and attach it to the replacement tractor. Alternately the thief breaks into the tractor and hot wires the engine and drives away with the tractor and trailer. It has been reported that this can be done in as little as 15 seconds after which the new tractor and stolen trailer, or the original rig, is on its way before the theft is discovered by the driver. After this event occurs time is of the essence. In the process of stealing the tractor the thieves will frequently electronically listen for any transmissions from the trailer or tractor and attempt to destroy the transmitter or electronically jam or block the transmissions. Conventional systems transmit infrequently so it can be several minutes to an hour or so before the remote site is aware that a theft has occurred. By that time the thieves and cargo are long gone.

The system disclosed herein solves this problem in a number of ways. First the transmissions from the trailer are very frequent such as once per five to thirty seconds when the trailer is not moving on the highway and that frequency increases to perhaps once per one to five seconds when an event, as discussed elsewhere, occurs. When an event occurs the driver is notified directly as well as the remote monitoring site. If the transmissions cease either after or before an event has been detected then both the remote site and the driver are alerted by the monitoring software. Thus, the monitoring site and driver are alerted within seconds of an attempted theft. The system on the trailer can also be programmed to listen for an acknowledgment from the remote site and retransmit the message if an acknowledgment is not received. This solves the problem where the trailer is in a tunnel or where a transmission is blocked for any reason. To minimize costs the remote site would not always acknowledge a message transmission. If it did not receive an expected transmission then it can send a request for a message and repeat that request until a message is received after the trailer emerges from the tunnel, for example.

The remote site can then alert authorities which can then drive to the site of the trailer. If the trailer has identifiable markings then the authorities have a chance of locating it if they can get to the theft site before the thieves have gotten very far. However, the thieves frequently cover the sides of the trailer with disguising posters, placards, signs or just paint making it more difficult to recognize.

Since the key is to obtain and maintain sight of the stolen trailer and since it is likely in most cases that the law enforcement authorities will be too late, other methods are necessary. The first effort, therefore, can be to get the driver involved. His mere presence can thwart the attempted theft since the penalty for abduction, kidnapping, assault or armed robbery is considerably more severe than mere theft, thieves will in most cases flee if the driver approaches. Secondly, if the driver is a bit too late he can perhaps use his tractor, if available, or convince another driver to allow him to ride with him as they chase the stolen vehicle keeping it in sight while they are in communication with the law enforcement converging on the stolen trailer. Thirdly, truckers in the vicinity can be made aware of the theft and convinced to converge on the stolen trailer with the promise of a reward. A reward may not be necessary as the trucking industry is acutely aware of the cargo theft problem and are vitally interested is eliminating the problem which takes a toll from all participants. Fourthly, ordinary citizens can in some cases be persuaded to follow a stolen trailer if they see and can recognize it thereby helping to track it until law enforcement personnel arrive. Trailers can also be equipped with a remotely activated paint or smoke bomb. The paint bomb can color the rear doors making it easily identifiable and a smoke bomb hidden on top of the trailer can emit an easily visible smoke trail lasting perhaps 30 minutes. Naturally other deployable systems will now be obvious to those skilled in the art.

If all else fails, drone aircraft can be judicially placed initially at truck stops and other locations where there has been a history of cargo theft and on command from the monitoring site can be launched, fly to the trailer location and maintain visual contact with the trailer until law enforcement authorities arrive. Candidate drone aircraft are described in many articles available on the Internet.

The use of drones has increased exponentially in Iraq and Afghanistan in recent years and consideration is now being given to their use initially for patrolling the Mexican US border. Tests are being conducted to find uses for drones by local and state law enforcement but a compelling case has yet to be made for their widespread use. Such a case can be the reduction of cargo theft and its eventual elimination as described for the first time here.

Although an optimized drone will likely be developed for this particular application, there are a number of candidates available now that can satisfy the need with varying cost and proficiency. At one extreme is the Predator at several millions of dollars each and at the other is the Parrot AR.Drone at $300 each. The AR.Drone is the first quadricopter that can be controlled by an iPhone®, iPod® touch, or iPad®. Although its flight time is limited to about 12 minutes, this can be increased if this were chosen for the cargo theft prevention task. Other options include the Raven-B which was also developed for the military and thus is expensive, however, if modified for the cargo theft use and purchased in significant quantities this could be a good choice as it has a 4.5 foot wingspan, weight 4.2 pounds and is hand launched.

Most of the drones currently available are fixed wing aircraft. Helicopter based droned are also available and are likely to be preferred due to their ability to hover over the trailer and keep it in sight. An inexpensive candidate is reported in U.S. Pat. Nos. 7,059,931, 7,101,246 and 7,104,862 which would need development for this use. An alternative is The German-made Microdrone which is a small drone helicopter which is targeted in Germany for police use. Although not as fast as a fixed wing plane it has a range of 2000 meters and an hour flight duration. As long as hovering is not required, a fixed wing drone is preferable as it is less expensive and faster. In particular the Prioria Maveric or variations thereof is particularly suitable. It can be stored in a 6 inch diameter tube and launched immediately by one person. It has a top speed of greater than 60 mph. It thus can be easily stored at truck stops and other fixed locations or in traveling trucks as well as police and other vehicles.

The FAA has reported that "In the United States alone, approximately 50 companies, universities, and government organizations are developing and producing some 155 unmanned aircraft designs." It is therefore difficult at this time to pick the best drone for this use. See "Fact Sheet—Unmanned Aircraft Systems (UAS)" at the FAA website. Also see "Police line up to use drones on patrol after Houston secret test".

Figure 16:
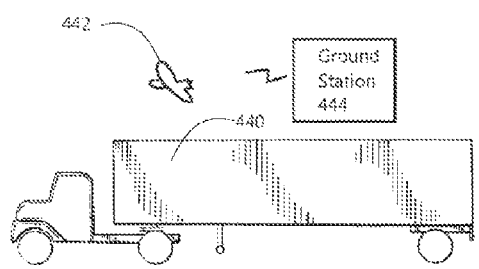
FIG. 16 illustrates a tractor with a stolen trailer being monitored by a drone.

FIG. 16 illustrates a fixed wing drone 442 pursuing a speeding tractor with a stolen trailer 440. The drone is controlled by a ground station 444 which can observe the video images captured by the drone. Once the drone has found the target it can visually lock onto it and follow it wherever it goes while returning its location until law enforcement personnel are able to chase the trailer and eventually apprehend it. In some cases, it can land on and attach itself to the roof of the trailer or tractor.

To summarize, for the case where a thief steals the trailer or the entire tractor and trailer rig, once the theft has occurred the monitoring station will know either by the event transmission or by the lack of a transmission within seconds of the occurrence. The driver will be immediately notified and in the event that that is insufficient to stop the theft, law enforcement will be immediately notified as will truckers in the area. The truckers will attempt to block the stolen vehicle or otherwise delay its motion, by blocking lanes on the highway for example, giving the law enforcement authorities time to get on the scene. The truckers will in addition attempt to follow the stolen vehicle again giving the law enforcement authorities knowledge of the location of the stolen vehicle. Additionally, drone planes can be launched and also attempt to find and track the stolen vehicle.

To aid in tracking the stolen vehicle, one or more hidden transmitters 446 can be located on the trailer which only transmit when they receive a special coded signal preferably at a frequency that is different from other on vehicle transmitters and thus a frequency, which may be changeable, which has not been heretofore blocked by the thieves. Thus, once the stolen vehicle is moving the transmitter can be triggered to provide a beacon for the police and the drone aircraft to lock onto. Since the transmitter is not operating except when triggered, the thieves would not know of its existence until they were making their getaway and thus unlikely to stop to attempt to stop or jam the transmitter's signal. These tracking transmitters can be judiciously hidden at random places built into the trailer so that even if the thief suspects that there may be one or more present it would be difficult for him to locate and defeat them. Some of them, for example, can even be placed within the cargo. This suite of countermeasures plus driver identification and other sensors discussed elsewhere coupled with other countermeasures discussed herein designed to stall the thief will make the theft of a trailer a very high risk time consuming process thus providing time for law enforcement authorities to arrive. This will thus result in a very high failure rate for thefts and thus eventually eliminate cargo theft achieving one of the objectives of this invention.

In another application discussed briefly above, one or more exterior surfaces of the trailer or cargo container can be embossed or otherwise contain patterns of reflectors (e.g., corner cube or dihedral) which reflect an identifying code when illuminated with electromagnetic radiation such as radar or terahertz. This radiation can be in the terahertz or other appropriate portion of the electromagnetic spectrum which penetrates nonmetallic materials and reflects off of otherwise hidden surfaces which are underneath and which can contain metal. Thus, thieves may attempt to cover up the exterior surfaces of a trailer with paint or other camouflaging material without realizing that the ID of the trailer can still be identified with the proper radiation. Drones, authorities, border guards and/or others can thus recognize such an equipped stolen trailer. Similarly, hidden RFID responder tags, paint or smoke bombs can also be used to respond to an interrogation either at an unexpected frequency or special code, for example, which has not been jammed by the thieves.

6. Driver Identification

The presence and identification of people can be derived using various devices, such as, in the simplest form, by analysis of information from RFID devices carried by an authorized driver or mounted to the vehicle's structure such as the seats, and then transmitted off of the vehicle. This concept is disclosed in U.S. Pat. No. 5,829,782, along with the presence of tags and tag monitors inside a vehicle. Thus, the presence of an authorized driver can be verified as well as the presence of other unauthorized occupants of the trailer determined by identification devices and/or occupant sensors. Thus, if the driver is being abducted and another person is residing within the cab, this information can be sent to the remote site for remedial action.

Since the most vulnerable time for trailer or cargo theft is when the trailer is left unattended, an additional protection can be obtained if the tractor can identify that the driver is present either in the cab or at least near to the tractor, i.e., as a function of distance between the driver and the tractor or cab. This distance may be ascertainable by providing the driver with a portable device that cooperates with a device on the tractor or cab, e.g., a transponder/interrogator system. The message rate and/or monitoring frequency can be reduced once the driver is known to be inside the tractor and the engine is started. The message rate and/or monitoring frequency can also be varied (reduced or increased) based on a condition of the vehicle, the presence of a driver inside the vehicle, a distance between a driver of the vehicle and the vehicle, determination that the vehicle is at rest after motion of the vehicle stops, and a location of the vehicle. In the latter case, the location of the vehicle can be determined using an on-board location-determining system (e.g., 485 in FIG. 20B) and the determined location provided to a processor that determines the modification to the transmission rate of the messages (628 in FIG. 17).

The condition of the vehicle that causes a change in the message rate or monitoring frequency may be a deviation of the vehicle from an expected route, as determined by a processor that compares the current position of the vehicle obtained by a, for example, GPS device, to the expected position.

The condition of the vehicle that causes a change in the message rate or monitoring frequency may be a biometric identification of a driver of the vehicle. In this case, the biometric identification of the driver is installed or incorporated onto a portable electronic communication or processing device that is carried by the driver when the vehicle is in transit.

The message rate or monitoring frequency may be changed based on current time, current vehicle or driver location and/or weather around the vehicle. It may also be changed based on a property of an item of cargo inside the container. It is also possible to detect a property of the vehicle using at least one sensor and modify a rate of transmission of the messages by the transmitter based on the detected property of the vehicle. The sensor may be arranged in or on the container to detect information about a property of the container or a property of an environment in or around the container and then interrogated by an interrogator to obtain information about a property monitored by the sensor at a frequency that is independent of the periodic transmission of messages by the transmitter. The sensor may detect information about a property of the container or a property of an environment in or around the container and commands directed from a remote site to the container to cause the sensor to be interrogated and obtain information about a property monitored by the sensor.

The coded message can contain a code bit that relates the status of the driver. Is he present in the driver seat, etc? The sensing of the authorized driver can be accomplished in a variety of ways such as by sensing that a person approaching the trailer, and presumably the driver is carrying an RFID tag, smart card and/or other identification that can communicate with the tractor. The driver's smart phone, for example, can be used for this purpose. Whatever transmission message that is sent from the driver should be a variable message that cannot be easily decoded or spoofed by a thief. If a cellphone is used, for example, it would be best that the cellphone has a required password before a transmission can occur. An alternative would be for the cell phone and/or other device to have a biometric sensor such as a fingerprint, voice recognizer, hand or palm print, or face recognition sensor to authenticate the driver. An alternate approach is to wait for the driver to enter the cab and then require either the entry of a password or the use of a biometric sensor such as a camera with face or palm recognition capabilities or a butt print system mounted within the seat bottom. Once a positive ID has been achieved and the tractor and trailer is mobile then the transmission rate can again be reduced. Of course the driver should have a panic button to signal that there is a problem and the transfer rate can again be increased and an error code sent. Another approach to ID the driver would be for the remote site to send a code to the driver's cell phone and a corresponding code to the trailer as in public key encryption systems. The driver can then activate the vehicle with a unique unspoofable coded transmission from his smart phone.

A particularly appropriate biometric identification method can employ the Fujitsu PalmSecure technology which uses palm print recognition technology as reported in the MIT Technology Review Blog "Beyond Cell Phone Wallets, Biometrics Promise Truly Wallet-Free Future". The Fujitsu PalmSecure technology is a palm vein based strong authentication solution that utilizes the vascular pattern of a person's palm. This device can be mounted in the cab of the tractor, on a cell phone, PDA or equivalent portable device or other convenient location. When the device recognizes the palm print of the operator it can send a coded message which permits deactivation of immobilization devices and the movement of the tractor and/or trailer.

Figure 13:
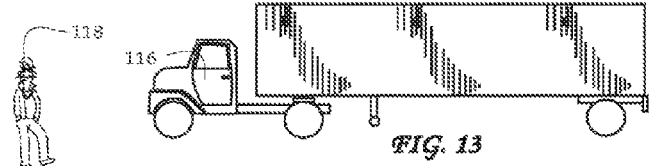
FIG. 13 illustrates a driver with a timed RFID approaching the tractor door of a truck.
Figure 14:
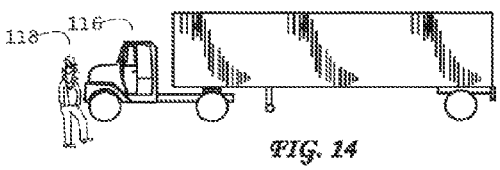
FIG. 14 illustrates the driver with the timed RFID 5 seconds after the tractor sensors have identified the driver, opened the door and disabled the security system.

As an alternative the driver can be provided with a keyless entry device, other RFID tag, smart card or cell phone with an RF transponder that can be powerless in the form of an RFID or similar device, which can also be boosted as described herein and above. Generally, such keyless entry devices can be considered a portable identification device. The interrogator, or a processing unit associated therewith, determines the proximity of the driver to the vehicle door. As shown in FIG. 13, if a driver 118 remains within a certain distance, 1 meter for example, from the door 116, for example, for a certain time period such as 5 seconds, then the door 116 can automatically unlock and ever open in some implementations. The distance and time period can be selected or determined as desired. Thus, as the driver 118 approaches the tractor and pauses, the door can automatically open (see FIG. 14).

An alternative system is for the smartphone owner to wear a watch or other item that can make a positive identification such as by a vein pattern and transmit this fact by Bluetooth to the smartphone, activating the smartphone which can then communicate with the vehicle.

Figure 15:
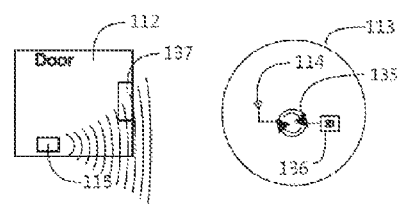
FIG. 15 illustrates a security disabling arrangement for a vehicle in accordance with the invention.

As shown in FIG. 15, an interrogator 115 is placed on the vehicle, e.g., in the door 112 as shown, and transmits coded waves. When the keyless entry device 113, which contains an antenna 114 and a circuit including a circulator 135 and a memory containing a unique ID code 136, is a set distance from the interrogator 115 for a certain duration of time, the interrogator 115 directs a door unlocking or opening device 137 to open or unlock the door 116. The duration of time is determined from the continuous reception by the interrogator 115 of the ID code 136 from the keyless entry device 113. The ID code can be a variable that is matched with the code expected by the interrogator or the code can be sent to the driver and a corresponding code, such as in the public key encryption system, sent to the interrogator from a remote site to prevent spoofing and opening of the door by an unauthorized person.

As discussed herein, information from a person entry detector can be sent by the communication network to notify interested parties of current status. Additionally, an audible alarm may be sounded and a photo can also be taken to identify the intruder or that there is an intruder. Also, motion sensors such as an accelerometer on a wall or floor of the vehicle or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell which may be connected to a pattern recognition system such as a neural network, for example, can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

The transmission of data such as obtained or derived from imagers, or other transducers, requiring on board processing of the information, using neural networks or other algorithms for example, to a remote location is an important feature of some of the inventions disclosed herein. This capability can permit an owner of a cargo container or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the driver, on the vehicle or an image or other biometric data of the driver can be sent to a remote location for recognition at that location.

If the driver is provided with an RFID with a biometric sensor then systems can ascertain that the authorized driver is operating the rig and will not permit the rig to be operated otherwise. If the trailer transmits messages at periodic intervals and the remote site takes action if there is a skipped message or a message containing an error code and the error code verifies that the vehicle is on course and on schedule, then theft becomes very difficult. A theft is assumed if anything out of the ordinary occurs and the driver cannot provide an explanation. Congestion and weather delays can be independently verified.

7. Theft of Cargo without the Theft of the Trailer

A common theft occurrence is where the thieves back another trailer close to the cargo containing trailer and then break into the latter and transfer some or all of the cargo to the former. The security of the cargo containing trailer is not breached until the receiving trailer is in place and the thieves are ready to affect a rapid transfer of the cargo. A method of accessing loads without breaking door seals, for example, has been investigated and found to be possible in less than 3 minutes (including re-fitting).

External cameras can usually sense this event before it occurs even if the sensing is that the camera has been covered or otherwise disabled. This message can be sent to the remote site before any theft has occurred and before the messaging system has been disabled. In fact the thieves may not even take time to disable the security system allowing the cameras to send a picture of the thieves' trailer for later identification. Ultrasonic or other proximity sensors can also be used.

One way of thwarting this activity is to place transmitters within the cargo that can be turned on either immediately or, preferably, later after the new trailer is in motion. If turned on too soon, the thieves may be able to locate and disable or shield the transmitter. Several transmitters can be used in the same or different pallets or other cargo containers and be activated after varying delays providing a continuous beacon for locating the cargo. The transmitters can operate either in spread spectrum mode or at a sufficient number of discrete frequencies to make jamming difficult or impossible. The thieves can use trailers that have been totally shielded to prevent electromagnetic radiation from leaving the trailer (a Faraday cage) but in so doing the trailer itself can be sensed by drone aircraft, law enforcement personnel or at border crossings. A terahertz scanning system for example can easily detect such a trailer. Also metal objects appear differently under IR again making them easy to locate. Of course it may be difficult to pick out the trailer with the stolen cargo if many similar looking trainers are present.

To eliminate the need to use a metal trailer, the thieves may attempt to cover each cargo pallet with metal foil which of course would be more time consuming since all sides including the bottom would need covering. Since the offending trailer will need to be very close to the cargo trailer to permit rapid cargo transfer, the opportunity exists to have the cargo container to mark the offending trailer. This can be done by projecting paint balls or spraying the trailer with paint that would be visible to specially equipped cameras on drones or law enforcement vehicles. Also, one or more transmitters can be shot from the cargo so that they embed themselves into the offending trailer once again acting as a beacon for truckers, law enforcement vehicles or drones.

The solution here is once again early detection that something is happening and means to delay the theft for as long as possible allowing time for the authorities to arrive. Strong door locks and protected hinges are a start and cargo pallets that are secured to the trailer structure in a manner requiring time to release will all add time to the theft operation. Of course any degree of securement is possible and can be implemented as part of a continuous improvement process as failure modes arise. The goal here is to make if difficult or even impossible to quickly steal cargo without stealing the container.

Another theft mode is where the thieves steal a container from on top of a flatbed trailer leaving the trailer. This process requires the use of a crane or at least winches that can be activated to drag the container off of the flatbed and onto the offending one. Numerous impediments can be used to securely attach the container to the flatbed and to help thwart such a dragging but all can probably be circumvented with some thought on the part of the thieves but again at the expense of time during which the authorities are closing in.

The container of course can be marked making it easier to spot by drones, truckers and law enforcement personnel but this can also be thwarted by covering the container in one manner or another. Transmitters can be placed on the container and beacons turned on as discussed above perhaps easier than other cases since the thieves will not have time to locate each one as it begins transmitting at random times. Once a beacon begins transmitting the location of the trailer can be found and drones, other truckers and law enforcement personnel can converge on the offending trailer. Also, flares and smoke emitters can be remotely activated if they are not discovered by the thieves.

Naturally, all of the systems described herein for cargo theft prevention do not need to be implemented at once. The goal is to maintain a technological lead over the thieves so that the majority and eventually all thefts of cargo are eliminated.

8. Surround Trailer Monitoring

Cameras are now quite inexpensive and thus can be part of a comprehensive theft prevention system both internal and external to a trailer. Internally they can detect the opening of a door or other aperture into the trailer and can sound an alarm if the interior space of the trailer is breached. As mentioned elsewhere, this alarm can be in the form of a change in the message that is periodically transmitted to the remote monitoring site as well as an audio or visible alarm or a transmission to a device such as a cellphone carried by the driver. If, for example, the breaching of trailer security is done without causing a change in lighting within the trailer then another event such as vibration or suspicious sound can trigger the acquiring of an image using an LED for lighting. Additionally this can be done automatically and periodically with the period being a function of the transmission frequency. When a new image is acquired it can be compared with a previous image and if any changes have occurred in the presence or positioning of the cargo, for example, then the message sent to the remote monitoring site can be appropriately altered to indicate the discovered change.

The first thing that a sophisticated thief will do is disable the off-site transmission system and so it is unlikely that a meaningful message will get transmitted, but the mere fact that no message is received may be information enough for the remote site to take action.

Figure 28:
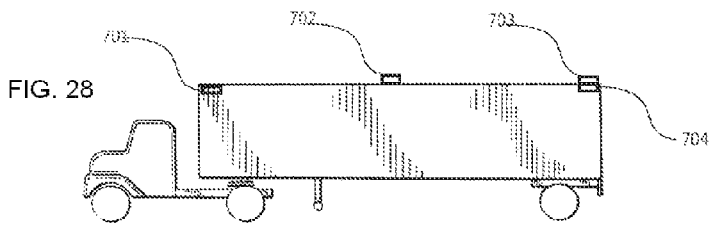
FIG. 28 illustrates a truck with a trailer and various mounting locations for cameras that monitor the environment exterior to the trailer.
Figure 29:
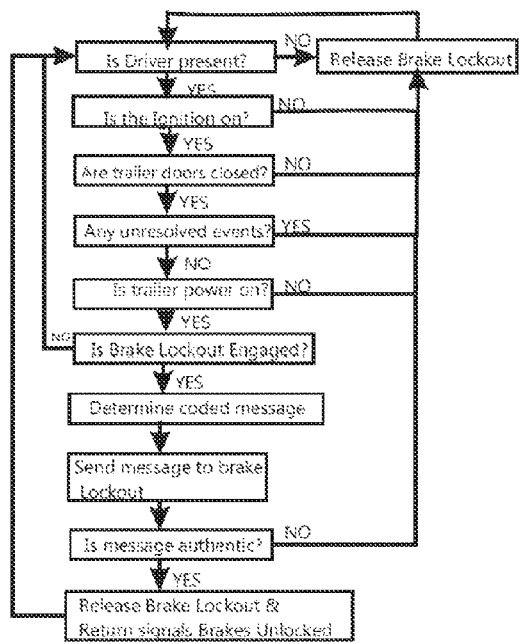
FIG. 29 is a block diagram showing a process for controlling the trailer parking and emergency brake lockout system.

One or more 360 degree fisheye or any other field of view cameras can also be appropriately placed on the exterior of the trailer and images from the space around the trailer can be analyzed to see if anything of a worrisome nature is occurring. Such an event could be the approach of another trailer toward the rear of the subject trailer indicating that a transfer of cargo may be about to occur. Such an event could happen prior to the disarming or defeating of the transmission system to the remote site and thus could give advanced warning that a theft may be attempted. Any change in the environment around the trailer that may be indicative of an attempt to steal the trailer or the contents thereof can thus be signaled to the remote monitoring site. FIG. 28 illustrates one possible configuration of externally mounted cameras. Cameras 701 and 704 are shown facing with a field of view out from the side of the trailer. Camera 702 is illustrated as a camera having a 360 degree view around the trailer and camera 703 looks back from the rear of the trailer to view approaching offending trailers for possibly accepting stolen cargo.

9. System

Figure 21:
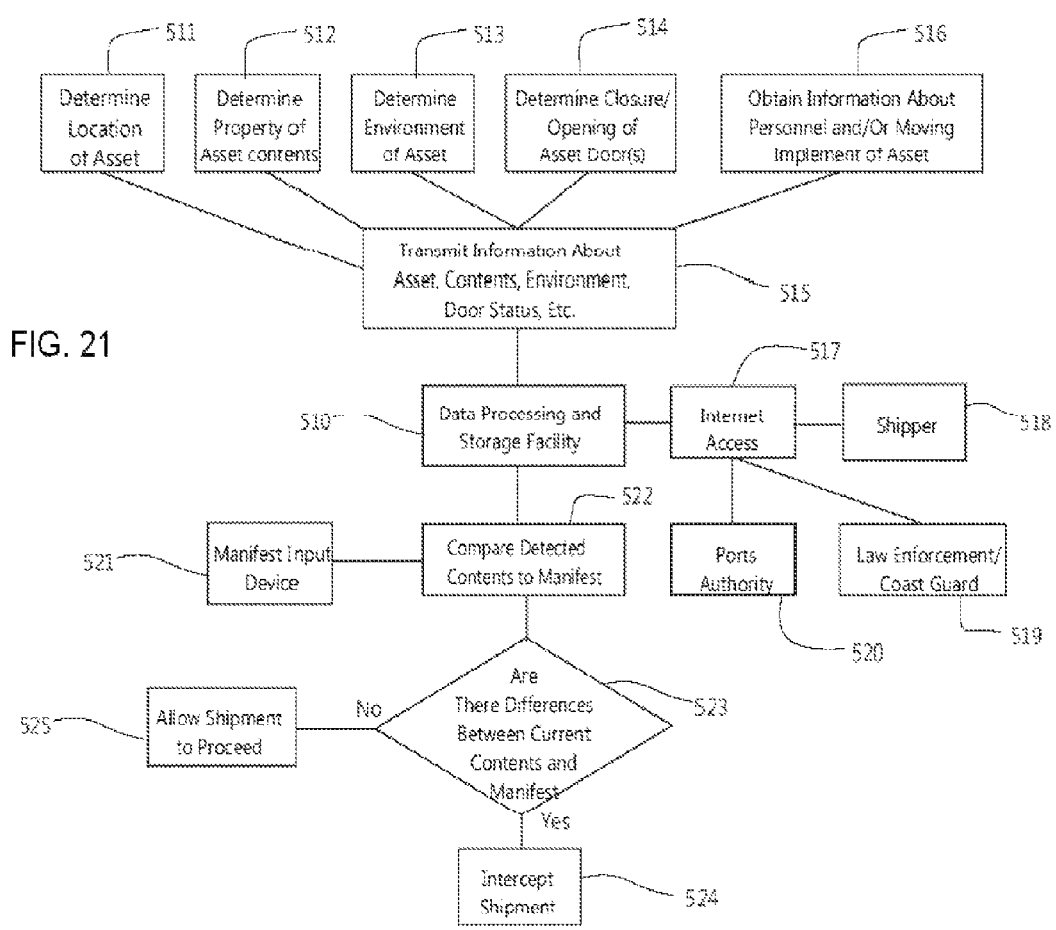
FIG. 21 is a flow chart showing one manner in which multiple assets are monitored in accordance with the invention.

FIG. 21 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516 or this information can be already stored from a communication setting up the shipping event from the shipping company. This latter information could also be entered by an input device attached to the asset.

The data processing and storage facility 510 is connected to the Internet at 517, in this preferred implementation, to enable shippers 518 to check the location and progress of the asset, the contents of the asset, the environment of the asset, whether the doors are being opened and closed impermissibly and the individual and companies handling the asset on an exception basis. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525. Of course if the SMS monitoring system has been implemented as discussed above the theft of any cargo will have been discovered within seconds of or even prior to its occurrence.

Having the ability to transmit coded information to a satellite, ubiquitous internet, SMS, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical, temperature, moisture etc. sensors among others.

Cameras either with or without a source of illumination can be used to record people approaching the container and perhaps stealing the contents of the container. These cameras can be at the parking locations at truck stops or on the trailers. A particularly appropriate camera is one that is positioned on top of the trailer and has a 360 degree field of view. See, for example, Ridden, P "Researchers develop genuine 3D camera", at the Gizmag.com website. At the appropriate frequencies, (terahertz, for example) the presence of concealed weapons can be ascertained as described in Alien Vision: Exploring the Electromagnetic Spectrum With Imaging Technology (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked almost as secure as a safe, for example, and only permit an authorized person carrying the proper identification to open the container or other storage facility.

A pattern recognition system can be trained to identify voice, palm, vein, butt, facial or iris patterns, for example, of authorized personnel or ascertain the identity of authorized personnel to prevent theft of the container. Such a pattern recognition system can operate on the images obtained by the cameras or other sensors which may, for example, be worn by the driver. That is, if the pattern recognition system is a neural network, it would be trained to identify or ascertain the identity of authorized personnel based on images or other data of such personnel during a training phase and thus operationally only allow such personnel to open the container, enter the container and/or handle the container.

A wide variety of smart cards, biometric identification systems (such as fingerprints, voice prints, palm prints, vein prints and Iris scans) can be used for the same purpose. When an unauthorized person approaches the container, his or her picture can be taken and, in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors, or information based on this output, can now be transmitted to a remote facility using a variety of telematics methods including communication via a low power link to the internet, SMS or a satellite, such as provided by the Skybitz Corporation as described above and others.

Thus, as mentioned above, many new opportunities now exist for applying a wide variety of sensors to a cargo container or other object as discussed above and below. Through a communication system such as a ubiquitous internet, a cell phone network using SMS, a LEO or geostationary or other satellite system, critical information about the environment of container or changes in that environment can be transmitted to the container owner, law enforcement authorities, container contents owner etc. Furthermore, the system is generally low cost and may not require connection to an external source of power. The system generally uses low power from a battery that can last for years without maintenance depending on the duty cycle. In the case of such a battery, the charge state can also be communicated permitting timely replacement or recharging.

Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents as discussed above. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the communication channel that an exception situation exists and to prepare to receive additional information.

Many of the sensors on the container and inside the container may also require significant energy and thus should be used sparingly. For example, if the container is known to be empty and the doors closed, there may be no need to monitor the interior of the container unless the doors have been reopened. Similarly, if the container is stationary in a secured location and doors are closed, then continuously monitoring the interior of the container to determine the presence of cargo is unnecessary. Thus, each of the sensors can have a program duty cycle that depends on exterior or other events. In some applications either energy harvesting such as solar power or other source of power may be available either intermittently to charge the battery or continuously.

If the vehicle such as a container is stationary at a secured location then usually the monitoring can take place infrequently and the battery is conserved. When the vehicle is in motion then energy is frequently available to charge the battery and thus more frequent monitoring can take place as the battery is charged. Finally if the container is stationary but not at a secured location then very frequent monitoring may be called for, The technique is known as "energy harvesting" and involves, for example, the use of a piezoelectric material that is compressed, bent or otherwise flexed thereby creating an electric current that can be used with appropriate circuitry to charge the battery. Other methods include the use of a magnet and coil where the magnet moves relative to the coil under forces caused by the motion of the vehicle or an air turbine powered by the flow of air surrounding a moving vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. For some applications, in order to minimize the power expended at the sensor installation, the IMU correction calculations based on the GPS can be done at an off sensor location such as the receiving station of the communicated information. The IMU or other inertial sensors can also be used to characterize the roadway on which the trailer is traveling perhaps giving an early warning if the trailer has left the expected roadway and is traveling on an unexpected secondary road indicative of the theft of the trailer or of the tractor and trailer combination. Of course if the route has been programmed into the onboard processor then deviation from the route would be known and the appropriate error code transmitted.

If the vehicle operates on a road that has previously been accurately mapped, to an accuracy of perhaps a few centimeters, then the analysis system can know the input from the road to the vehicle tires and thus to the chassis of the trailer. From this the system could know if the mass of the container has changed. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system via telematics when the road is covered with ice or when it encounters a pothole. In some cases a thief can cause a tire to fail and thus cause the driver to pull off the road to investigate giving the thief the opportunity to commandeer the vehicle. Such a tire failure event can alert the remote site and the transmission rate can be increased.

Thus, there are many safety related aspects to having sensors mounted on a container and where those sensors can communicate periodically with a LEO or other satellite, the internet, SMS, or other communication system, and thereafter to the Internet or directly to the appropriate facility. Some of these rely on an accurate IMU. Although low cost IMUs are generally not very accurate, when they are combined using a Kalman filter, neural network or other algorithm with the GPS system, which is on the container as part of the tracking system, the accuracy of the IMU can be greatly improved, approaching that of military grade systems.

The discussion above has concentrated, in part, on containers that contain cargo where presumably this cargo is shipped from one company or organization to another. This cargo could be automotive parts, animals, furniture, weapons, bulk commodities, machinery, fruits, pharmaceuticals, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a ubiquitous internet or cell phone network, SMS, or a satellite system exists such as the Skybitz, for example, LEO or geostationary satellite system coupled with a low cost low power small GPS receiver and communication device capable of sending information periodically to the internet, cell phone network or satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination with the latest GPS category III satellites is currently on the order of a few meters and soon will be on the order of decimeters. However, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via the aforementioned communication system can also know the DGPS corrections at the asset location and thus can relay to the vehicle its precise location.

Many transmission modes exist including cellular phone systems, satellite communications and the Internet. The Internet systems can be broken into two types, those in use now that are available only at particular "hot-spots" and a ubiquitous internet which by definition is available almost everywhere. The use of ubiquitous internet is believed to be unique to the inventions herein as the inventors may have been the first to recognize that ubiquitous internet would become available at least partially due to the inventions herein and can be counted on to provide the sole system for communication from various vehicles including automobiles, trucks and truck trailers, storage tanks and shipping containers replacing all other communication systems. Their vision is now being realized through such systems as Super WiFi, WiMAX and LTE.

10. Continuous Improvement, Upgradeable Software

A related technology that can be integrated into a cargo theft prevention system includes the use of the driver's cell phone signal to locate the driver and determine whether he or she is inside the tractor. If the position of the trailer is known from a trailer resident system and that shows that the trailer is moving away from the driver's cell phone then even if all else appears in order there is cause for alarm. In another case the SMS from the driver's cellphone or from a trailer or tractor resident system can be used to automatically unlock and open a yard gate or warehouse door eliminating time lost in waiting for such an event and permitting the tractor to quickly move into a secure location. A truck which needs to wait for the gate to be opened, for example, may be a target for a thief or hijacker.

A smartphone can be used to operate various components within the vehicle which are not necessarily related to preventing thefts but may facilitate the safe passage of the vehicle to its final destination. If the vehicle has a heads-up display on the windshield, for example, messages from the home office can be displayed to warn the driver of bad weather, an accident etc.

Vehicle resident sensors can be used to monitor the environment both inside and outside of the tractor and trailer and can send messages as part of the SMS message when, for example, a criminal introduces a gas into the tractor compartment to immobilize the operator. While monitoring the temperature within the trailer or in the environment, presence of smoke in the exterior environment etc. can be send with each SMS message or on an exception basis.

Additionally, vehicle or driver resident sensors can monitor the health of the driver to determine if he has had or is about to have a heart attack, has had too much to drink or is operating under the influence of drugs or is just getting drowsy or maybe even killed or rendered unconscious by a thief. The vapors within the tractor as well as the driver's heartbeat and breathing rate can be monitored with vehicle resident sensors as discussed in U.S. patent application Ser. No. 13/419,988 filed Mar. 14, 2012. Messages related to the sensor determinations can be appended to the periodic SMS messages and can influence the rate that these messages are transmitted.

The SMS messages sent by the vehicle can also be used to pay tolls eliminating the need for the tractor to carry multiple RFID transponders such as an EZ-Pass and a Sunpass, for example. Through setting up a cooperative agreement on a state by state basis the tolling authority can get a message from the remote site that a vehicle is about to enter the Lincoln Tunnel, for example, and that the toll is being paid by XYZ company rather than by an EZ-pass transponder. This then begins the process of eventually providing for tolls based on miles traveled rather than on fuel taxes and toll stations.

Some of the products that arise from the inventions disclosed herein include brake locking systems, SMS communication systems, Intrusion monitors, the use of drones to locate stolen trailers and location systems for stolen trailers.

The development of theft prevention systems must continue to evolve as the thieves become more sophisticated. Since the goal is zero thefts, every time a theft of an equipped trailer occurs the system will need revision to remove the newly discovered failure mode. This may require that software resident on trailer theft prevention systems be upgradeable remotely.

Basically the system described herein can be implemented in stages as the thieves become more sophisticated. This system if implemented now would probably eliminate 90% to 99% of cargo theft. Since the driver presence can become a key element in a successful theft, the incidence of hijacking the driver alone with the rig will probably increase even though the penalty of the crime also significantly increases. For example, assume that the thief places an explosive device on the driver's door when the driver stops for a traffic light and calls the driver on his cell phone to give him instructions. The first instruction may be to open the window so that a radio communication device can be placed within the cab. The driver is then instructed to drive to a particular location where the theft quickly occurs. This type of event has yet to occur and that gives time for its preparation.

The theft of cargo in transit has mainly been considered above. A significant percentage of cargo thefts occur at terminals and principles similar those discussed above can be applied to solving this problem. If the cargo has already been placed within a trailer then the principles above should eliminate the problem. Basically the setting of the trailer brakes prevents movement of trailer. Authorized driver (AD) parks trailer, the brakes engage and disengage when AD returns. AD is determined by remote site that pairs trailer ID with AD to allow movement. The trailer when loaded sends messages frequently as discussed above. Lack of an expected received message creates an alarm.

Cargo theft within a warehouse is the responsibility of the warehouse management. If the driver is part of the theft gang then that should be obvious as the theft is occurring. Counterfeit shipping documents can be determined by the use of driver biometric IDs. If the driver drops off the container at an unauthorized site, the status transmissions will stop or not be as anticipated resulting in an alarm. The grab and run case where an individual or group follows a targeted truck in a van and when the truck comes to a stop, suspects exit the van, open trailer doors and off-load cargo before the truck takes off would cause an error code or the status transmissions to stop. In either case the theft has been detected early and by making it difficult to open the doors the theft can be delayed long enough for the authorities to spring into action. Also by putting transmitters within the cargo and further securing the cargo to the trailer this can significantly delay the theft and permit the stolen cargo to be tracked.

Some other types of events that may need to be addressed if they become common include, as reported in the aforementioned 2007 EU Parliament report, the Transported Asset Protection Association (TAPA):

1. The use of Gas or explosives. Gas will allegedly be piped through the air vents into the driver's cabin or explosives may be used as a diversion. Gas related incidents have been reported across Europe, in Spain, the UK, France, Italy and Belgium, while in Sweden armed gangs have been using explosives.
2. Impersonation of police/customs officers. Criminals dressed as police or customs officers will signal to the driver that he must pull over, at which point they will take control of the vehicle, often using violence to do so. The uniforms worn by the criminals are often genuine. The sophistication of disguises has increased with criminals now seemingly aware that they can no longer rely on simple flashing blue lights to stop vehicles. Drivers are reminded that normally they will only be asked to stop by uniformed officers in marked vehicles and, when in doubt, to use their vulnerable load cards.
3. Staged accident. Criminals will stage an accident so that the driver will have to stop. They will then take the vehicle from him by force. This technique has been used in a number of different crimes and not exclusively in the UK. The technique is risky but one of the best ways to bypass security measures such as off route alarms and panic buttons. Security managers should review reporting procedures for drivers.
4. Forced stop. Criminals may set up a fake checkpoint on the road so that the driver will have to stop. Again, the vehicle will be taken by force.
5. Moving vehicle attack. Offenders approach moving load from behind, jumping from their own vehicle onto the loaded truck and remove goods from the still driving vehicle, often by simply throwing them off the trailer.
6. Target vehicle marking Offenders approach targeted vehicles and either mark them so they are easier to follow from distance: placing of reflective items at the rear or breaking light fittings to show a white light at the rear.
7. Theft of load or loaded vehicles from compound. Offenders approach and remove either loads or entire loaded vehicles and drive away often utilizing information from current of previous legitimate employees. Vulnerable load cards were introduced by the transport industry of some EU Member States. The card explains (for example to police) that the driver is all right with any police controls though not in dark and remote places. It suggests that the driver follows the patrol car to the nearest police station or similar before the control is done. However, most EU police forces do not acknowledge this card officially.
8. Tracking devices. GPS systems allow truck movements to be monitored either during routine delivery or when notified that it is subject to a crime. Most GPS systems operate by line of sight, meaning their antenna has to see the sky in order to send tracking information. What professional cargo thieves will do is disconnect a GPS antenna the moment they steal a truck, thereby thwarting the system. In response, GPS manufacturers have tried to overcome this by concealing their antennas. Cellular assisted GPS units don't require line of sight to a satellite, have no visible antennas and can be put in trailers or mixed with a truck's cargo in order to prevent it from being found. Systems should be developed to escalate any activation to the police/law enforcement agencies. Companies managing these systems should be certified by the relevant national authorities.

Most of the above events are handled by the combination of the inventions listed above including brake locking, messaging, driver biometric based IDs, route deviation sensing etc.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

Finally, all of the patents, patent application publications, non-patent literature and any other documents mentioned above are incorporated by reference herein.

The invention claimed is:

1. A method for monitoring a cargo container, comprising:
providing a transmitter on the container and a remote location apart from the container with an initial schedule of messages to be transmitted by the transmitter from the container to the remote location;
transmitting messages from the transmitter to the remote location according to the initial schedule of messages;
creating, using a processor, a new schedule of messages that is different from the initial schedule of messages when one of a pre-determined plurality of conditions of contents of the container, the container or an environment around the container is detected;
providing the remote location with the new, different schedule of messages to be transmitted from the container to the remote location; and providing the new, different schedule of messages to the transmitter and transmitting messages from the transmitter to the remote location according to the new, different schedule such that the transmitter transmits messages to the remote location according to the new, different schedule of messages instead of according to the initial schedule of messages, whereby theft of the container is determinable when one of the messages in the initial schedule of messages is not received at the remote location after it should have been transmitted according to the initial schedule of messages provided to the remote location or when one of the messages in the new, different schedule of messages is not received at the remote location after it should have been transmitted according to the new, different schedule of messages provided to the remote location.

2. The method of claim 1, wherein the step of creating the new schedule of messages that is different from the initial schedule of messages comprises modifying a rate of transmission of the messages from the transmitter based on detection of a condition of a vehicle on which the container is being transported that constitutes one of the plurality of conditions of the contents of the container, the container or the environment around the container.

3. The method of claim 1, wherein one of the predetermined plurality of conditions of the contents of the container, the container or the environment around the container is the presence of a driver inside a vehicle on which the container is being transported.

4. The method of claim 1, wherein one of the predetermined plurality of conditions of the contents of the container, the container or the environment around the container is a distance between a driver of a vehicle on which the container is being transported and the vehicle.

5. The method of claim 1, wherein one of the predetermined plurality of conditions of the contents of the container, the container or the environment around the container is a vehicle on which the container is being transported being at rest after motion of the vehicle stops.

6. The method of claim 1, wherein one of the predetermined plurality of conditions of the contents of the container, the container or the environment around the container is a location of a vehicle on which the container is being transported.

7. The method of claim 6, further comprising:
determining the location of the vehicle using an on-board location-determining system on the vehicle; and
providing the determined location of the vehicle to the processor that creates the new, different schedule of messages.

8. The method of claim 2, wherein the condition of the vehicle is deviation of the vehicle from an expected route.

9. The method of claim 2, wherein the condition is a biometric identification of a driver of the vehicle.

10. The method of claim 9, further comprising installing or incorporating the biometric identification of the driver onto a portable electronic communication or processing device, the device being carried by the driver when the vehicle is in transit.

11. The method of claim 1, further comprising:
creating, using the processor and based on current time, a revised schedule of messages that is different from the initial schedule of messages and the new, different schedule of messages;
providing the remote location with the revised schedule of messages to be transmitted from the container to the remote location; and
providing the revised schedule of messages to the transmitter and transmitting messages from the transmitter to the remote location according to the revised schedule such that the transmitter transmits messages to the remote location according to the revised schedule of messages, whereby theft of the container is determinable when one of the messages in the revised schedule of messages is not received at the remote location after it should have been transmitted according to the revised schedule of messages provided to the remote location.

12. The method of claim 1, wherein the step of creating the new schedule of messages that is different from the initial schedule of messages comprises modifying a rate of transmission of the messages from the transmitter based on weather around the vehicle such that different weather conditions constitute the plurality of conditions of the contents of the container, the container or the environment around the container.

13. The method of claim 1, wherein the step of creating the new schedule of messages that is different from the initial schedule of messages comprises modifying a rate of transmission of the messages from the transmitter based on a property of an item of cargo inside the container, the item property constituting one of the plurality of conditions of the contents of the container, the container or the environment around the container.

14. The method of claim 1, wherein the transmitter is configured to transmit text messages according to the initial schedule of messages or according to the new, different schedule of messages.

15. The method of claim 1, further comprising:
detecting a property of a vehicle on which the container is being transported using at least one sensor, the vehicle property constituting one of the plurality of conditions of the contents of the container, the container or the environment around the container; and
wherein the step of creating the new schedule of messages that is different from the initial schedule of messages comprises modifying a rate of transmission of the messages from the transmitter based on the detected property of the vehicle.

16. The method of claim 1, further comprising:
arranging at least one sensor in or on the container to detect information about a property of the container or a property of an environment in or around the container, the container property or environment property constituting one of the plurality of conditions of the contents of the container, the container or the environment around the container; and
interrogating the at least one sensor to obtain information about a property monitored by the at least one sensor at a frequency that is independent of the transmission of messages by the transmitter according to the initial or new, different schedule of messages.

17. The method of claim 1, further comprising:
arranging at least one sensor in or on the container to detect information about a property of the container or a property of an environment in or around the container, the container property or environment property constituting one of the plurality of conditions of the contents of the container, the container or the environment around the container; and
directing commands from a remote site to the container to cause the at least one sensor to be interrogated and obtain information about a property monitored by the at least one sensor.

18. A method for monitoring a cargo container, comprising:
- providing a transmitter on the container and a remote location apart from the container with an initial schedule of text messages to be transmitted by the transmitter from the container to the remote location, the transmitter being configured to transmit text messages using SMS protocol;
- transmitting text messages from the transmitter to the remote location according to the initial schedule of text messages;
- creating, using a processor, a new schedule of text messages that is different from the initial schedule of text messages when one of a pre-determined plurality of conditions of contents of the container, the container or an environment around the container is detected;
- providing the remote location with the new, different schedule of text messages to be transmitted by the transmitter from the container to the remote location; and
- providing the new, different schedule of text messages to the transmitter and transmitting text messages from the transmitter to the remote location according to the new, different schedule of text messages such that the transmitter transmits text messages to the remote location according to the new, different schedule of text messages instead of according to the initial schedule of text messages,
- whereby theft of the container or contents of the container is determinable based on content of a text message received at the remote location, when one of the text messages in the initial schedule of text messages is not received at the remote location after it should have been transmitted according to the initial schedule of text messages provided to the remote location or when one of the text messages in the new, different schedule of text messages is not received at the remote location after it should have been transmitted according to the new, different schedule of text messages provided to the remote location.

19. The method of claim 18, further comprising:
- periodically obtaining data about the container or contents of the container using at least one sensor; and
- determining whether one of the plurality of conditions of the contents of the container, the container or the environment around the container is satisfied based on the obtained data, the text messages being transmitted based on the sensor-obtained data,
- wherein data about the container or contents of the container is obtained at a different frequency than a text message transmission frequency or upon reception of a command from the remote location.

20. A method for monitoring a cargo container, comprising:
- providing a transmitter on the container and a remote location apart from the container with an initial schedule of messages to be transmitted from the container to the remote location;
- transmitting messages from the transmitter to the remote location according to the initial schedule of messages using the Internet or a smartphone;
- creating, using a processor, a new schedule of messages that is different from the initial schedule of messages when one of a pre-determined plurality of conditions of contents of the container, the container or an environment around the container is detected;
- providing the remote location with the new, different schedule of messages to be transmitted from the container to the remote location; and
- providing the new, different schedule of messages to the transmitter and transmitting messages from the transmitter to the remote location according to the new, different schedule such that the transmitter transmits messages to the remote location according to the new, different schedule of messages instead of according to the initial schedule of messages,
- whereby theft of the container or contents of the container is determinable based on content of a message received at the remote location, when one of the text messages in the initial schedule of text messages is not received at the remote location after it should have been transmitted according to the initial schedule of text messages provided to the remote location or when one of the text messages in the new, different schedule of text messages is not received at the remote location after it should have been transmitted according to the new, different schedule of text messages provided to the remote location.

* * * * *